(12) United States Patent
Stieglitz et al.

(10) Patent No.: US 12,583,318 B2
(45) Date of Patent: Mar. 24, 2026

(54) COMPONENT FOR VEHICLE INTERIOR

(71) Applicant: Shanghai Yanfeng Jinqiao Automotive Trim Systems Co. Ltd., Novi, MI (US)

(72) Inventors: Alexander Stieglitz, Flemington, NJ (US); Michael Gerard Zimmer, Belmont, MI (US); Xia Qun, Shanghai (CN); Ni Jiawen, Shanghai (CN); Wei Jing, Shanghai (CN); Yichen Zhou, Shanghai (CN)

(73) Assignee: Shanghai Yanfeng Jinqiao Automotive Trim Systems Co. Ltd.

( * ) Notice: Subject to any disclaimer, the term of this patent is extended or adjusted under 35 U.S.C. 154(b) by 0 days.

(21) Appl. No.: 18/430,737

(22) Filed: Feb. 2, 2024

(65) Prior Publication Data

US 2024/0181882 A1 Jun. 6, 2024

Related U.S. Application Data

(63) Continuation of application No. PCT/US2022/074495, filed on Aug. 3, 2022.
(Continued)

(30) Foreign Application Priority Data

Dec. 31, 2021 (CN) .......................... 202111669900.1

(51) Int. Cl.
*B60K 35/21* (2024.01)
*B60K 35/10* (2024.01)
(Continued)

(52) U.S. Cl.
CPC .............. *B60K 35/21* (2024.01); *B60K 35/10* (2024.01); *B60K 35/50* (2024.01); *B60K 35/60* (2024.01); *B60K 2360/33* (2024.01)

(58) Field of Classification Search
CPC ...... B60K 35/21; B60K 2360/33; B60Q 3/64; B60Q 3/54
See application file for complete search history.

(56) References Cited

U.S. PATENT DOCUMENTS

| | | | |
|---|---|---|---|
| 2015/0274066 A1* | 10/2015 | Del Pozo Gonzalez | .................... B60Q 3/64 362/551 |
| 2020/0164795 A1* | 5/2020 | DeGrote | .................. B60Q 3/64 |
| 2021/0229599 A1 | 7/2021 | Degrote et al. | |

FOREIGN PATENT DOCUMENTS

| | | |
|---|---|---|
| DE | 102012101315 A1 | 8/2013 |
| DE | 102012215165 A1 | 2/2014 |

(Continued)

OTHER PUBLICATIONS

Extended European search report for European Application No. 22854082.9 dated Jul. 21, 2025, 8 pages.

*Primary Examiner* — Evan P Dzierzynski
(74) *Attorney, Agent, or Firm* — Amin, Turocy & Watson, LLP

(57) ABSTRACT

A component for a vehicle interior is disclosed; a method for producing the component is also disclosed. The component comprises a base and a cover comprising an exterior surface providing the visible surface and an interior surface; the visible surface at the cover may comprise a display operated by light source/panel configured to present an image at an image presentation area. The image presentation area may comprise a formed image presentation area; the formed image presentation area may comprise at least one formed hole formation segment comprising at least one formed hole formation based on a hole pattern segment for a pattern image area. The image presentation area of the cover may comprise each formed hole formation comprising formed hole formation segments; each formed hole formation may (Continued)

comprise an opening through the cover generally corresponding to a hole of the hole pattern segment. A composite visual effect may be presented at the cover of the component; the external surface of the cover may comprise a surface effect such as by a veneer configured to provide a visual effect; the formed image presentation area is configured to provide a visual effect such as by the image illuminated at the display from the light source/panel. The formed hole formations for the image presentation area of the cover may comprise laser-formed openings formed through the internal surface and external surface of the cover.

20 Claims, 44 Drawing Sheets

Related U.S. Application Data

(60) Provisional application No. 63/229,440, filed on Aug. 4, 2021.

(51) Int. Cl.
B60K 35/50          (2024.01)
B60K 35/60          (2024.01)

(56)                 References Cited

FOREIGN PATENT DOCUMENTS

| EP | 2060443 A2 | 5/2009 |
| WO | 2020057816 A1 | 3/2020 |

* cited by examiner

HP

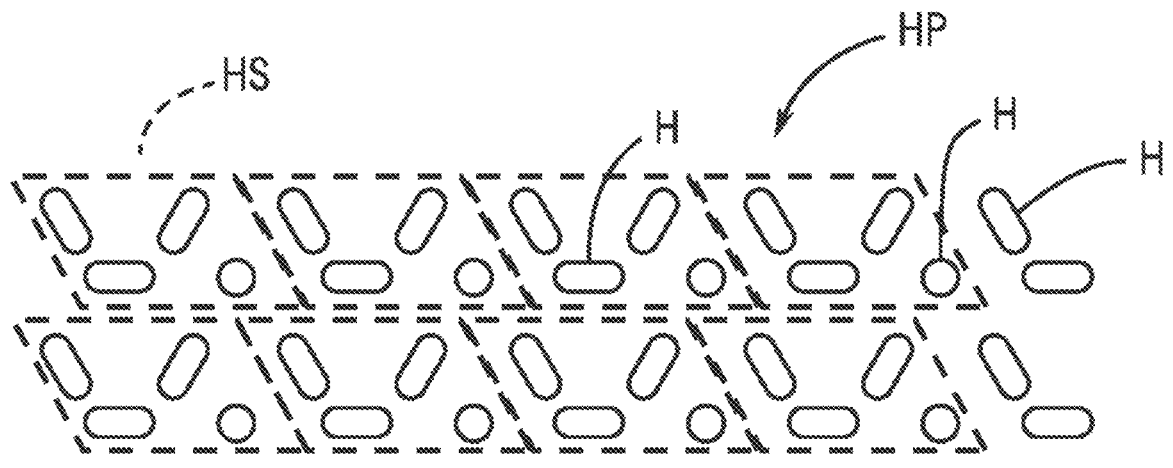
FIG. 14A
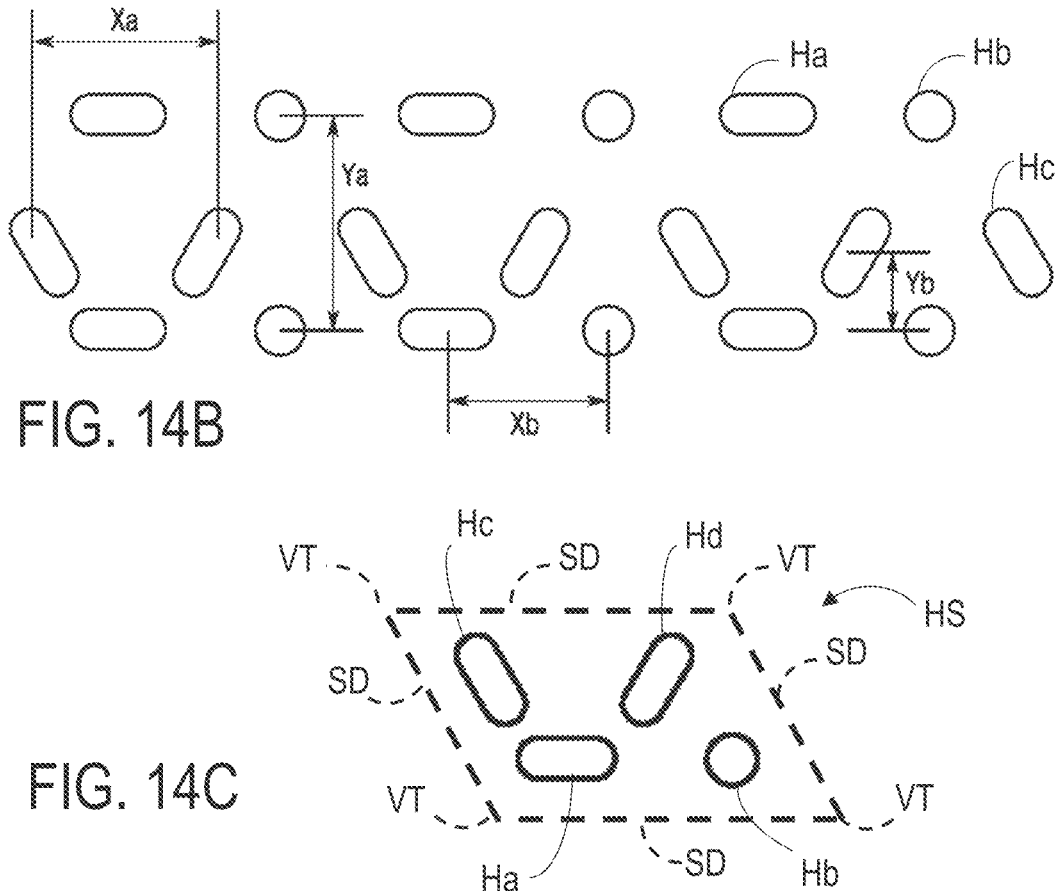
FIG. 14B
FIG. 14C

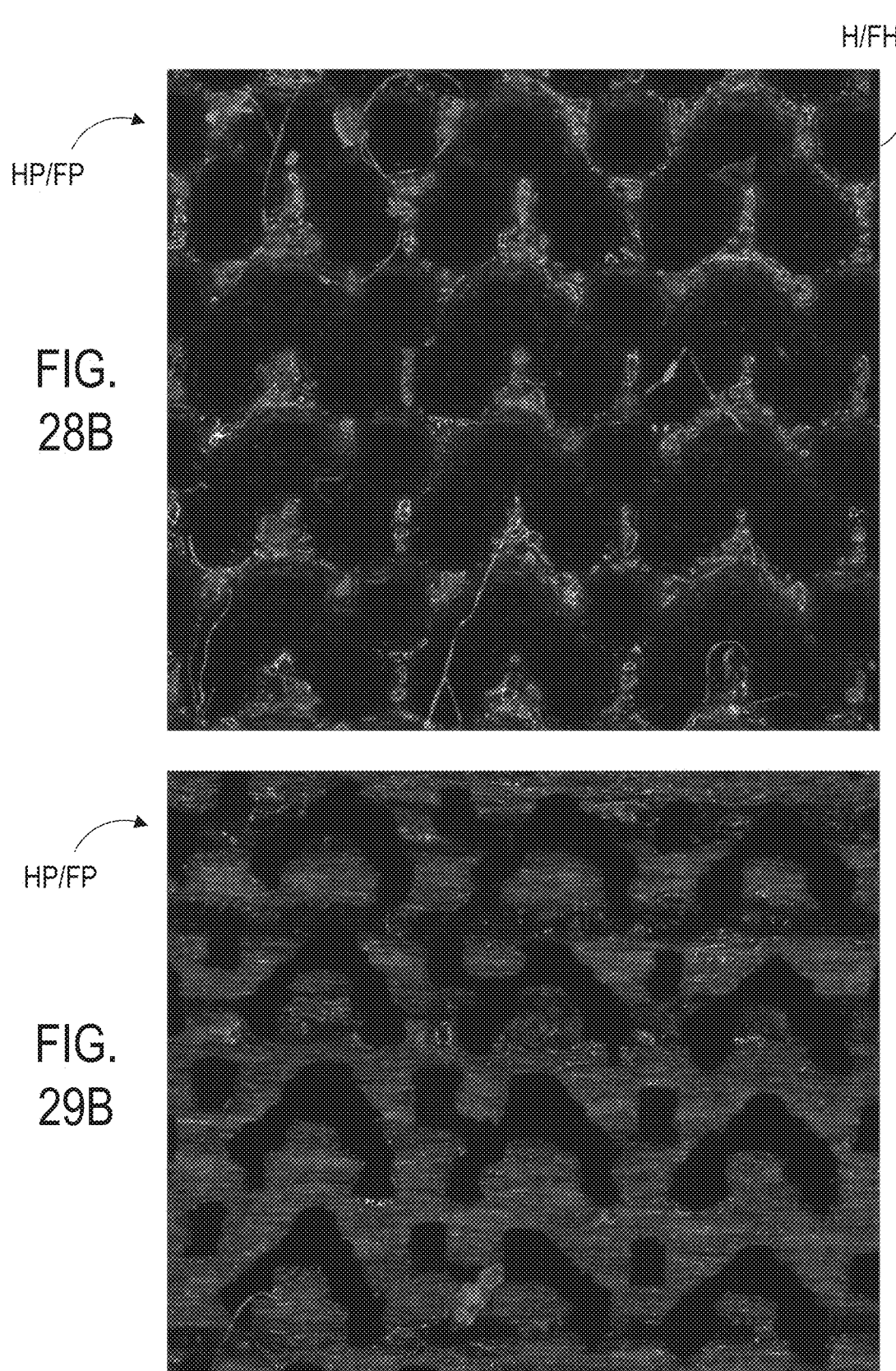
FIG.
28B
FIG.
29B

HP

H

Hc

HS

Hd

Ha

Hb

SF/SE

HP/FP

HS/FS

H/FHe

H/FHr

H/FHe

H/FHr

HP/FP

H/FH

H/FH

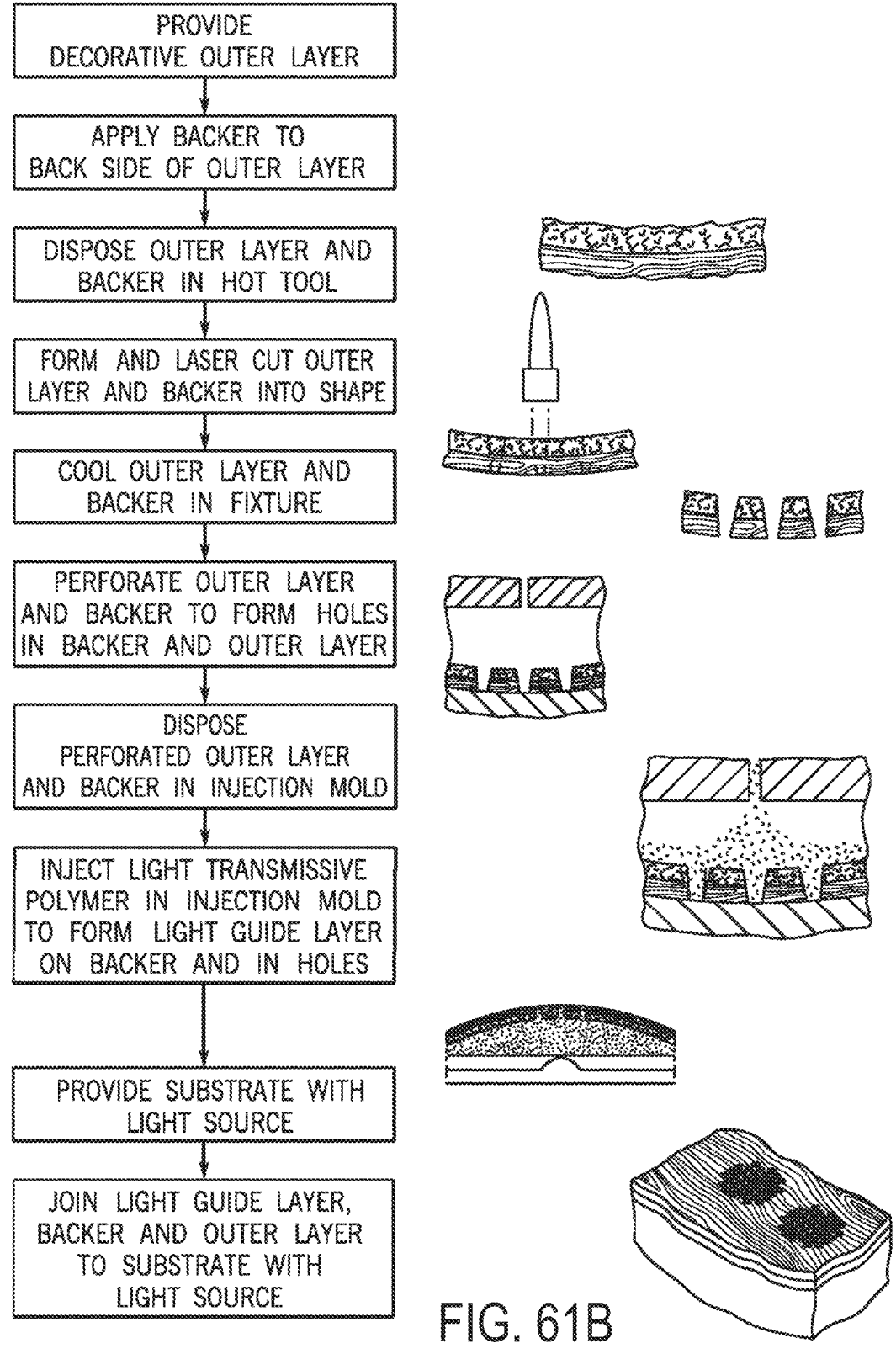

```
┌─────────────────────────────┐
│          PROVIDE            │
│  DECORATIVE OUTER LAYER     │
└─────────────────────────────┘
              │
              ▼
┌─────────────────────────────┐
│      APPLY BACKER TO        │
│  BACK SIDE OF OUTER LAYER   │
└─────────────────────────────┘
              │
              ▼
┌─────────────────────────────┐
│  DISPOSE OUTER LAYER AND    │
│    BACKER IN HOT TOOL       │
└─────────────────────────────┘
              │
              ▼
┌─────────────────────────────┐
│  FORM AND LASER CUT OUTER   │
│ LAYER AND BACKER INTO SHAPE │
└─────────────────────────────┘
              │
              ▼
┌─────────────────────────────┐
│   COOL OUTER LAYER AND      │
│     BACKER IN FIXTURE       │
└─────────────────────────────┘
              │
              ▼
┌─────────────────────────────┐
│   PERFORATE OUTER LAYER     │
│  AND BACKER TO FORM HOLES   │
│  IN BACKER AND OUTER LAYER  │
└─────────────────────────────┘
              │
              ▼
┌─────────────────────────────┐
│         DISPOSE            │
│  PERFORATED OUTER LAYER     │
│ AND BACKER IN INJECTION MOLD│
└─────────────────────────────┘
              │
              ▼
┌─────────────────────────────┐
│  INJECT LIGHT TRANSMISSIVE  │
│  POLYMER IN INJECTION MOLD  │
│  TO FORM LIGHT GUIDE LAYER  │
│   ON BACKER AND IN HOLES    │
└─────────────────────────────┘
              │
              ▼
┌─────────────────────────────┐
│   PROVIDE SUBSTRATE WITH    │
│       LIGHT SOURCE          │
└─────────────────────────────┘
              │
              ▼
┌─────────────────────────────┐
│   JOIN LIGHT GUIDE LAYER,   │
│  BACKER AND OUTER LAYER     │
│     TO SUBSTRATE WITH       │
│       LIGHT SOURCE          │
└─────────────────────────────┘
```

FIG. 61B

COMPONENT FOR VEHICLE INTERIOR

CROSS-REFERENCE TO RELATED APPLICATION

The present application is a continuation of PCT/International Patent Application No. PCT/US22/74495 titled "COMPONENT FOR VEHICLE INTERIOR" filed Aug. 3, 2022, which claims the benefit of: (a) U.S. Provisional Patent Application No. 63/229,440 titled "VEHICLE INTERIOR COMPONENT" filed Aug. 4, 2021; and (b) Chinese Patent Application No. 202111669900.1 filed Dec. 31, 2021.

The present application claims priority to and incorporates by reference in full the following patent applications: (a) U.S. Provisional Patent Application No. 62/748,183 titled "VEHICLE INTERIOR COMPONENT" filed Oct. 19, 2018; (b) U.S. Provisional Patent Application No. 62/808,290, titled "VEHICLE INTERIOR COMPONENT" filed Feb. 20, 2019, (c) PCT/International Patent Application No. PCT/US19/56373 titled "VEHICLE INTERIOR COMPONENT" filed Oct. 15, 2019; (d) U.S. patent application Ser. No. 17/230,949 titled "VEHICLE INTERIOR COMPONENT" filed Apr. 14, 2021; (e) PCT/International Patent Application No. PCT/US22/74495 titled "COMPONENT FOR VEHICLE INTERIOR" filed Aug. 3, 2022.

FIELD

The present invention relates to a vehicle interior component.

The present invention also relates to a vehicle interior component comprising formed hole formations provided in a set of formed hole formation segment based on a set of hole pattern segments and configured to present an image in an image presentation area on the cover when illuminated.

BACKGROUND

It is known to provide a vehicle interior component comprising a cover configured to present an image on the surface. It is also known to provide a vehicle interior component comprising a cover providing a decorative layer.

It would be advantageous to provide an improved vehicle interior component comprising a cover such as a decorative layer providing a surface configured to present an image in an illuminated state.

It would be advantageous to provide an improved vehicle interior component comprising a cover such as a decorative layer providing a surface configured to present an image in an illuminated state that facilitates viewing by an occupant of the vehicle.

It would be advantageous to provide an improved vehicle interior component comprising a cover such as a decorative layer providing a surface configured to present an image in an illuminated state that presents an acceptable visual effect when in a non-illuminated state.

It would be advantageous to provide an improved vehicle interior component comprising a cover such as a decorative layer providing a surface configured to present an image that can be formed to a backing and/or a light guide and with suitable structural/mechanical properties.

It would be advantageous to provide an improved vehicle interior component comprising formed hole formations provided in a set of formed hole formation segment based on a set of hole pattern segments and configured to present an image in an image presentation area on the cover when illuminated.

It would be advantageous to provide an improved vehicle interior component comprising a cover providing a decorative layer that provides a surface configured to provide a surface effect and with an image presentation area to present an image under an illumination state with improved functional/physical and optical performance.

SUMMARY

The present invention relates to a component for a vehicle interior with a visible surface intended to be visible to an occupant when the component is installed in the vehicle interior configured to be illuminated from a light source comprising a base; and a cover for the base comprising an exterior surface providing the visible surface and an interior surface. The cover may be configured to provide an image presentation area at the visible surface. The image presentation area of the cover may comprise a formed image presentation area for the exterior surface of the cover. The formed image presentation area may comprise at least one formed hole formation segment. Each formed hole formation segment may comprise at least one formed hole formation. Each formed hole formation segment may be based on a hole pattern segment. A formed hole formation of the formed hole formation segment may be based on a pattern hole of the hole pattern segment. The formed hole formation segment may comprise a rhomboid form generally corresponding to a rhomboid form of the hole pattern segment. The formed hole formation segment may comprise a formed hole formation with an irregular shape based a pattern hole of the hole pattern segment. The image presentation area of the cover may comprise a hole pattern at the interior surface of the cover. The image presentation area of the cover may comprise a pattern image area; the pattern image area of the cover may comprise a hole pattern at the interior surface of the cover; the hole pattern of the pattern image area may comprise at least one hole pattern segment. The image presentation area of the cover may comprise at least one formed hole formation at each formed hole formation segment in the formed image presentation area. Each formed hole formation segment may be based on a hole pattern segment for the image presentation area. The hole pattern segment may comprise a pattern hole with a regular shape; the formed hole formation segment may comprise a formed hole formation with an irregular shape; the irregular shape of the formed hole formation of the formed hole formation segment may be based on the regular shape of the pattern hole of the hole pattern segment. The formed hole formation segment may comprise at least one formed hole formation; each formed hole formation may be based on a hole segment of the hole pattern segment for the image presentation area. Each formed hole formation may comprise at least one opening through the cover comprising an opening at the exterior surface and at the interior surface of the cover. The image presentation area of the cover may comprise a pattern image area comprising a hole pattern comprising a hole pattern segment. The hole pattern segment may comprise a rhomboid form comprising a set of sides and a set of vertices and a set of pattern holes. The set of pattern holes may comprise at least one pattern hole and at least one pattern elongate hole. The set of pattern holes may comprise a pattern elongate hole and a pattern hole. The pattern elongate hole may comprise a symmetrical shape or a slot-like shape or a rectangle-like shape or an oblong shape. The formed hole formation area may comprise at least one formed hole formation segment; the at least one formed hole formation segment of the formed hole formation may generally correspond to at least one hole pattern segment of the hole pattern; the formed hole formation may comprise a formed hole formation segment formed according to the hole pattern segment. The formed hole may be formed by partial melting. The component may be formed by a method comprising the steps of (a) providing the pattern image area comprising the hole pattern comprising a set of hole pattern segments at the interior surface of the cover; (b) forming the formed image presentation area as a set of formed hole formation segments based on the hole pattern segments of the hole image presentation area for the exterior surface of the cover; the set of formed hole formation segments may comprise a set of formed hole formations formed by perforation through the cover; the set of formed hole formations may comprise a set of irregular-shaped formed hole formations.

The present invention relates to a method of producing a component comprising a cover with an interior surface and an exterior surface with an image presentation area comprising the steps of providing a pattern image area for the image presentation area comprising a hole pattern comprising a set of hole pattern segments at the interior surface of the cover; and forming a formed image presentation area as a set of formed hole formation segments for the exterior surface of the cover based on the hole pattern segments of the pattern image area for the interior surface of the cover. The set of formed hole formation segments may comprise a set of formed hole formations formed by perforation through the cover. The step of forming a formed image presentation area may comprise forming the set of formed hole formations by at least one of (a) melting material of the cover and/or (b) fusing material of the cover. The image presentation area of the cover may comprise the formed image presentation area for the exterior surface of the cover; each formed hole formation segment may be based on a hole pattern segment for the image presentation area. Each formed hole formation may be based on a hole segment of the hole pattern segment for the image presentation area. The formed hole formation segment may comprise a formed hole formation with an irregular shape. The irregular shape of the formed hole formation of the formed hole formation segment may be based on a shape of a pattern hole of the hole pattern segment. The shape of the pattern hole of the hole pattern segment may comprise a regular shape; the irregular shape of the formed hole formation of the formed hole formation segment may be based on the regular shape of the pattern hole of the hole pattern segment. The formed hole formation segment may comprise at least one formed hole formation with an irregular shape based on a pattern hole of the hole pattern segment; the formed hole formation segment may comprise at least one formed hole formation segment; the at least one formed hole formation segment of the formed image presentation area may generally correspond to at least one hole pattern segment of the hole pattern; the at least one formed hole formation may be formed according to the pattern hole of the hole pattern segment. The at least one formed hole formation may be formed by melting.

The present invention relates to a component for a vehicle interior with a visible surface intended to be visible to an occupant when the component is installed in the vehicle interior configured to provide illumination from a light source comprising a base; and a cover for the base comprising an exterior surface providing the visible surface and an interior surface and configured to provide an image at the visible surface. The image may comprise a formed image. The formed image may comprise a hole pattern at the interior surface of the cover. The hole pattern may comprise a hole pattern segment. The formed image may comprise a formed hole. The formed hole may be based on the hole pattern segment. The formed hole formation segment may comprise a formed hole formation with an irregular shape. The irregular shape of the formed hole formation of the formed hole formation segment may be based on a regular shape of a pattern hole of the hole pattern segment. The pattern hole may comprise at least one of a fully-symmetrical shape or a circle-like shape or a square-like shape or a diamond-like shape or a block-like shape or a symmetrical shape. The cover may comprise a decorative layer. The decorative layer may comprise a veneer; the veneer may comprise a natural material, a stone veneer, or a wood veneer.

The present invention relates to a component for a vehicle interior with a visible surface intended to be visible to an occupant when the component is installed in the vehicle interior configured to provide illumination from a light source comprising a base; and a cover coupled to the base and comprising a hole pattern. The cover may comprise an exterior surface providing the visible surface and an interior surface. The hole pattern may comprise at least one opening through the cover. Each of the at least one opening may comprise a hole on the exterior surface and a formed aperture on the interior surface. The hole may comprise a formed hole. The formed hole may have a shape different than the formed aperture. The formed hole may be formed by at least one of (a) melting; (b) bridging; (c) expansion; (d) burning.

The present invention relates to a method of manufacturing a vehicle trim component with a visible surface intended to be visible to an occupant when the component is installed in the vehicle interior comprising the steps of providing a cover; and laser-forming a hole pattern in the cover. The cover may comprise an exterior surface providing the visible surface and an interior surface. The hole pattern may comprise at least one opening through the cover. Each of the at least one opening may comprise a hole on the exterior surface and a formed aperture on the interior surface. The step of laser-forming a hole pattern in the cover may comprise providing at least one adjustment unit between the holes forming the visual contour and the at least one combined unit. Each adjustment unit may comprise at least one hole. The hole pattern may be based on a pattern hole comprising a regular shape; the hole pattern may comprise at least one hole comprising an irregular shape.

The present invention relates to a component for a vehicle interior with a visible surface intended to be visible to an occupant when the component is installed in the vehicle interior configured to provide illumination from a light source comprising a base and a cover for the base comprising an exterior surface providing the visible surface and an interior surface. The cover may be configured to provide an image presentation area at the visible surface. The image presentation area of the cover may comprise a formed image presentation area for the exterior surface of the cover. The formed image presentation area may comprise at least one formed hole formation segment. Each formed hole formation segment may comprise at least one formed hole formation. Each formed hole formation segment may be based on a hole pattern segment. The image presentation area of the cover may comprise each formed hole formation at each formed hole formation segment in the formed image presentation area. Each formed hole formation segment may be based on a hole pattern segment for the image presentation area. The image presentation area of the cover may comprise a hole pattern at the interior surface of the cover. The image presentation area of the cover may comprise a pattern image area; the pattern image area of the cover may comprise a hole pattern at the interior surface of the cover; the hole pattern of the pattern image area may comprise at least one hole pattern segment. The formed hole formation segment may comprise at least one formed hole formation; each formed hole formation may be based on a hole segment of the hole pattern segment for the image presentation area. Each formed hole formation may comprise at least one opening through the cover comprising an opening on the exterior surface and on the interior surface of the cover. The image presentation area of the cover may comprise a pattern image area comprising a hole pattern comprising a hole pattern segment. The pattern image area may comprise a hole pattern area comprising repetition of at least one hole pattern segment over the pattern image area. The hole pattern segment may comprise a rhomboid form comprising a set of sides and a set of vertices and a set of pattern holes. The set of sides may comprise a top side and a bottom side and a left side and a right side; the set of vertices may comprise an upper left vertex and an upper right vertex and lower left vertex and a lower right vertex. The set of pattern holes may comprise at least one pattern hole and at least one pattern elongate hole. The top side of the set of sides may be parallel to the bottom side of the set of sides; the left side of the set of sides may be parallel to the right side of the set of sides. The upper left vertex may be between the top side and the left side; the upper right vertex may be between the top side and the right side; the lower left vertex may be between the bottom side and the left side; the lower right vertex may be between the bottom side and the right side. The set of pattern holes may comprise a pattern elongate hole and a pattern hole. The set of pattern holes may comprise a pattern hole adjacent the lower right vertex. The pattern elongate hole may comprise a symmetrical shape. The pattern elongate hole may comprise a slot-like shape. The pattern elongate hole may comprise a rectangle-like shape. The pattern elongate hole may comprise an oblong shape. The pattern hole may comprise a regular shape. The pattern hole may comprise a fully-symmetrical shape. The pattern hole may comprise at least one of a circle-like shape or a square-like or a diamond-like shape or a block-like shape or a symmetrical shape. The hole pattern area may comprise a repeating set of hole pattern segments. The formed hole formation area may be formed generally corresponding to the hole pattern area. The formed hole formation area may comprise at least one formed hole formation segment; the at least one formed hole formation segment of the formed hole formation may generally correspond to at least one hole pattern segment of the hole pattern. The formed hole formation may comprise a formed hole formation segment formed according to the hole pattern segment. The formed hole formation segment may comprise a rhomboid form generally corresponding to a rhomboid form of the hole pattern segment. A formed hole formation of the formed hole formation segment may be based on a pattern hole of the hole pattern segment. A formed hole formation of the formed hole formation segment may comprise an irregular shape. A pattern hole of the hole pattern segment may comprise a regular shape; a formed hole formation of the formed hole formation segment may comprise an irregular shape. The formed hole formation segment based on the hole pattern segment may comprise a formed curved hole formation. The formed hole formation segment may comprise a formed curved hole formation generally corresponding to at least one pattern elongate hole of the hole pattern segment. The formed hole formation segment may comprise at least one formed hole formation generally corresponding to at least one pattern elongate hole of the hole pattern segment. The formed curved hole formation may comprise a generally continuous aperture. The formed hole formation segment may comprise a set of formed hole formations generally corresponding to the set of pattern holes. The formed image presentation area may be based on the pattern image area. The formed image presentation area may comprise the formed hole formation area. The formed hole formation area may comprise a formed hole formation segment formed by a laser according to the hole pattern segment. The formed hole formation area may comprise a formed hole formation segment formed as a set of apertures according to the hole pattern segment. The formed hole formation area may comprise a formed hole formation segment formed as a set of laser-formed apertures according to the hole pattern segment. The formed hole formation area may comprise a repeating arrangement of formed hole formation segments. The formed hole formation area may comprise a repeating arrangement of formed hole formation segments corresponding to a repeating arrangement of hole pattern segments. The image presentation area may be configured to provide an image presented by illumination. The hole pattern area may be configured so that illumination of the image is visible at a viewing angle. The cover may comprise a decorative layer. The decorative layer may comprise a veneer; the veneer may comprise a natural material, a stone veneer, or a wood veneer. The component may comprise a backing coupled to the decorative layer. The backing may comprise a backing layer configured to provide the interior surface of the cover for the hole pattern area. The formed hole formation may be formed through the backing layer. The formed hole formation may be formed by partial melting of the backing layer. The formed hole formation may be formed by bridging of the backing layer. The formed hole formation may be formed by fusing of the backing layer. The light source may be configured to provide illumination; the decorative layer may be configured to provide a visual effect. The light source may be configured to illuminate a light guide configured to provide a visual effect. A visual effect of the decorative layer and a visual effect of the light guide are configured to provide a composite visual effect. The visible surface may be configured for a first state providing the visual effect of the decorative layer and a second state providing the composite visual effect of the visual effect of the light guide and the visual effect of the decorative layer. The base may comprise an input device comprising at least one of (a) module; (b) a switch; (c) a sensor; (d) a capacitive switch; (e) a capacitive switch sensor. The base may comprise an input device aligned with the formed hole formation area. The light source may be configured to illuminate the formed hole formation area to illuminate the decorative layer to indicate a position of the input device. The image presentation area may comprise a user interface configured to at least one of (a) provide an outlet for light configured to provide illumination; (b) direct light to provide illumination at the visible surface. The image presentation area may comprise a pattern of holes configured to provide indicia. The component may comprise at least one of a trim panel; an armrest; a headliner; a dashboard; a console; a center console; a door panel; a steering wheel; a seat; a pillar; a roof pillar; pillar trim. The component may be formed by a method comprising the steps of (a) providing the pattern image area comprising the hole pattern comprising a set of hole pattern segments at the interior surface of the cover; (b) forming the formed image presentation area as a set of formed hole formation segments based on the hole pattern segments of the image presentation area for the exterior surface of the cover; the set of formed hole formation segments may comprise a set of formed hole formations formed by perforation through the cover. Perforation may comprise laser perforation. The set of formed hole formations may comprise a set of irregular-shaped formed hole formations. The set of hole pattern segments may comprise a set of rhombus-shaped segments. The set of hole pattern segments may comprise a set of rhombus-shaped segments comprising at least one pattern elongate hole. The set of formed hole formation segments may comprise the set of rhombus-shaped segments. The set of formed hole formation segments may comprise a set of rhombus-shaped segments comprising at least one formed curved hole formation.

The present invention relates to a method of producing a component comprising a cover with an interior surface and an exterior surface with an image presentation area comprising the steps of providing a pattern image area for the image presentation area comprising a hole pattern comprising a set of hole pattern segments at the interior surface of the cover and forming a formed image presentation area as a set of formed hole formation segments for the exterior surface of the cover based on the hole pattern segments of the pattern image area for the interior surface of the cover. The set of formed hole formation segments may comprise a set of formed hole formations formed by perforation through the cover. The method may comprise the step of operating a hole-forming tool to form the set of formed hole formations. The method may comprise the steps of determining a material for the cover and setting operating parameters forming the formed image presentation area with a hole-forming tool. The operating parameters comprise laser tool settings. The step of forming a formed image presentation area may comprise forming the set of formed hole formations by at least one of (a) melting material of the cover and/or (b) fusing material of the cover. Forming the set of formed hole formations at the set of formed hole formation segments may comprise fusing of a set of holes for each hole pattern segment to form the set of formed hole formations. The set of holes for each hole pattern segment may comprise a set of elongate holes; the set of formed hole formations may comprise a set of elongate formed hole formations. Forming the set of elongate formed hole formations may comprise fusing of the set of elongate holes of the hole pattern segment. The method may comprise the steps of determining an image for the image presentation area and determining the hole pattern for the image presentation area; the step of determining the hole pattern for the image presentation area may comprise setting the pattern image area. The pattern image area may comprise the set of hole pattern segments in a rhomboid shape. The method may comprise the step of determining a material for the cover and selecting the operating parameters for forming the formed image presentation area based on the material of the cover. The cover may comprise a composite structure and the material may comprise a first material for the interior surface and a second material for the exterior surface; the step of forming the formed image presentation area may comprise forming the set of formed hole formation through the first material and second material of the cover. The cover for the base may comprise the exterior surface providing a visible surface and the interior surface; the cover may be configured to provide the image presentation area at the visible surface. The image presentation area of the cover may comprise the formed image presentation area for the exterior surface of the cover; each formed hole formation segment may be based on a hole pattern segment for the image presentation area. The image presentation area of the cover may comprise a pattern image area; the pattern image area of the cover may comprise a hole pattern at the interior surface of the cover. Each formed hole formation may be based on a hole segment of the hole pattern segment for the image presentation area. The pattern image area may comprise a pattern image presentation area for the image presentation area.

The present invention relates to a component for a vehicle interior with a visible surface intended to be visible to an occupant when the component is installed in the vehicle interior configured to provide illumination from a light source comprising a base and a cover coupled to the base and comprising a hole pattern. The cover may comprise an exterior surface providing the visible surface and an interior surface. The hole pattern may comprise at least one opening through the cover. Each of the at least one opening may comprise a hole on the exterior surface and a formed aperture on the interior surface. The hole may comprise a formed hole; the formed hole may have a shape different than the formed aperture. The at least one opening may be formed by laser perforation of the cover from the interior surface through to the exterior surface. The hole may be smaller than the formed aperture. The formed aperture may be formed by at least one of (a) melting; (b) bridging; (c) expansion; (d) burning. The at least one opening may be configured to transmit illumination from the light source through the cover. The hole pattern may comprise an image for illumination; the hole pattern may be configured so that illumination of the image is visible at a viewing angle. The hole pattern may comprise a plurality of openings passing through the cover to form an exterior pattern comprising a plurality of holes on the exterior surface and an interior pattern comprising a plurality of formed apertures on the interior surface. The plurality of holes may be arranged corresponding to the desired contour to form a visible contour conforming with the desired contour. The holes forming the visible contour comprise holes arranged tangentially to the desired contour; the desired contour includes at least one of (1) an exterior contour of a closed region and (2) an exterior contour and an interior contour for a closed region. The plurality of holes may comprise at least one of circular holes, rounded square holes, semi-circular holes, elongated holes, elliptical holes, polygonal holes, star-shaped holes, heart-shaped holes, ring-shaped holes, fan-shaped holes, crescent-shaped holes, conical holes and tooth-shaped holes. The holes in the closed region comprise at least one combined unit, each combined unit being formed by combining a plurality of holes according to a predetermined arrangement mode. Each combined unit may comprise at least one elongated hole. The cover may comprise a decorative layer. The decorative layer may comprise a veneer. The veneer may comprise a natural material, a stone veneer, or a wood veneer. The decorative layer may comprise a backer configured to prevent illumination to pass from a light source to an outer surface of the decorative layer. The component may comprise a light guide formed within at least one opening of the decorative layer; the light guide may comprise a light-transmissive resin material formed in at least one opening of the decorative layer. The decorative layer may be configured to provide a visual effect; the light guide may be configured to provide a visual effect; the visual effect of the decorative layer and the visual effect of the light guide are configured to provide a composite visual effect.

The present invention relates to a method of manufacturing a vehicle trim component with a visible surface intended to be visible to an occupant when the component is installed in the vehicle interior comprising the steps of providing a cover and laser-forming a hole pattern in the cover. The cover may comprise an exterior surface providing the visible surface and an interior surface. The hole pattern may comprise at least one opening through the cover. Each of the at least one opening may comprise a hole on the exterior surface and a formed aperture on the interior surface. The hole pattern may comprise a plurality of openings passing through the cover to form an exterior pattern comprising a plurality of holes on the exterior surface and an interior pattern comprising a plurality of formed apertures on the interior surface. The plurality of holes may comprise at least one combined unit, each combined unit being formed by combining a plurality of holes according to a predetermined arrangement mode. The step of laser-forming a hole pattern in the cover may comprise providing at least one adjustment unit between the holes forming the visual contour and the at least one combined unit; each adjustment unit may comprise at least one hole. The formed aperture may comprise a design form; the design form may comprise at least one of a generally rectangular form or a generally square form or a form with rounded corners. The formed aperture is larger than the design form. The formed aperture may comprise an irregular form. The at least one opening may be formed by laser perforation of the cover from the interior surface through to the exterior surface. The hole may comprise a formed hole; the formed hole may have a shape different than the formed aperture. The formed aperture may be formed by melting and/or bridging and/or expansion and/or laser-perforation. The at least one opening may be configured to transmit illumination from the light source through the cover. The hole pattern may comprise an image for illumination. The cover may comprise a decorative layer. The decorative layer may comprise a veneer. The veneer may comprise a backing; the backing may comprise a backing layer configured to form the formed aperture. The cover may comprise a decorative layer; further comprising the steps of providing the decorative layer in a tool and forming the decorative layer into a shape. The method may comprise the steps of providing the decorative layer in a mold; injecting a resin in the mold to form a light guide in the at least one opening of the decorative layer; providing a base; and joining the decorative layer with the light guide to the base. The light guide may be configured to allow illumination to pass through the at least one opening of the decorative layer. The step of forming at least one opening in the decorative layer may comprise forming at least one opening in a backer to allow transmission of light through at least one opening in the backer. The backer may comprise at least one layer of backing material; the backing material may comprise a sheet material attached to the inner surface of the decorative layer.

The present invention relates to a component for a vehicle interior comprising a surface configured to be illuminated by a light source to present an interface for an occupant of the vehicle interior comprising a base; a cover layer coupled to the base and comprising a pattern of openings; and a light guide coupled to the cover layer. The light guide may comprise a set of projections configured to fit in the pattern of openings of the cover layer. The light guide may be configured to transmit illumination from the light source to present the interface through the pattern of openings of the cover layer. The pattern of openings may comprise at least one opening comprising a hole and a formed aperture. The cover layer may comprise a decorative layer for the surface; the decorative layer may comprise at least one of (a) a natural material; (b) a stone veneer; (c) a wood veneer; (d) a grained material; (e) a sheet material providing a surface effect. The pattern of openings may comprise at least one opening configured to at least one of (a) provide an outlet for light configured to provide illumination; (b) direct light to provide illumination. The pattern of openings may be configured to provide a display. The display may comprise at least one of a decorative region and an instrumentation region. The instrumentation region may comprise indicia identifying at least one vehicle control. The component may comprise a module configured to provide the light source and at least one sensor for the interface. The component may comprise a backer configured to reinforce the cover layer; the backer may comprise at least one backing layer. The backer may comprise the pattern of openings with formed apertures and holes so that illumination from the light source passes through the backer to the surface to provide the interface. The light guide may comprise a resin material formed as the set of projections in the pattern of openings. The cover layer may comprise a decorative layer configured to provide a visual effect; the light guide may be configured to provide a visual effect; the visual effect of the decorative layer and the visual effect of the light guide are configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state. The cover layer may comprise a decorative layer comprising a thickness generally between 0.005 inches and 0.05 inches.

The present invention relates to a component for a vehicle interior with a visible surface intended to be visible to an occupant when the component is installed in the vehicle interior configured to provide illumination from a light source comprising a base and a cover for the base comprising an exterior surface providing the visible surface and an interior surface and configured to provide an image at the visible surface. The image may comprise a formed image. The formed image may comprise a hole pattern at the interior surface of the cover. The hole pattern may comprise a hole pattern segment. The formed image hole pattern. The formed image may comprise a formed hole. The formed hole may be based on the hole pattern segment.

The present invention relates to a component for a vehicle interior with a visible surface intended to be visible to an occupant when the component is installed in the vehicle interior configured to provide illumination from a light source comprising a base and a cover for the base comprising an exterior surface providing the visible surface and an interior surface. The cover may be configured to provide an image presentation area at the visible surface. The image presentation area of the cover may comprise a formed image presentation area for the exterior surface of the cover. The formed image presentation area may comprise at least one formed hole formation segment. Each formed hole formation segment may comprise at least one formed hole formation. Each formed hole formation segment may be based on a hole pattern segment. The image presentation area of the cover may comprise each formed hole formation at each formed hole formation segment in the formed image presentation area. Each formed hole formation segment may be based on a hole pattern segment for the image presentation area. The image presentation area of the cover may comprise a hole pattern at the interior surface of the cover. The image presentation area of the cover may comprise a pattern image area. The pattern image area of the cover may comprise a hole pattern at the interior surface of the cover. The hole pattern of the pattern image area may comprise at least one hole pattern segment. The formed hole formation segment may comprise at least one formed hole formation. Each formed hole formation may be based on a hole segment of the hole pattern segment for the image presentation area. Each formed hole formation may comprise at least one opening through the cover; the formed hole formation may comprise an opening on the exterior surface and on the interior surface of the cover. The image presentation area of the cover may comprise a pattern image area comprising a hole pattern comprising a hole pattern segment. The pattern image area may comprise a hole pattern area comprising repetition of at least one hole pattern segment over the pattern image area. The hole pattern segment may comprise a rhomboid form comprising a set of sides and a set of vertices and a set of pattern holes. The set of sides may comprise a top side and a bottom side and a left side and a right side. The set of vertices may comprise an upper left vertex and an upper right vertex and lower left vertex and a lower right vertex. The set of pattern holes may comprise at least one pattern hole and at least one pattern elongate hole. The top side of the set of sides may be parallel to the bottom side of the set of sides. The left side of the set of sides may be parallel to the right side of the set of sides. The upper left vertex is between the top side and the left side; the upper right vertex is between the top side and the right side; the lower left vertex is between the bottom side and the left side; the lower right vertex is between the bottom side and the right side. The set of pattern holes may comprise a pattern elongate hole adjacent the bottom side. The set of pattern holes may comprise a pattern elongate hole adjacent the left side. The set of pattern holes may comprise a pattern elongate hole aligned with a line from the upper right vertex bisecting the top side and the right side. The set of pattern holes may comprise a pattern elongate hole aligned with a line from the upper right vertex transecting the top side and the right side. The set of pattern holes may comprise a pattern hole adjacent the lower right vertex. The pattern elongate hole may comprise a symmetrical shape. The pattern elongate hole may comprise a regular shape. The pattern elongate hole may comprise a slot. The pattern elongate hole may comprise a slot-like shape. The pattern elongate hole may comprise an oval-like shape. The pattern elongate hole may comprise a rectangle-like shape. The rectangle-like shape may comprise with rounded corners. The pattern elongate hole may comprise a capsule-like shape. The pattern elongate hole may comprise an oblong shape. The pattern hole may comprise a regular shape. The pattern hole may comprise a fully-symmetrical shape. The pattern hole may comprise a symmetrical shape. The pattern hole may comprise a generally circular shape. The pattern hole may comprise a generally block shape. The pattern hole may comprise a symmetrical shape comprising a circle or a square or a diamond. The pattern hole may comprise a circle-like shape or a square-like or a diamond-like shape. The square-like shape may comprise rounded corners. The upper left vertex of one hole pattern segment is horizontally positioned above the lower right vertex of an adjacent hole pattern segment. The upper right vertex of one hole pattern segment is horizontally positioned above the upper left vertex of an adjacent hole pattern segment. The hole pattern area may comprise a repeating set of hole pattern segments. The hole pattern area may comprise a repeating arrangement of hole pattern segments. The formed hole formation area may be formed generally corresponding to the hole pattern area. The formed hole formation area may comprise at least one formed hole formation segment. The at least one formed hole formation segment of the formed hole formation may generally correspond to at least one hole pattern segment of the hole pattern. The at least one formed hole formation segment may comprise a formed hole formation segment. The formed hole formation may comprise a formed hole formation segment formed according to the hole pattern segment. The formed hole formation segment may comprise a rhomboid form generally corresponding to the rhomboid form of the hole pattern segment. A formed hole formation of the formed hole formation segment may be based on a pattern hole of the hole pattern segment. A formed hole formation of the formed hole formation segment may comprise an irregular shape. A pattern hole of the hole pattern segment may comprise a regular shape; a formed hole formation of the formed hole formation segment may comprise an irregular shape. The formed hole formation segment based on the hole pattern segment may comprise a formed curved hole formation. The formed hole formation segment may comprise a formed curved hole formation generally corresponding to at least one pattern elongate hole of the hole pattern segment. The formed hole formation segment may comprise at least one formed hole formation generally corresponding to at least one pattern elongate hole of the hole pattern segment. The at least one pattern elongate hole of the hole pattern segment may comprise a set of pattern elongate holes. The formed hole formation segment may comprise at least one formed hole formation generally corresponding to the set of pattern elongate holes of the hole pattern segment. The at least one formed hole formation may comprise a formed curved hole formation. The at least one formed hole formation may comprise one formed curved hole formation. The formed curved hole formation may comprise a generally continuous aperture. The formed hole formation segment may comprise a set of formed hole formations generally corresponding to the set of pattern holes. The formed image presentation area may be based on the pattern image area. The formed image presentation area may comprise the formed hole formation area. The formed hole formation area may comprise a formed hole formation segment formed by a laser according to the hole pattern segment. The formed hole formation area may comprise a formed hole formation segment formed as a perforation by a laser according to the hole pattern segment. The formed hole formation area may comprise a formed hole formation segment laser-formed according to the hole pattern segment. The formed hole formation area may comprise a formed hole formation segment formed as a set of apertures according to the hole pattern segment. The formed hole formation area may comprise a formed hole formation segment formed as a set of laser-formed apertures according to the hole pattern segment. The formed hole formation area may comprise a formed hole formation segment formed as a set of laser-perforated apertures according to the hole pattern segment. The formed hole formation area may comprise a formed hole formation segment formed as a set of fused apertures according to the hole pattern segment. The formed hole formation area may comprise a formed hole formation segment formed as a set of melted apertures according to the hole pattern segment. The formed hole formation area may comprise a formed hole formation segment formed as a set of burned apertures according to the hole pattern segment. The formed hole formation area may comprise a repeating set of formed hole formation segments. The formed hole formation area may comprise a repeating set of formed hole formation segments corresponding to a repeating set of hole pattern segments. The formed hole formation area may comprise a repeating arrangement of formed hole formation segments. The formed hole formation area may comprise a repeating arrangement of formed hole formation segments corresponding to a repeating arrangement of hole pattern segments. The image presentation area may be configured to provide an image presented by illumination. The hole pattern area is configured so that illumination of the image is visible at a viewing angle. The viewing angle is measured from perpendicular to the surface of the cover or from tangent to the surface of the cover. The cover may comprise a decorative layer. The decorative layer may comprise a veneer. The veneer may comprise a natural material, a stone veneer, or a wood veneer. The component may comprise a backing coupled to the decorative layer. The backing may comprise a backing layer configured to provide the interior surface of the cover for the hole pattern area. The formed hole formation may be formed by melting of the backing layer. The formed hole formation may be formed by partial melting of the backing layer. The formed hole formation may be formed by bridging of the backing layer. The formed hole formation may be formed by fusing of the backing layer. The light source may be configured to provide illumination; the decorative layer may be configured to provide a visual effect. The light source may be configured to illuminate a light guide configured to provide a visual effect. The visual effect of the decorative layer and the visual effect of the light guide are configured to provide a composite visual effect. The visible surface may be configured for a first state providing the visual effect of the decorative layer and a second state providing the composite visual effect of the visual effect of the light guide and the visual effect of the decorative layer. The base may comprise an input device comprising at least one of (a) module; (b) a switch; (c) a sensor; (d) a capacitive switch; (e) a capacitive switch sensor. The base may comprise an input device aligned with the formed hole formation area. The light source may be configured to illuminate the formed hole formation area to illuminate the decorative layer to indicate a position of the input device. The at least one opening may be configured to at least one of (a) provide an outlet for light configured to provide illumination; (b) direct light to provide illumination at the visible surface. The at least one opening may comprise a pattern of holes configured to provide indicia identifying at least one vehicle control. The component may comprise at least one of a trim panel; an armrest; a headliner; a dashboard; a console; a center console; a door panel; a steering wheel; a seat; a pillar; a roof pillar; pillar trim. The component may be formed by a method comprising the steps of (a) providing the pattern image area comprising the hole pattern comprising a set of hole pattern segments at the interior surface of the cover; (b) forming the formed image presentation area as a set of formed hole formation segments based on the hole pattern segments of the image presentation area for the exterior surface of the cover; the set of formed hole formation segments may comprise a set of formed hole formations formed by perforation through the cover. Perforation may comprise laser perforation. The set of formed hole formations may comprise a set of irregular-shaped formed hole formations. The step of forming the formed image presentation area as a set of formed hole formation segments based on the hole pattern segments of the image presentation area for the exterior surface of the cover may comprise laser-forming formed hole formations through the interior surface of the cover. The formed image presentation area of the cover may comprise the set of formed hole formations in at the interior surface of the cover. The set of hole pattern segments may comprise a set of rhombus-shaped segments. The set of hole pattern segments may comprise a set of rhombus-shaped segments comprising at least one pattern elongate hole. The set of formed hole formation segments may comprise the set of rhombus-shaped segments. The set of formed hole formation segments may comprise a set of rhombus-shaped segments comprising at least one formed curved hole formation.

The present invention relates to a method of producing a component comprising a cover with an interior surface and an exterior surface with an image presentation area comprising the steps of providing a pattern image area for the image presentation area comprising a hole pattern comprising a set of hole pattern segments at the interior surface of the cover; forming a formed image presentation area as a set of formed hole formation segments for the exterior surface of the cover based on the hole pattern segments of the pattern image area for the interior surface of the cover. The set of formed hole formation segments may comprise a set of formed hole formations formed by perforation through the cover. The method may comprise the step of operating a hole-forming tool to form the set of formed hole formations. The hole-forming tool may comprise a laser tool. The method may comprise the steps of determining a material for the cover and setting operating parameters forming the formed image presentation area with the hole-forming tool. The operating parameters may comprise laser tool settings. The laser tool settings comprise output amplitude and/or time and/or power. The step of forming a formed image presentation area may comprise forming the set of formed hole formations by at least one of (a) melting material of the cover and/or (b) fusing material of the cover. Forming the set of formed hole formations at the set of formed hole formation segments may comprise fusing of a set of holes for each hole pattern segment to form the set of formed hole formations. The set of holes for each hole pattern segment may comprise a set of elongate holes; the set of formed hole formations may comprise a set of elongate formed hole formations. Forming the set of elongate formed hole formations may comprise fusing of the set of elongate holes of the hole pattern segment. The method may comprise the steps of determining an image for the image presentation area and determining the hole pattern for the image presentation area. The step of determining the hole pattern for the image presentation area may comprise setting the pattern image area. The pattern image area may comprise the set of hole pattern segments in a rhomboid shape. The method may comprise the step of determining a material for the cover and selecting the operating parameters for forming the formed image presentation area based on the material of the cover. The cover may comprise a composite structure and the material may comprise a first material for the interior surface and a second material for the exterior surface. The step of forming the formed image presentation area may comprise forming the set of formed hole formation through the first material and second material of the cover. The step of forming the formed image presentation area may comprise forming the set of formed hole formation through a material of the cover. The cover may be provided on a base; the cover for the base may comprise the exterior surface providing a visible surface and the interior surface; the cover may be configured to provide the image presentation area at the visible surface. The image presentation area of the cover may comprise the formed image presentation area for the exterior surface of the cover. Each formed hole formation segment may be based on a hole pattern segment for the image presentation area. The image presentation area of the cover may comprise a hole pattern at the interior surface of the cover. The image presentation area of the cover may comprise a pattern image area. The pattern image area of the cover may comprise a hole pattern at the interior surface of the cover. The hole pattern of the pattern image area may comprise at least one hole pattern segment. The formed hole formation segment may comprise at least one formed hole formation. Each formed hole formation may be based on a hole segment of the hole pattern segment for the image presentation area. The pattern image area may comprise a pattern image presentation area for the image presentation area. Each formed hole formation may comprise at least one opening through the cover; the formed hole formation may comprise an opening on the exterior surface and on the interior surface of the cover. The method may comprise the step of assembling the cover with a base to provide the component.

The present invention relates to a component for a vehicle interior with a surface intended to be visible to an occupant when the component is installed in the vehicle interior configured to provide illumination from a light source comprising a base and a cover coupled to the base comprising a hole pattern. The cover may comprise an exterior surface providing the surface and an interior surface. The hole pattern may comprise at least one opening through the cover. Each at least one opening may comprise a hole on the exterior surface and a formed aperture on the interior surface. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of a perforation of the backing layer. The formed aperture may be formed by partial burning of the backing layer. The cover may comprise a decorative layer. The component may comprise a light guide coupled to the decorative layer; the light guide may comprise a first portion configured to fill the at least one opening in the decorative layer. The light guide may comprise a light pipe. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The decorative layer may comprise a stone veneer. The component may comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one opening may be configured to at least one of (a) provide an outlet for light configured to provide illumination; (b) direct light to provide illumination at the surface. The at least one opening may comprise a pattern of holes configured to provide indicia identifying at least one vehicle control. The decorative layer may comprise a backer configured to prevent illumination to pass from a light source to an outer surface of the decorative layer. The component may comprise a light guide formed within the at least one opening of the decorative layer. The light guide may comprise a light-transmissive resin material formed in the at least one opening of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one opening may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

The present invention relates to a method of manufacturing a vehicle trim component comprising the steps of providing a cover and laser-forming a hole pattern in the cover. The cover may comprise an exterior surface providing the surface and an interior surface. The hole pattern may comprise at least one opening through the cover. Each at least one opening may comprise a hole on the exterior surface and a formed aperture on the interior surface. The formed aperture may comprise a design form. The design form may comprise a generally rectangular form. The design form may comprise a generally square form. The design form may comprise rounded corners. The formed aperture may be larger than the design form. The formed aperture may comprise an irregular form. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of perforations in the backing layer. The formed aperture may be formed by partial burning of the backing layer. The pattern may comprise a set of holes and a set of formed apertures. The cover may comprise a decorative layer. The method may comprise the steps of providing the decorative layer in a tool and forming the decorative layer into a shape. The cover may comprise a decorative layer. The method may comprise the steps of providing the decorative layer in a mold, injecting a resin in the mold to form a light guide in the at least one opening of the decorative layer, providing a base and joining the decorative layer with the light guide to the base. The light guide may be configured to allow illumination to pass through the at least one opening of the decorative layer. Forming the at least one opening may comprise perforating the decorative layer with a laser. The method may comprise the step of applying a backer to an inner surface of the decorative layer. The backer may comprise a barrier configured to prevent transmission of light. The step of forming at least one opening in the decorative layer may comprise forming at least one opening in the backer to allow transmission of light through the at least one opening in the backer. The backer may comprise at least one layer of backing material. The backing material may comprise a sheet material attached to the inner surface of the decorative layer.

The present invention relates to a component for a vehicle interior comprising a surface configured to be illuminated by a light source to present an interface for an occupant of the vehicle interior comprising a base, a cover layer coupled to the base comprising a pattern of openings and a light guide coupled to the cover layer. The light guide may comprise a set of projections configured to fit in the pattern of openings of the cover layer. The light guide may be configured to transmit illumination from the light source to present the interface through the pattern of openings of the cover layer. The pattern of openings may comprise at least one opening comprising a hole and a formed aperture. The cover layer may comprise a decorative layer for the surface; the decorative layer may comprise at least one of (a) a natural material; (b) a stone veneer; (c) a wood veneer; (d) a grained material; (e) a sheet material providing a surface effect. The pattern of openings may comprise at least one opening configured to at least one of (a) provide an outlet for light configured to provide illumination; (b) direct light to provide illumination. The pattern of openings may be configured to provide a display. The display may comprise at least one of a decorative region and an instrumentation region. The instrumentation region may comprise indicia identifying at least one vehicle control. The component may comprise a module configured to provide the light source and at least one sensor for the interface. The component may comprise a backer configured to reinforce the cover layer. The backer may comprise at least one backing layer. The backer may comprise the pattern of openings with formed apertures and holes so that illumination from the light source passes through the backer to the surface to provide the interface. The backer may be configured to prevent illumination from the light source to an outer surface of the decorative layer other than at the pattern of openings. The light guide may comprise a light-transmissive resin material. The light guide may comprise a resin material formed as the set of projections in the pattern of openings. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state. The cover layer may comprise a decorative layer comprising a thickness generally between 0.005 inches and 0.05 inches.

The present invention relates to a component for a vehicle interior with a visible surface intended to be visible to an occupant when the component is installed in the vehicle interior configured to provide illumination from a light source to provide the occupant with an illuminated desired contour. The component may comprise a base and a cover coupled to the base and comprising a hole pattern. The cover may comprise an exterior surface providing the visible surface and an interior surface. The hole pattern may comprise at least one opening through the cover. Each of the at least one opening may comprise a hole on the exterior surface and a formed aperture on the interior surface. The hole pattern may comprise a plurality of openings passing through the cover to form an exterior pattern comprising a plurality of holes on the exterior surface and an interior pattern comprising a plurality of formed apertures on the interior surface. The plurality of holes may include at least one or a combination of circular holes, rounded square holes, semi-circular holes, elongated holes, elliptical holes, polygonal holes, star-shaped holes, heart-shaped holes, ring-shaped holes, fan-shaped holes, crescent-shaped holes, conical holes and tooth-shaped holes, by addition or subtraction. The plurality of holes may correspond to the desired contour to form a visible contour conforming with the desired contour. When the holes forming the visible contour are circular holes, the circular holes may be tangent to the desired contour. When the holes forming the visible contour are elongated holes, the elongated holes may be provided with exterior long sides overlapping the desired contour. When the visible contour comprises a sharp corner, the sharp corner is formed by at least one of: (1) at least two intersecting elongated holes; and (2) polygonal holes. The desired contour may include at least one of: (1) an exterior contour delimiting a closed region alone; and (2) an exterior contour and an interior contour delimiting a closed region together. A plurality of holes may be in the closed region, and the plurality of holes include at least one or a combination of circular holes, rounded square holes, semi-circular holes, elongated holes, elliptical holes, polygonal holes, star-shaped holes, heart-shaped holes, ring-shaped holes, fan-shaped holes, crescent-shaped holes, conical holes and tooth-shaped holes, by addition or subtraction. The holes in the closed region may comprise at least one combined unit, each combined unit being formed by combining a plurality of holes according to a predetermined arrangement mode. Each combined unit may comprise at least one elongated hole. The elongated hole may be an oblong hole, and the at least one combined unit may include at least one first combined unit comprising two oblong holes having a length direction at an included angle of 20 deg-80 deg to each other and/or at least one second combined unit comprising one oblong hole and one circular hole in an extension line of a length direction of the oblong hole and/or at least one third combined unit consisting of at least one first combined unit and at least one second combined unit. A length of the oblong hole may be equal to 1.5-3 times a diameter of the circular hole, and/or a width of the oblong hole may be equal to the diameter of the circular hole. An aperture between adjacent holes may be equal to 0-5 mm. An area of a single hole may be set to 0.0007-10 sq mm. When the hole is a circular hole, the area of the hole may be set to 0.0007-0.8 sq mm. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of a perforation of the backing layer. The formed aperture may be formed by partial burning of the backing layer. The cover may comprise a decorative layer. The component may comprise a light guide coupled to the decorative layer; the light guide may comprise a first portion configured to fill the at least one opening in the decorative layer. The light guide may comprise a light pipe. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The decorative layer may comprise a stone veneer. The component may comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one opening may be configured to at least one of (a) provide an outlet for light configured to provide illumination; (b) direct light to provide illumination at the surface. The at least one opening may comprise a pattern of holes configured to provide indicia identifying at least one vehicle control. The decorative layer may comprise a backer configured to prevent illumination to pass from a light source to an outer surface of the decorative layer. The component may comprise a light guide formed within the at least one opening of the decorative layer. The light guide may comprise a light-transmissive resin material formed in the at least one opening of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one opening may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

The present invention relates to a method of manufacturing a vehicle trim component with a visible surface intended to be visible to an occupant when the component is installed in the vehicle interior, configured to provide illumination from a light source to provide the occupant with an illuminated desired contour. The method may comprise the steps of providing a cover and laser-forming a hole pattern in the cover. The cover may comprise an exterior surface providing the visible surface and an interior surface. The hole pattern may comprise at least one opening through the cover. Each of the at least one opening may comprise a hole on the exterior surface and a formed aperture on the interior surface. The hole pattern may comprise a plurality of openings passing through the cover to form an exterior pattern comprising a plurality of holes on the exterior surface and an interior pattern comprising a plurality of formed apertures on the interior surface; a step comprises disposing the plurality of holes corresponding to the desired contour to form a visible contour conforming with the desired contour. The desired contour may include at least one of: (1) an exterior contour delimiting a closed region alone; and (2) an exterior contour and an interior contour delimiting a closed region together; a step further comprises disposing a plurality of holes in the closed region. The holes in the closed region may comprise at least one combined unit, each combined unit being formed by combining a plurality of holes according to a predetermined arrangement mode; a step may further comprise disposing at least one adjustment unit between the holes forming the visual contour and the at least one combined unit, each adjustment unit comprising at least one hole. The formed aperture may comprise a design form. The design form may comprise a generally rectangular form. The design form may comprise a generally square form. The design form may comprise rounded corners. The formed aperture may be larger than the design form. The formed aperture may comprise an irregular form. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of perforations in the backing layer. The formed aperture may be formed by partial burning of the backing layer. The pattern may comprise a set of holes and a set of formed apertures. The cover may comprise a decorative layer. The method may comprise the steps of providing the decorative layer in a tool and forming the decorative layer into a shape. The cover may comprise a decorative layer. The method may comprise the steps of providing the decorative layer in a mold, injecting a resin in the mold to form a light guide in the at least one opening of the decorative layer, providing a base and joining the decorative layer with the light guide to the base. The light guide may be configured to allow illumination to pass through the at least one opening of the decorative layer. Forming the at least one opening may comprise perforating the decorative layer with a laser. The method may comprise the step of applying a backer to an inner surface of the decorative layer. The backer may comprise a barrier configured to prevent transmission of light. The step of forming at least one opening in the decorative layer may comprise forming at least one opening in the backer to allow transmission of light through the at least one opening in the backer. The backer may comprise at least one layer of backing material. The backing material may comprise a sheet material attached to the inner surface of the decorative layer.

The present invention relates to a component for a vehicle interior comprising a surface configured to be illuminated by a light source to present an interface for an occupant of the vehicle interior comprising a base, a cover layer coupled to the base comprising a pattern of openings and a light guide coupled to the cover layer. The light guide may comprise a set of projections configured to fit in the pattern of openings of the cover layer. The light guide may be configured to transmit illumination from the light source to present the interface through the pattern of openings of the cover layer. The pattern of openings may comprise at least one opening comprising a hole and a formed aperture. The cover layer may comprise a decorative layer for the surface; the decorative layer may comprise at least one of (a) a natural material; (b) a stone veneer; (c) a wood veneer; (d) a grained material; (e) a sheet material providing a surface effect. The pattern of openings may comprise at least one opening configured to at least one of (a) provide an outlet for light configured to provide illumination; (b) direct light to provide illumination. The pattern of openings may be configured to provide a display. The display may comprise at least one of a decorative region and an instrumentation region. The instrumentation region may comprise indicia identifying at least one vehicle control. The component may comprise a module configured to provide the light source and at least one sensor for the interface. The component may comprise a backer configured to reinforce the cover layer. The backer may comprise at least one backing layer. The backer may comprise the pattern of openings with formed apertures and holes so that illumination from the light source passes through the backer to the surface to provide the interface. The backer may be configured to prevent illumination from the light source to an outer surface of the decorative layer other than at the pattern of openings. The light guide may comprise a light-transmissive resin material. The light guide may comprise a resin material formed as the set of projections in the pattern of openings. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state. The cover layer may comprise a decorative layer comprising a thickness generally between 0.005 inches and 0.05 inches.

FIGURES

FIGS. 14A and 14B are schematic cut-away section views of a panel of a component for a vehicle interior according to an exemplary embodiment.

FIG. 14C is a schematic cut-away section view of a panel of a component for a vehicle interior according to an exemplary embodiment.

FIGS. 28A and 28B are schematic rear partial views of a component for a vehicle interior according to an exemplary embodiment.

FIGS. 29A and 29B are schematic partial front views of a component for a vehicle interior according to an exemplary embodiment.

FIGS. 40A through 40C are schematic diagrams of a pattern at a surface of a component for a vehicle interior according to an exemplary embodiment.

FIG. 61B is a schematic flow diagram of a method to produce a component for a vehicle interior according to an exemplary embodiment.

DESCRIPTION

Figures 1A, 1B, 2A, 2B, 2C, 3A, 3B, 3C, 3D:
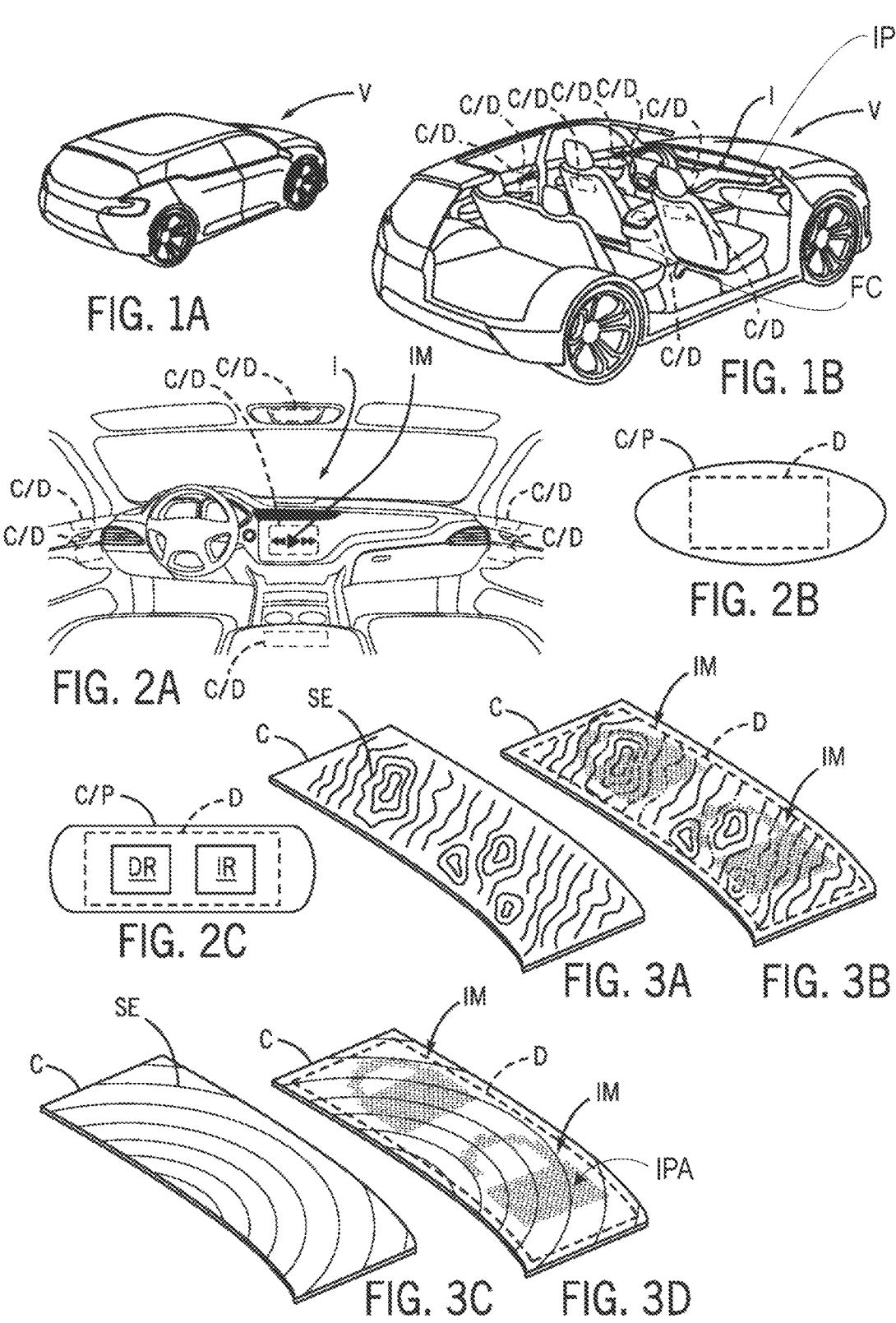
FIG. 1A is a schematic perspective view of a vehicle according to an exemplary embodiment.
FIG. 1B is a schematic perspective cut-away view of a vehicle showing an interior according to an exemplary embodiment.
FIG. 2A is a schematic rear cut-away view of a vehicle showing an interior according to an exemplary embodiment.
FIG. 2B is a schematic diagram of a component for a vehicle interior comprising a display according to an exemplary embodiment.
FIG. 2C is a schematic cut-away plan view of a component for a vehicle interior comprising a display according to an exemplary embodiment.
FIGS. 3A and 3B are schematic perspective views of a component for a vehicle interior according to an exemplary embodiment.
FIGS. 3C and 3D are schematic perspective views of a component for a vehicle interior according to an exemplary embodiment.
Figures 3E, 3F, 3G, 3H, 3I, 3J:
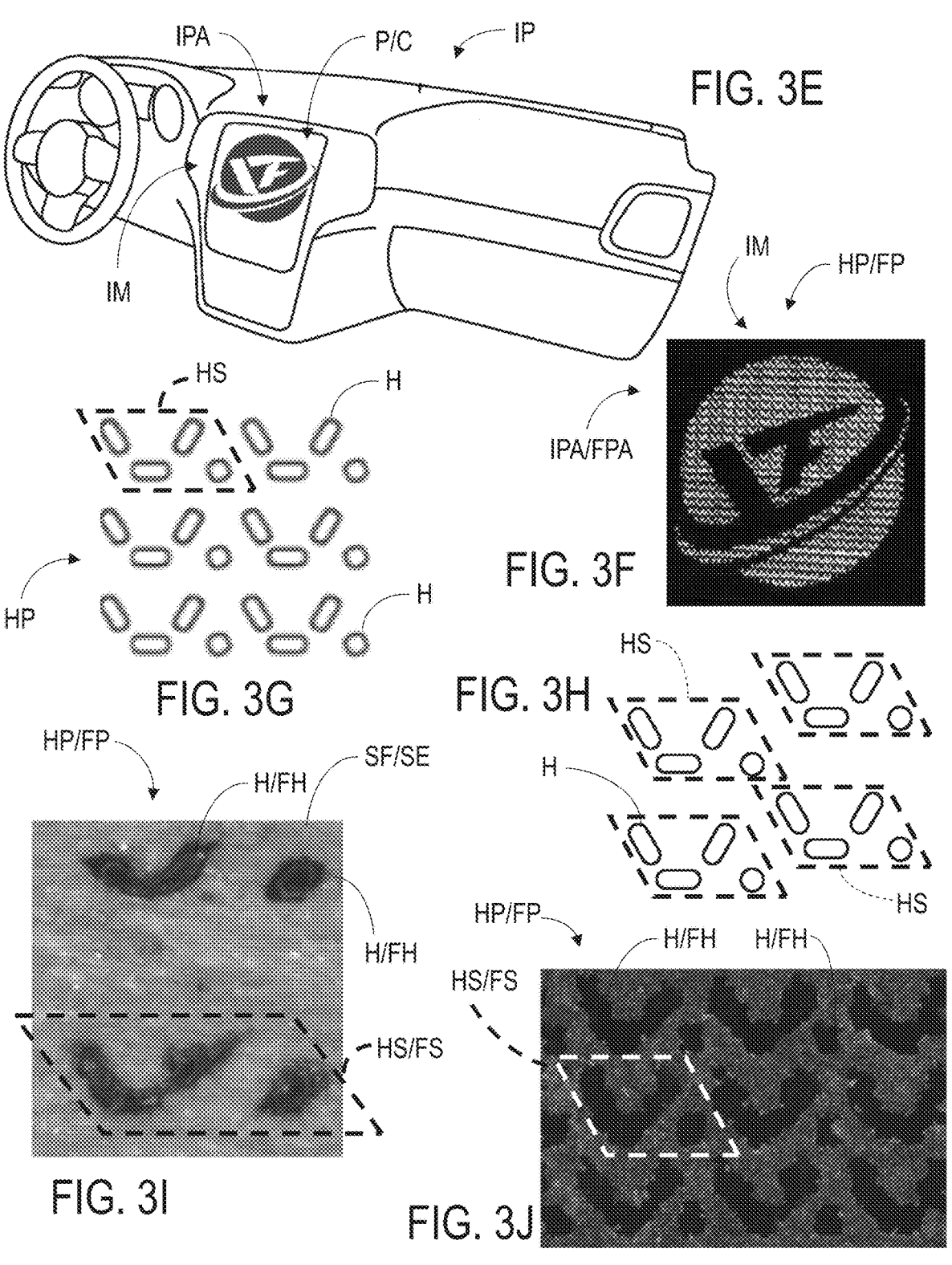
FIG. 3E is a schematic perspective view of a component for a vehicle interior shown as an instrument panel according to an exemplary embodiment.
FIG. 3F is a schematic diagram of an image at a surface of a component for a vehicle interior according to an exemplary embodiment.
FIGS. 3G through 3J are schematic diagrams of a pattern at a surface of a component for a vehicle interior according to an exemplary embodiment.

Referring to FIGS. 1A-1B and 2A, a vehicle V is shown schematically with an interior I according to an exemplary embodiment; the vehicle interior I comprises components such as a trim/trim panels such as instrument panel IP and door panel DP and armrest AR, consoles such as floor console FC, etc. See also FIGS. 3E, 20, 21 and 36.

Figures 43A, 43B, 43C:
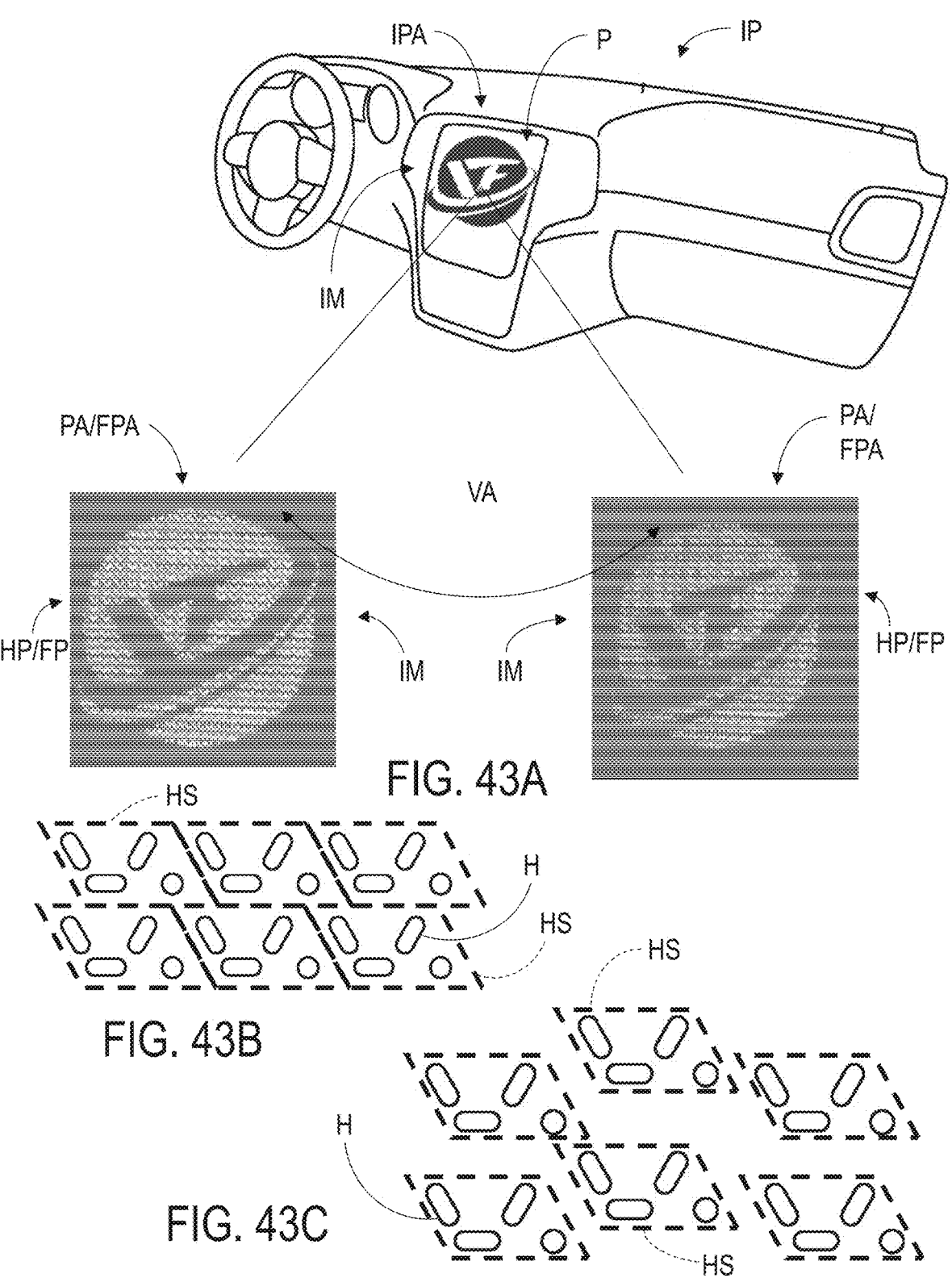
FIG. 43A is a schematic perspective composite view of a component for a vehicle interior shown as an instrument panel with display according to an exemplary embodiment.
FIGS. 43B and 43C are schematic diagrams of a pattern at a surface of a component for a vehicle interior according to an exemplary embodiment.
Figures 44A, 44B:
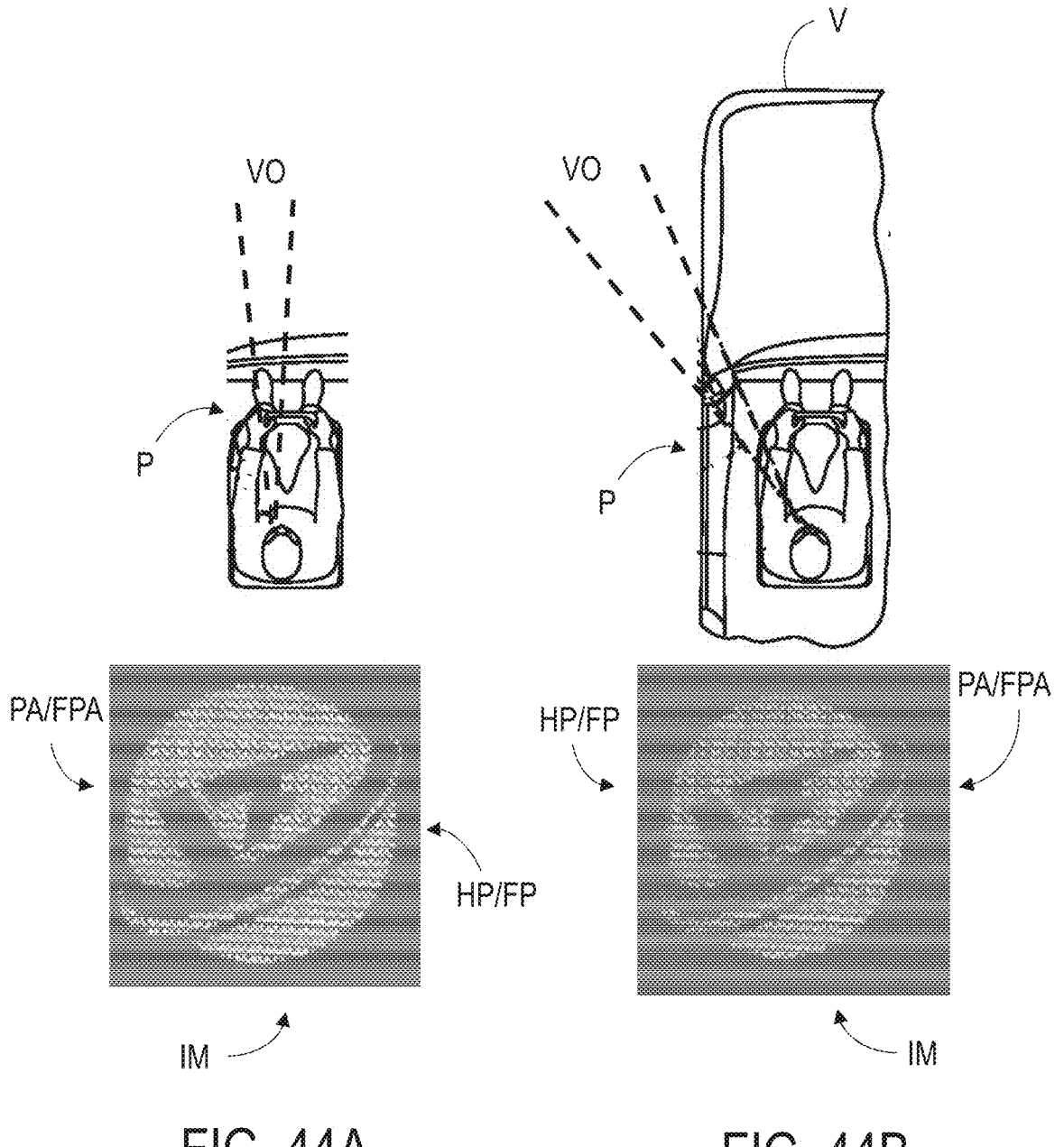
FIG. 44A is a schematic top composite view of a vehicle interior with the component with display according to an exemplary embodiment.
FIG. 44B is a schematic top composite view of a vehicle interior with the component with display according to an exemplary embodiment.
Figures 45A, 45B:
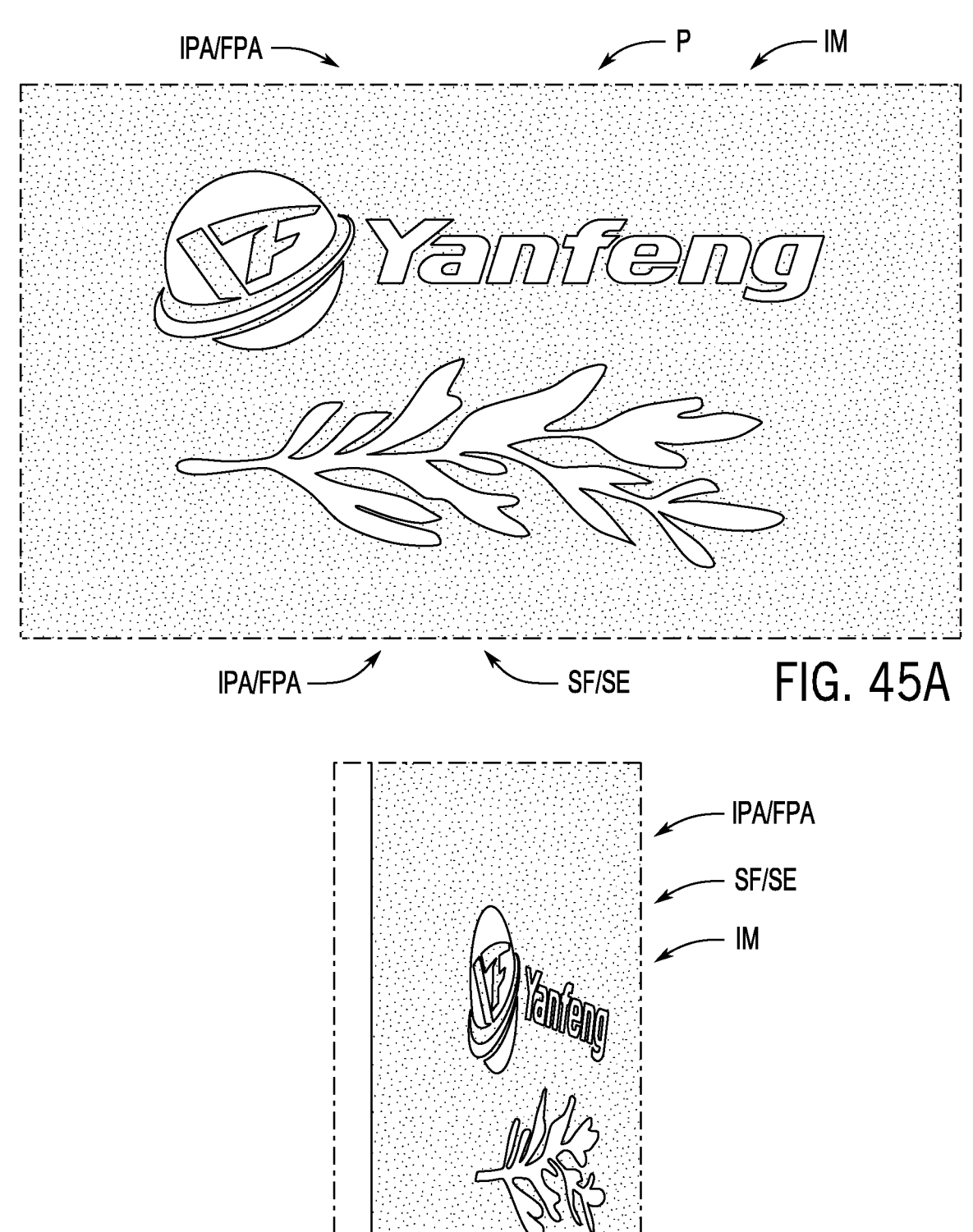
FIGS. 45A through 45B are schematic diagrams of an image at a surface of a component for a vehicle interior according to an exemplary embodiment.
Figures 46A, 46B, 46C:
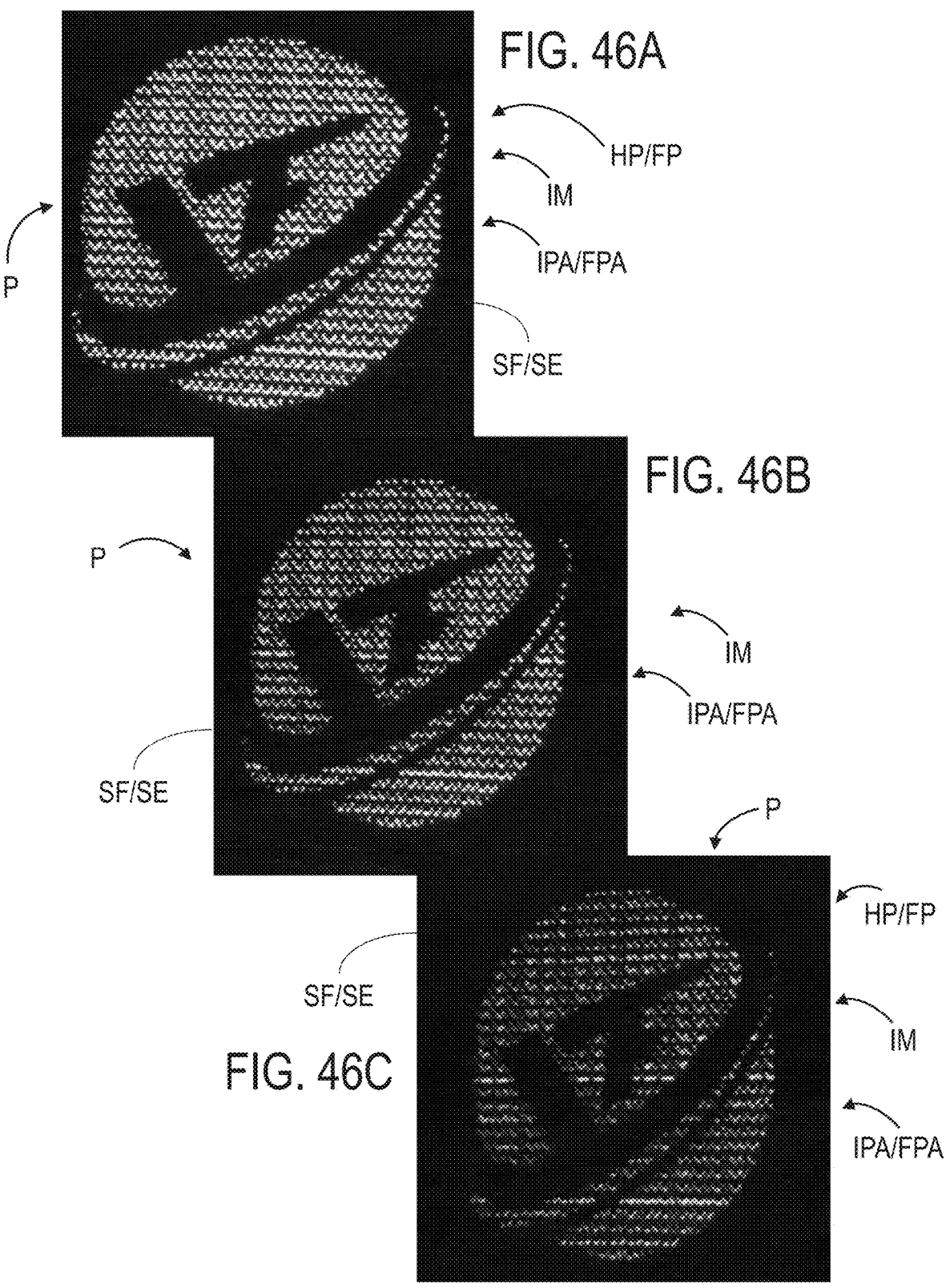
FIGS. 46A through 46C are schematic diagrams of an image at a surface of a component for a vehicle interior according to an exemplary embodiment.
Figures 47A, 47B, 47C, 47D, 47E:
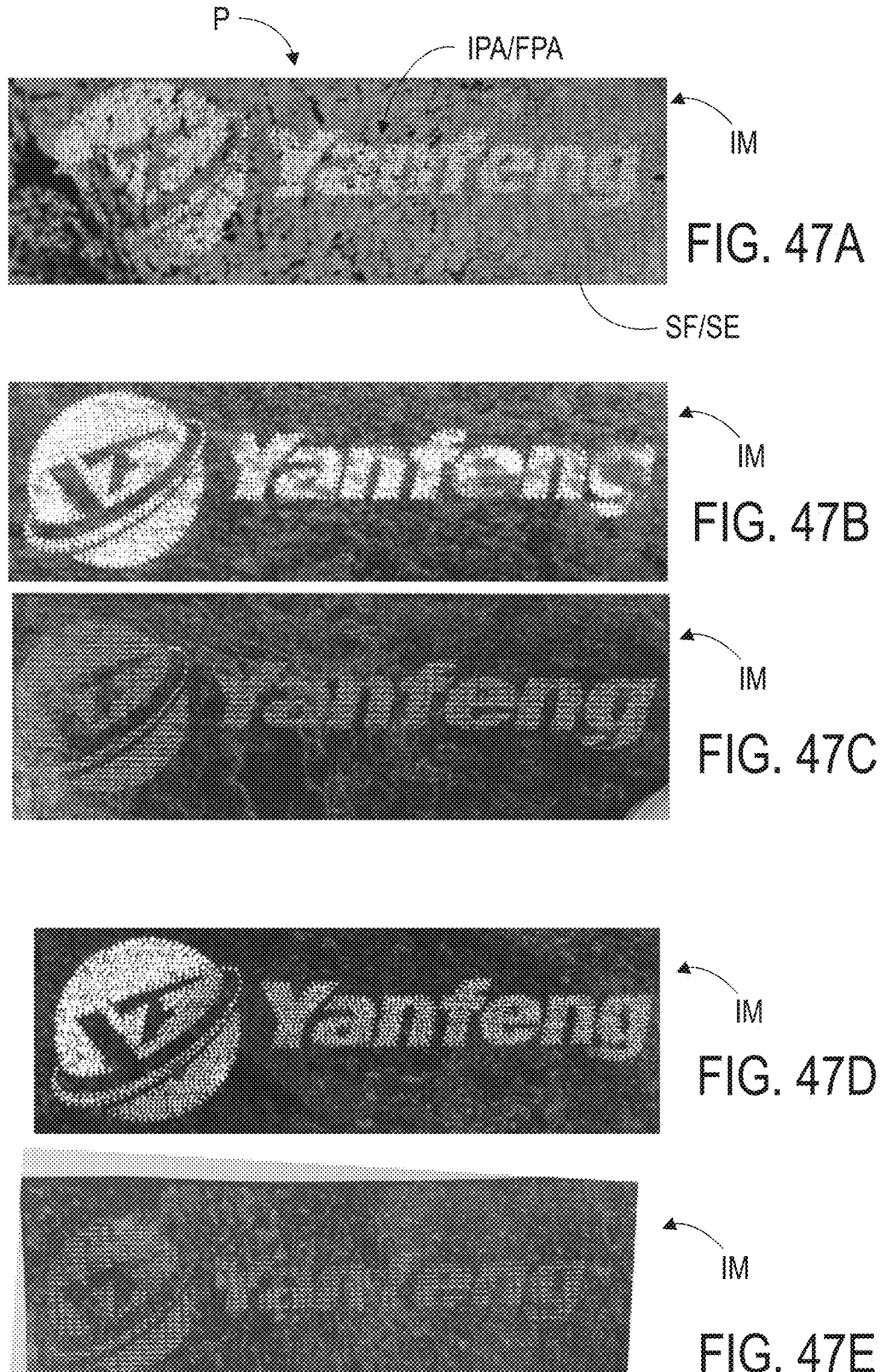
FIGS. 47A through 47K are schematic diagrams of an image at a surface of a component for a vehicle interior according to an exemplary embodiment.
Figures 47F, 47G, 47H, 47I, 47J, 47K:
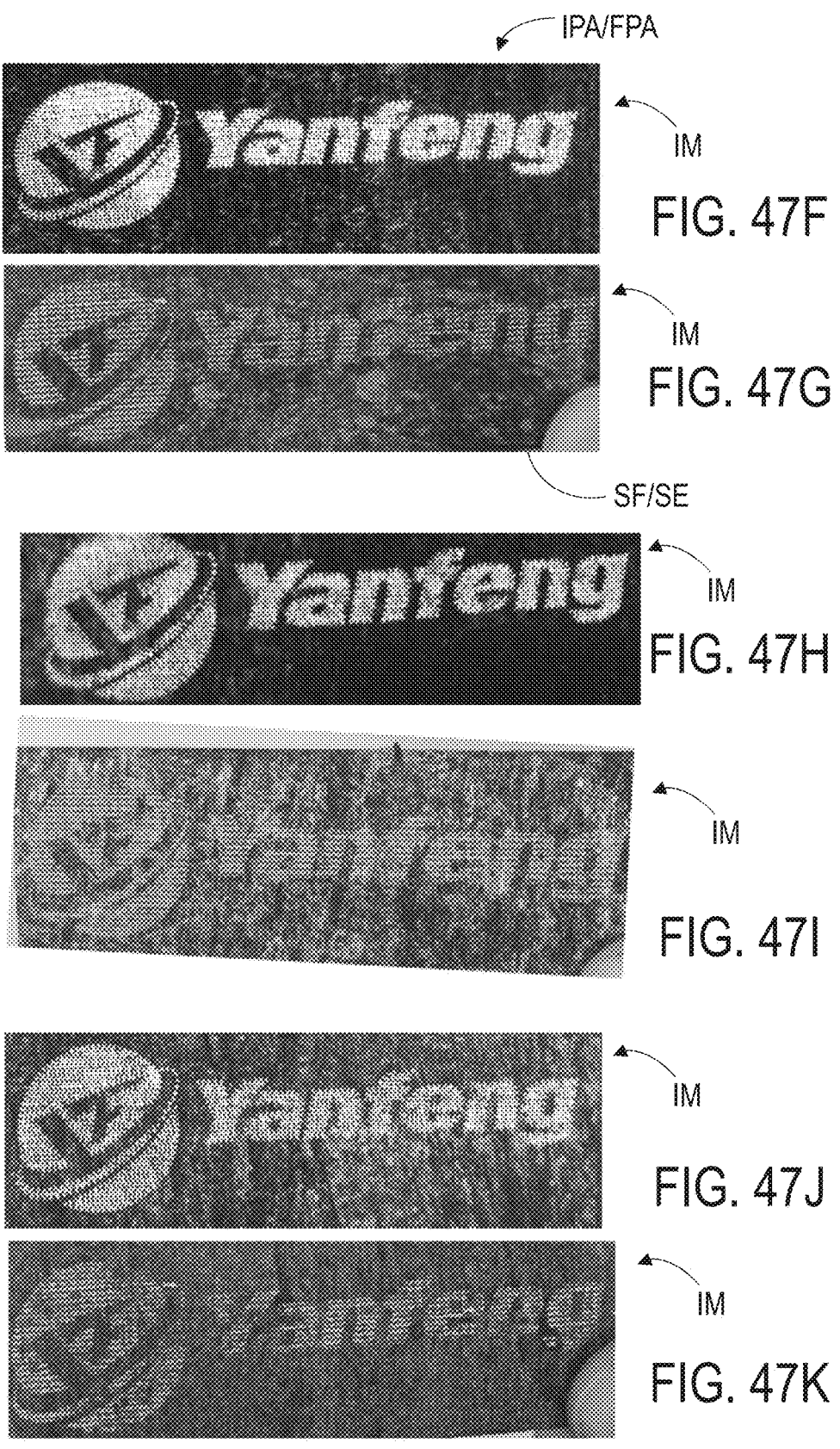
Figures 48A, 48B:
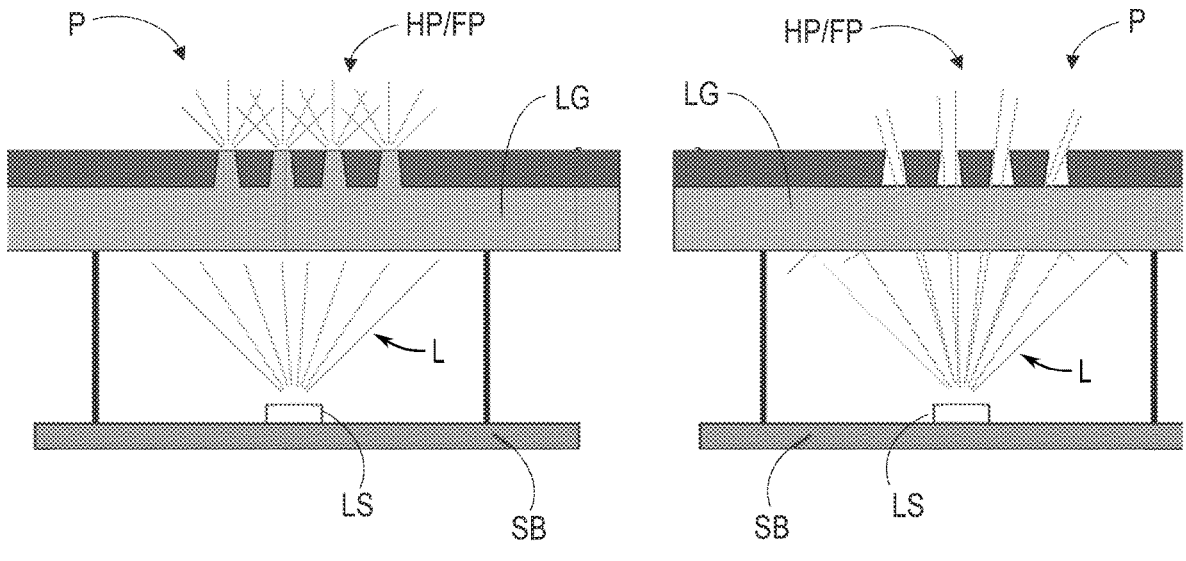
FIGS. 48A through 48B are schematic cross-section views of a component for a vehicle interior according to an exemplary embodiment.
Figure 49A:
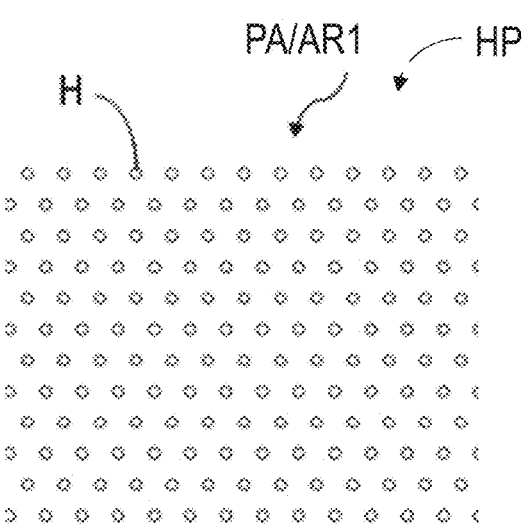
FIGS. 49A through 49D are schematic diagrams of a pattern at a surface of a component for a vehicle interior according to an exemplary embodiment.
Figure 49B:
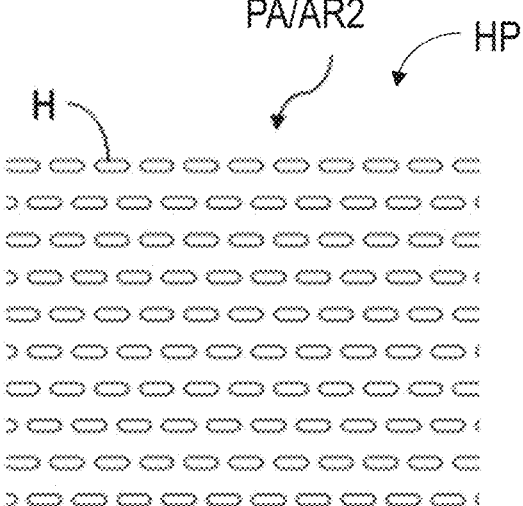
Figure 49C:
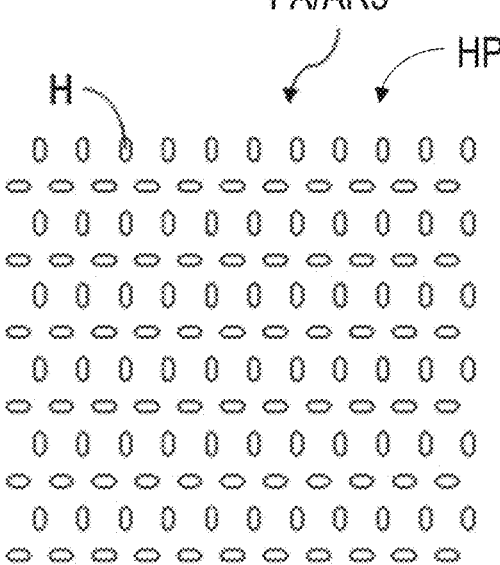
Figure 49D:
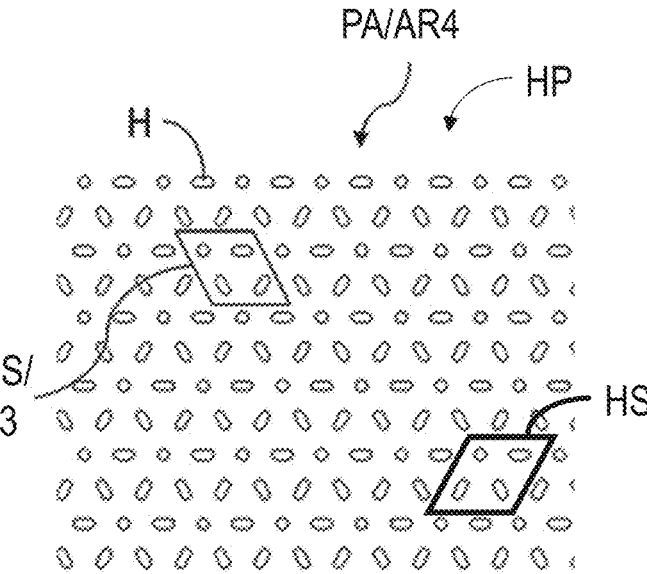

According to an exemplary embodiment as shown schematically in FIGS. 1B, 2A-2C, 3A-3E and 36, a component C/P may comprise a display D configured for presentation of an image IM at an image presentation area IPA. See also FIGS. 43A and 44A-44B.

According to an exemplary embodiment as shown in FIGS. 2A-2C, 3A-3J, 4A-4C, 5A-5D, 6, 6A-6D, 7, 10A-10C, 11A-11C, 12A-12C, 13A-13B, 14A-14C, 22, 23, 24, 35A-35B and 36, the component/part C/P may comprise a composite structure providing a display D configured to present an image IM (such as may comprise an image shape SH) at an image presentation area IPA (such as may comprise a decorative region DR and an instrumentation region IR and/or as may provide a user interface) at a visible surface SF such as the external surface of a cover T providing a surface effect SE; the cover T may comprise the external surface and an internal surface comprising a backing (such as may comprise one or more backing layers); the display D may be operated by a light source/light LS/L (such as an LED array, display panel, monitor, etc.) with a control system such as provided by a module M (such as with a processor, controller, etc.); the image presentation area IPA of the cover T providing the display D for presentation of the image IM may comprise a pattern area PA comprising holes H provided in a form/arrangement such as hole pattern HP comprising a set/unit of hole pattern segments HS; the holes H may be formed in the cover T as formed hole formations FH through the internal surface/backing BL and to the external surface SF to provide a formed image presentation area FPA for the image presentation area IPA; the formed image presentation area FPA may comprise formed hole formations FH provided in the form/arrangement such as a formed hole formation pattern FP (generally corresponding to hole pattern HP) comprising a set/unit of formed hole formation segments FS (generally corresponding to hole pattern segments HS); holes H of the hole pattern HP and hole pattern segment HS may comprise a generally regular form/shape (such as holes Ha/Hb/Hc/Hd); formed hole formations FH of the formed hole formation pattern FP and formed hole formation segment FS may comprise a generally irregular form/shape (such as formed hole formations FHe/FHr); the pattern area PA of hole pattern HP comprising hole pattern segments HS may be arranged to provide the image IM for image presentation area IPA of the display D; the set of formed hole formations FH of the formed hole formation segments FS of the formed hole formation pattern FP the formed image presentation area FPA for image presentation area IPA will be formed corresponding to pattern area PA such that image IM can be presented at the display D (when illuminated by light source/light LS/L and/or operated by module M). See also FIGS. 25A-25D, 26, 27A-27B, 28A-28B, 29A-29B, 30A-30C, 31A-31C, 37A-37B, 38A-38B, 39A-39C, 40A-40C, 41A-41B, 42A-42B, 48A-48B, 49A-49D, 50, 51, 52, 53, 54, 55A-55B, 56, 57, 58, 59 and 60.

According to an exemplary embodiment as shown in FIGS. 2A-2C, 3A-3J, 4A-4C, 5A-5D, 6, 6A-6D, 7, 10A-10B, 13A-13B and 22, the component/part C/P comprises a composite structure providing a display D configured to present an image IM (such as may comprise an image shape SH) at an image presentation area IP (such as may comprise a decorative region DR and an instrumentation region IR and/or as may provide a user interface) at a visible surface SF such as the external surface of a cover T; the composite structure of the cover T may comprise a substrate S/SB; the component/part C/P may comprise a base B for the cover T. See also FIGS. 35A-35C, 36 and 37.

According to an exemplary embodiment as shown in FIGS. 9A-9G, 17A-17C and 19A-19C, the composite structure of the cover T may comprise the external surface and an internal surface comprising a backing (such as may comprise one or more backing layers); the backing for the internal surface may comprise a set of backing layers BL.

Figures 6, 6A, 6B, 6C, 6D, 7:
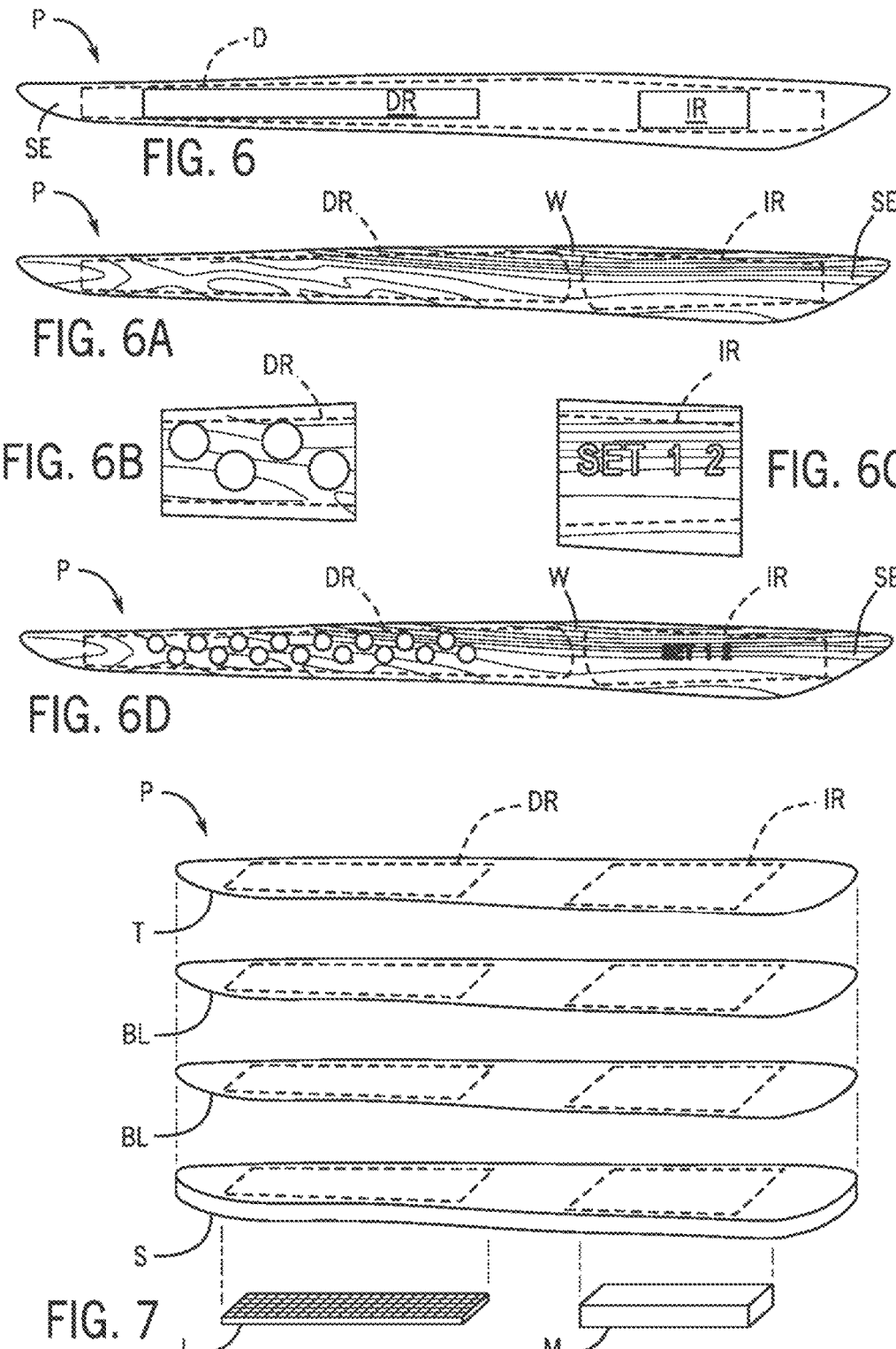
FIG. 6 is a schematic plan view of a component for a vehicle interior according to an exemplary embodiment.
FIG. 6A is a schematic plan view of a component for a vehicle interior according to an exemplary embodiment.
FIG. 6B is a schematic cut-away plan view of a component for a vehicle interior according to an exemplary embodiment.
FIG. 6C is a schematic cut-away plan view of a component for a vehicle interior according to an exemplary embodiment.
FIG. 6D is a schematic plan view of a component for a vehicle interior according to an exemplary embodiment.
FIG. 7 is a schematic exploded view of a component for a vehicle interior according to an exemplary embodiment.
Figures 20, 21, 22, 23, 24:
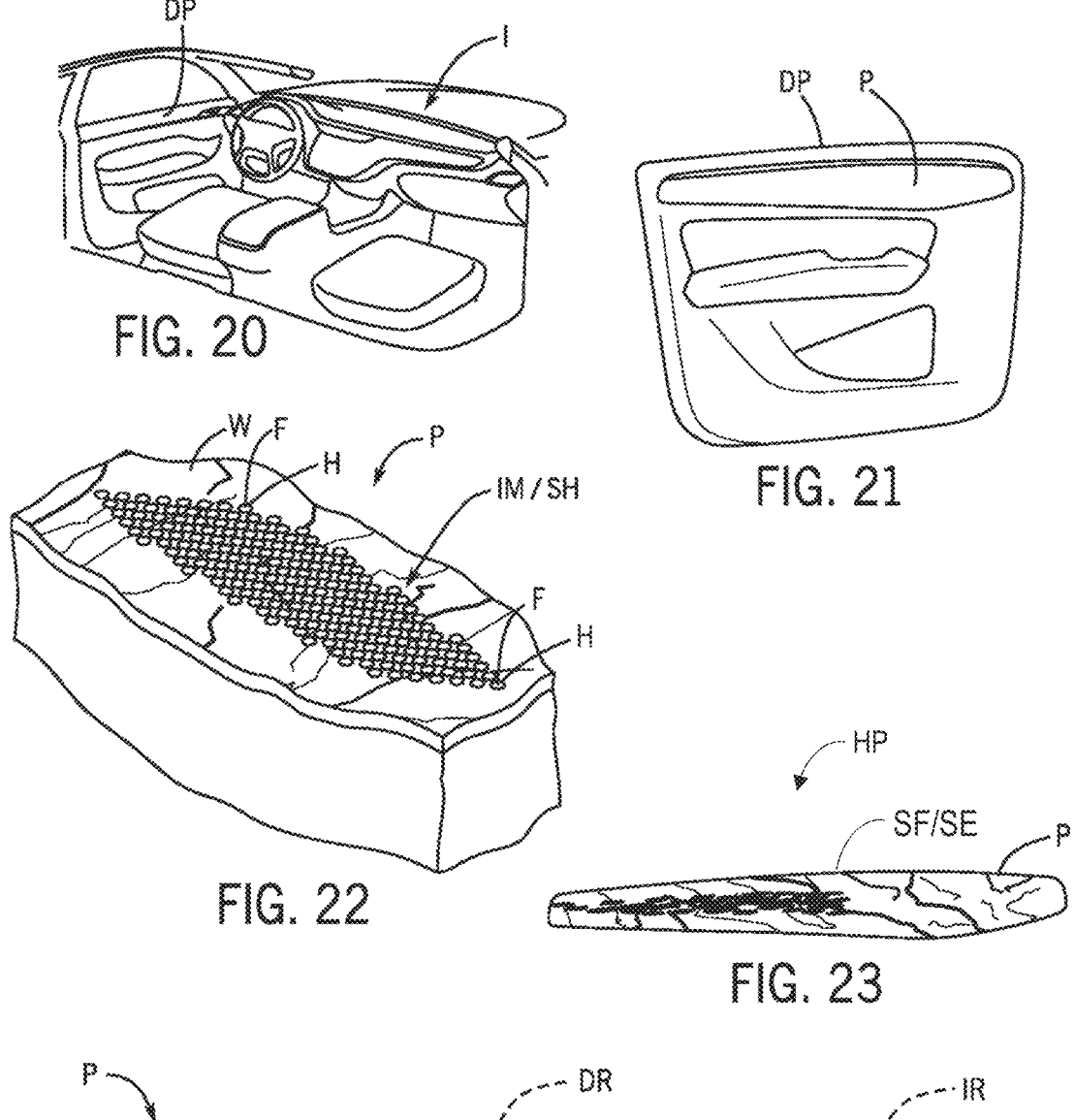
FIG. 20 is a schematic perspective view of a vehicle interior according to an exemplary embodiment.
FIG. 21 is a schematic perspective view of a door panel for a vehicle interior according to an exemplary embodiment.
FIG. 22 is a schematic partial perspective view of a component for a vehicle interior according to an exemplary embodiment.
FIG. 23 is a schematic front plan view of a component for a vehicle interior according to an exemplary embodiment.
FIG. 24 is a schematic exploded perspective view of a component for a vehicle interior according to an exemplary embodiment.
Figures 25A, 25B, 25C, 25D:
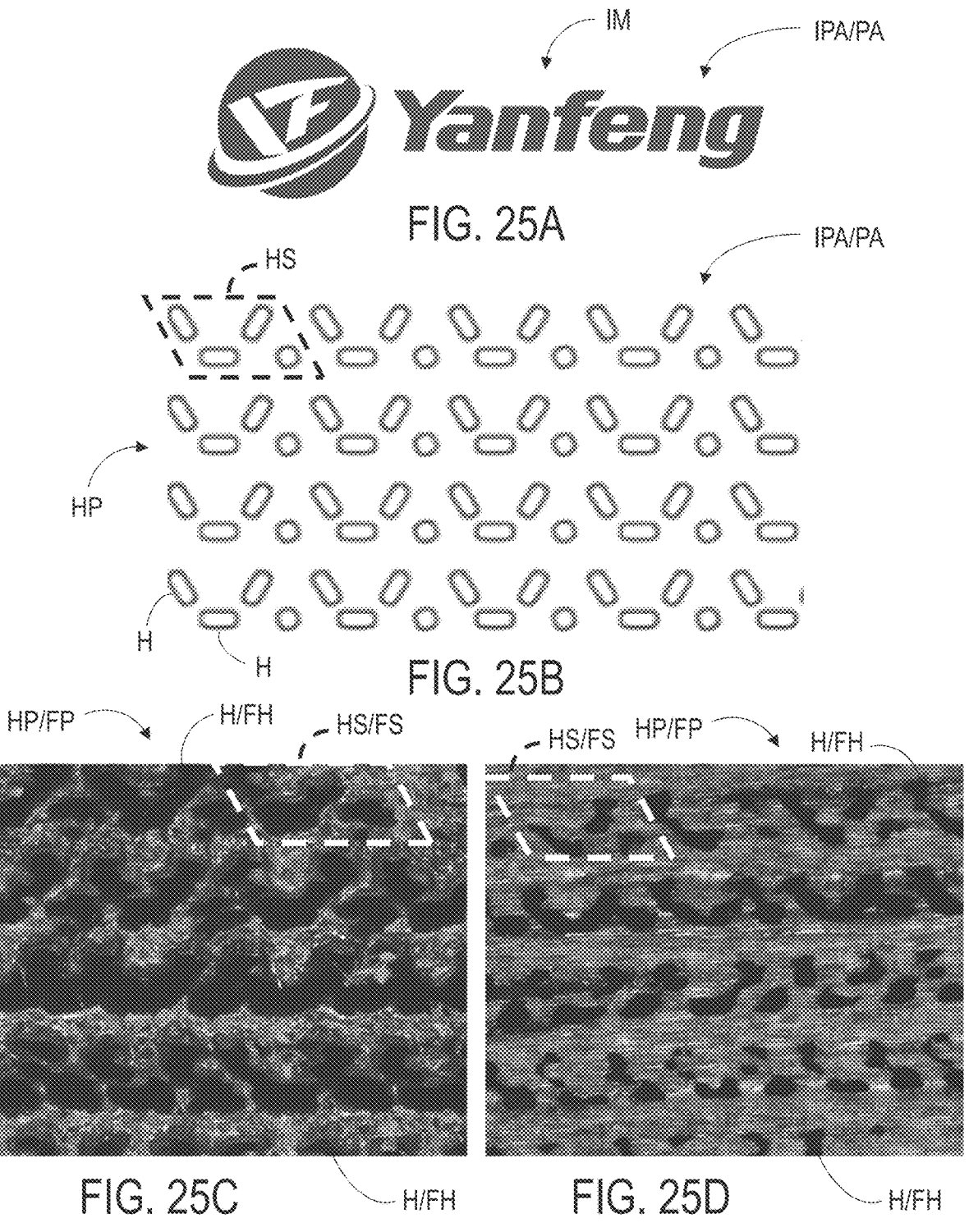
FIG. 25A is a schematic diagram of an image for a component for a vehicle interior according to an exemplary embodiment.
FIG. 25B is a schematic diagram of a hole pattern/arrangement for a panel of a component for a vehicle interior according to an exemplary embodiment.
FIG. 25C is a schematic partial rear view of a component for a vehicle interior according to an exemplary embodiment.
FIG. 25D is a schematic partial front view of a component for a vehicle interior according to an exemplary embodiment.
Figures 26, 27A, 27B:
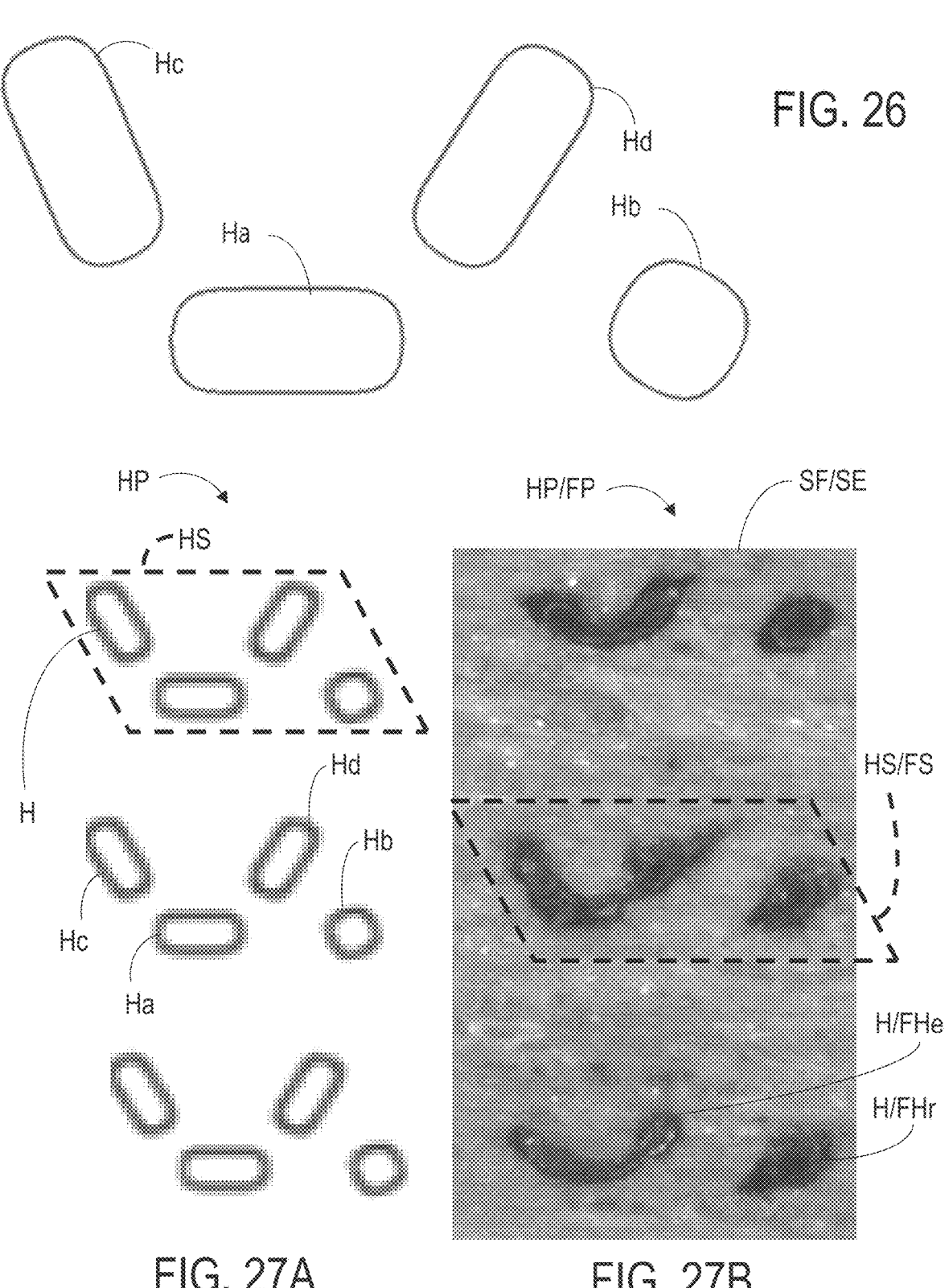
FIG. 26 is a schematic diagrams of a hole pattern/arrangement for a panel of a component for a vehicle interior according to an exemplary embodiment.
FIG. 27A is a schematic diagrams of a hole pattern/arrangement for a panel of a component for a vehicle interior according to an exemplary embodiment.
FIG. 27B is a schematic partial front view of a component for a vehicle interior according to an exemplary embodiment.
Figure 28A:
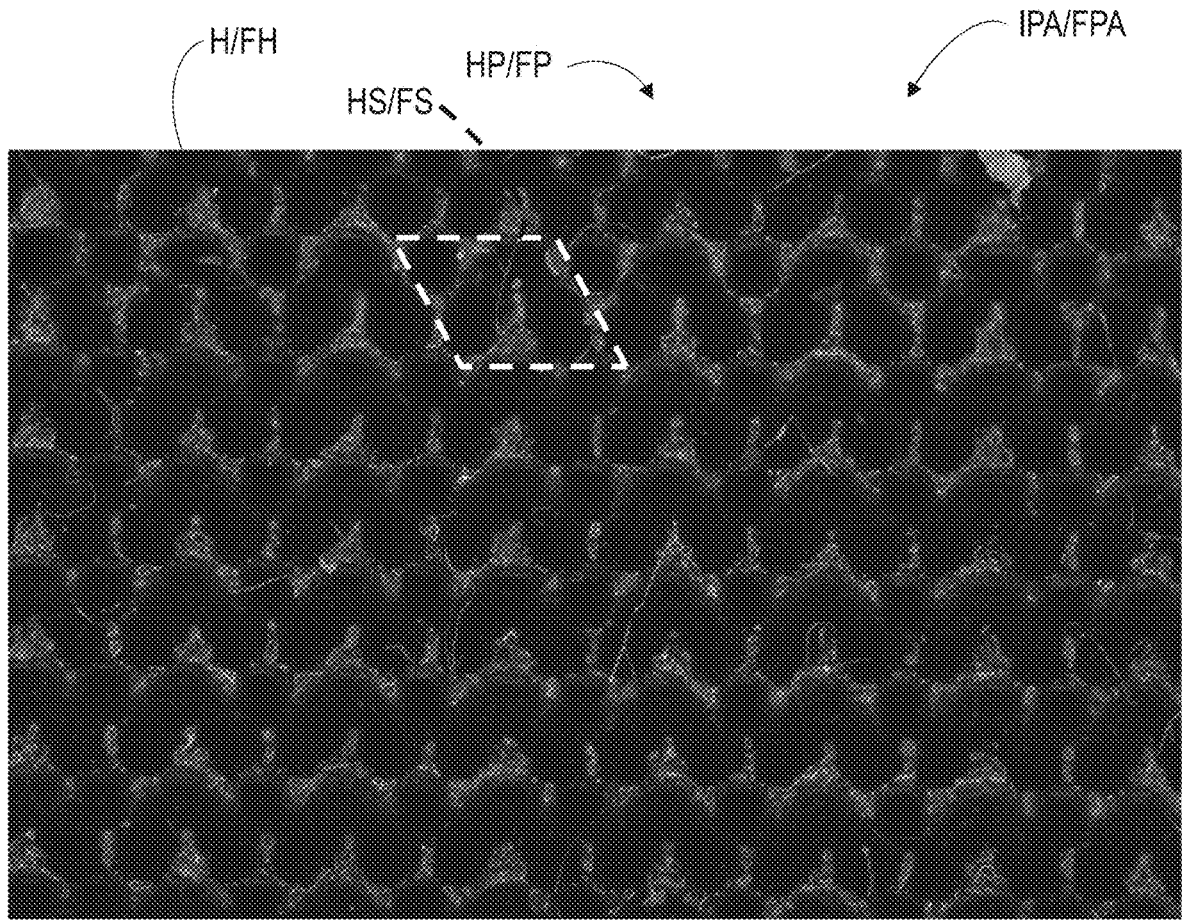
Figure 29A:
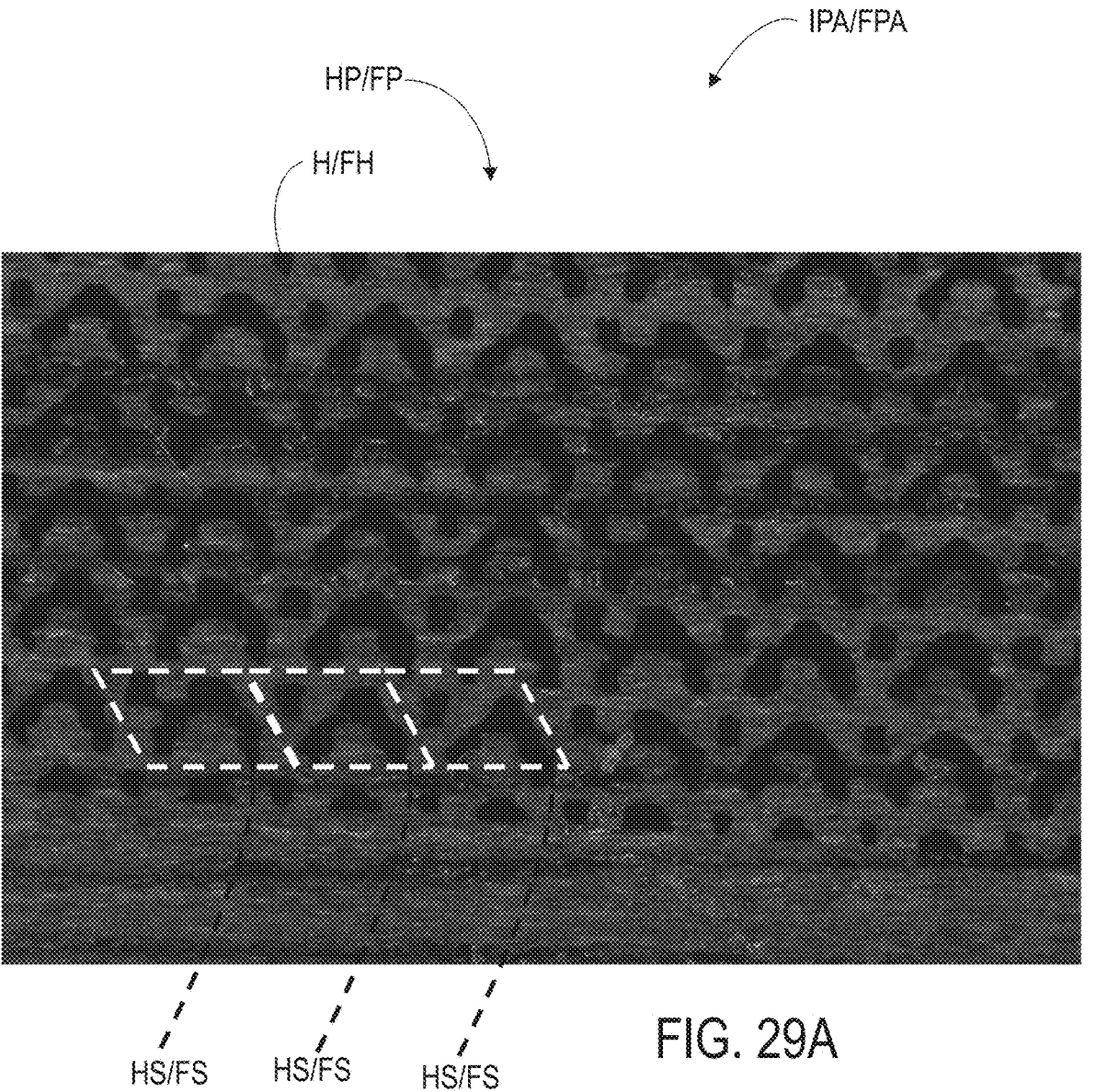
Figures 30A, 30B, 30C:
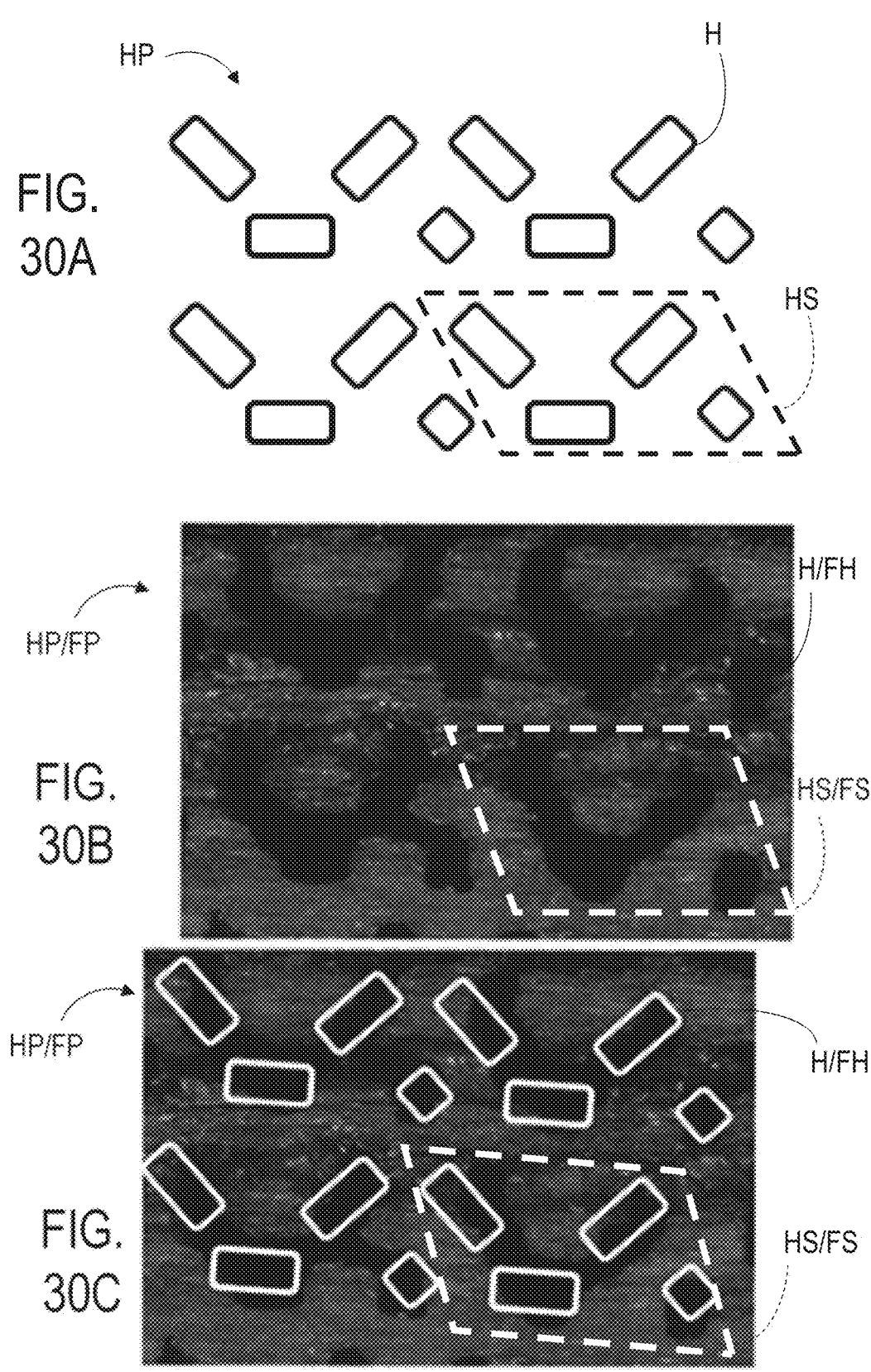
FIG. 30A is a schematic diagram of a hole pattern/arrangement for a panel of a component for a vehicle interior according to an exemplary embodiment.
FIG. 30B is a schematic partial view of a panel of a component for a vehicle interior according to an exemplary embodiment.
FIG. 30C is a schematic diagram of hole pattern/arrangement on a panel of a component for a vehicle interior according to an exemplary embodiment.
Figures 31A, 31B, 31C:
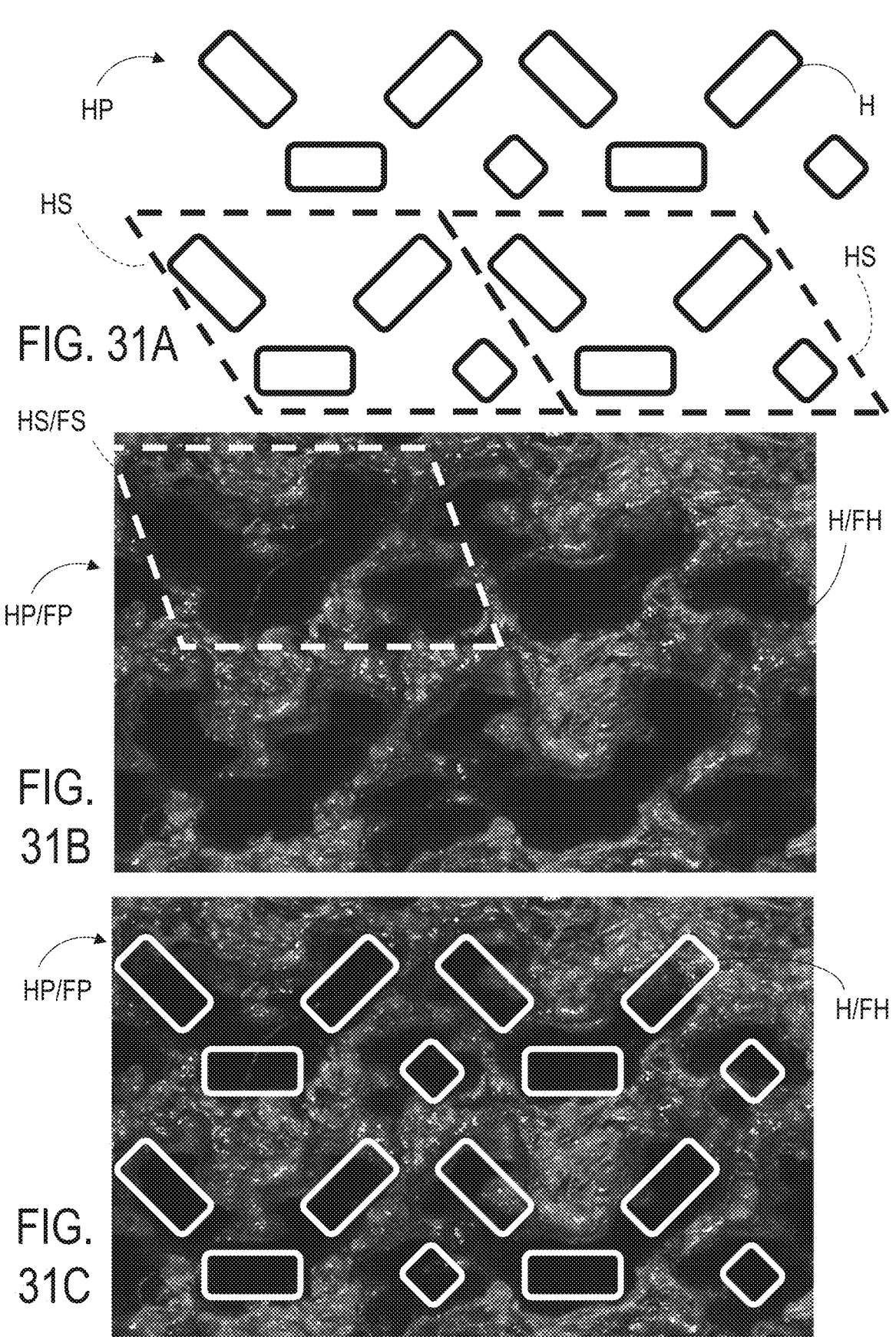
FIG. 31A is a schematic diagram of a hole pattern/arrangement for a panel of a component for a vehicle interior according to an exemplary embodiment.
FIG. 31B is a schematic partial rear view of a panel of a component for a vehicle interior according to an exemplary embodiment.
FIG. 31C is a schematic diagram of hole pattern/arrangement on a panel of a component for a vehicle interior according to an exemplary embodiment.
Figures 32A, 32B, 33A, 33B, 34A, 34B:
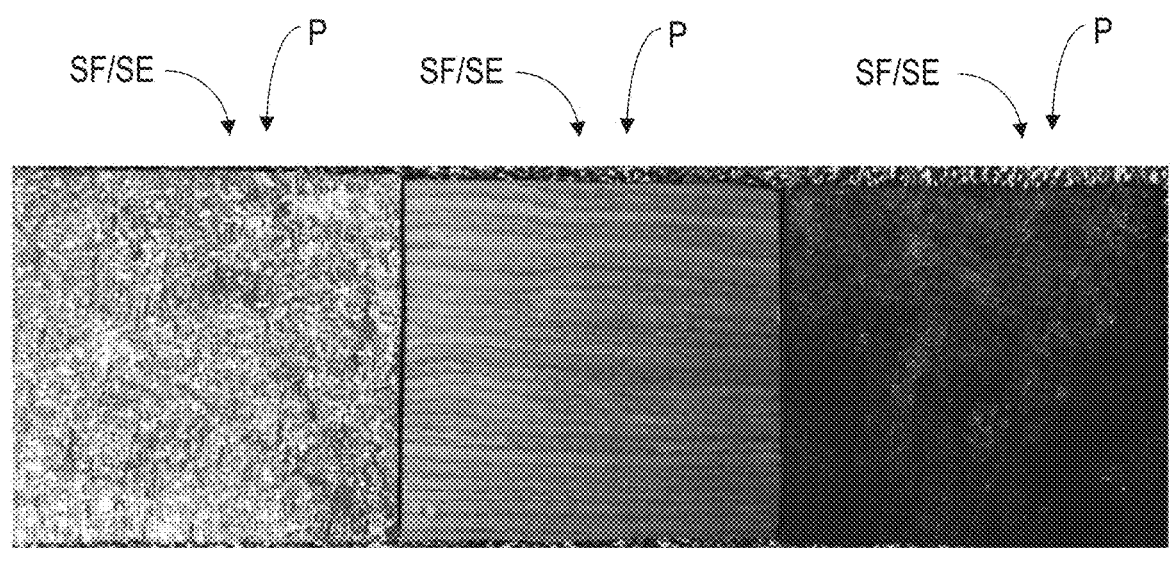
FIGS. 32A and 32B are schematic plan views of a cover for a component for a vehicle interior according to an exemplary embodiment.
FIGS. 33A and 33B are schematic plan views of a cover for a component for a vehicle interior according to an exemplary embodiment.
FIGS. 34A and 34B are schematic plan views of a cover for a component for a vehicle interior according to an exemplary embodiment.
Figures 35A, 35B, 35C:
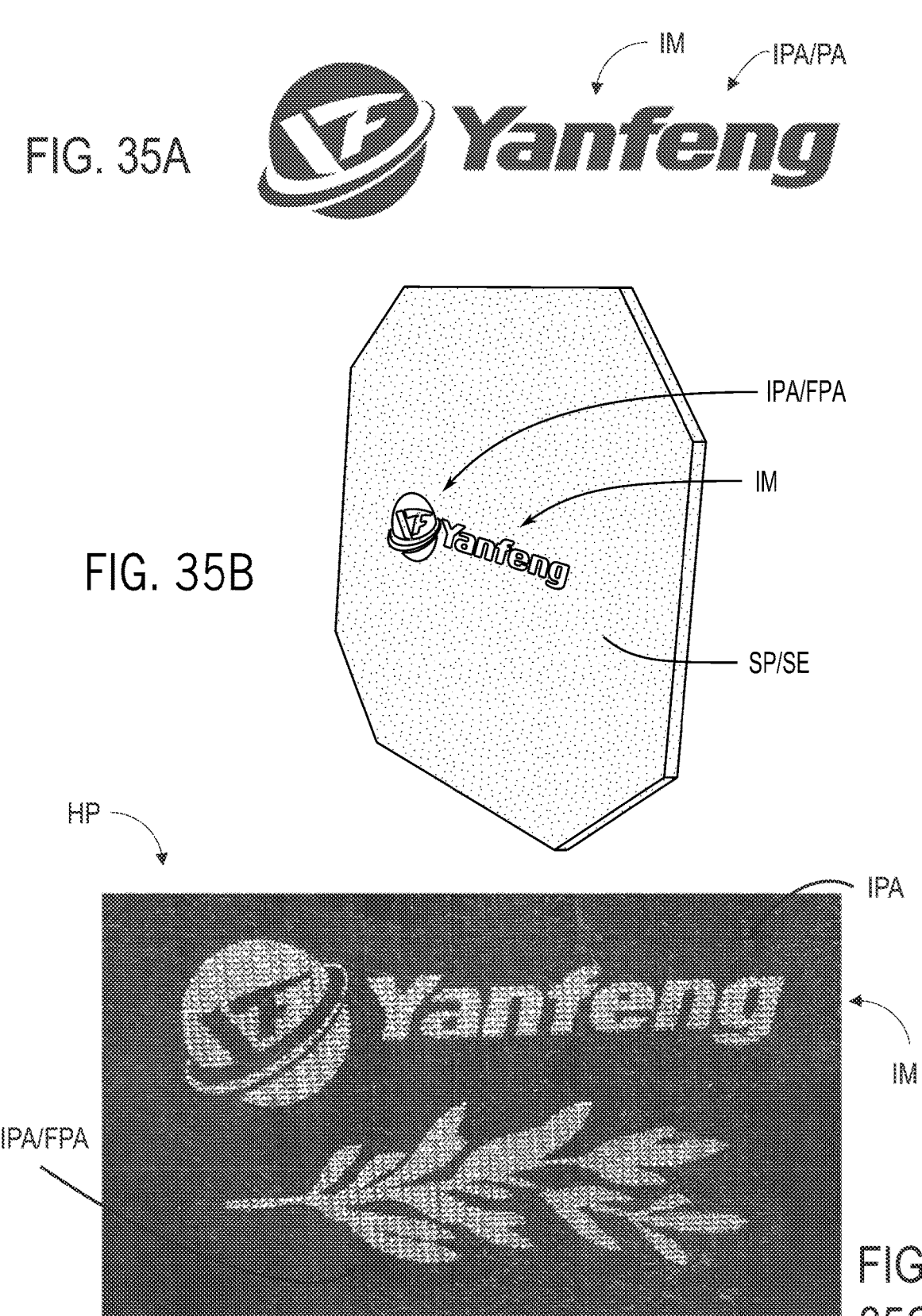
FIG. 35A is a schematic diagram of an image for a component for a vehicle interior according to an exemplary embodiment.
FIG. 35B is a schematic perspective view of a component for a vehicle interior according to an exemplary embodiment.
FIG. 35C is a schematic partial plan view of a component for a vehicle interior according to an exemplary embodiment.
Figure 36:
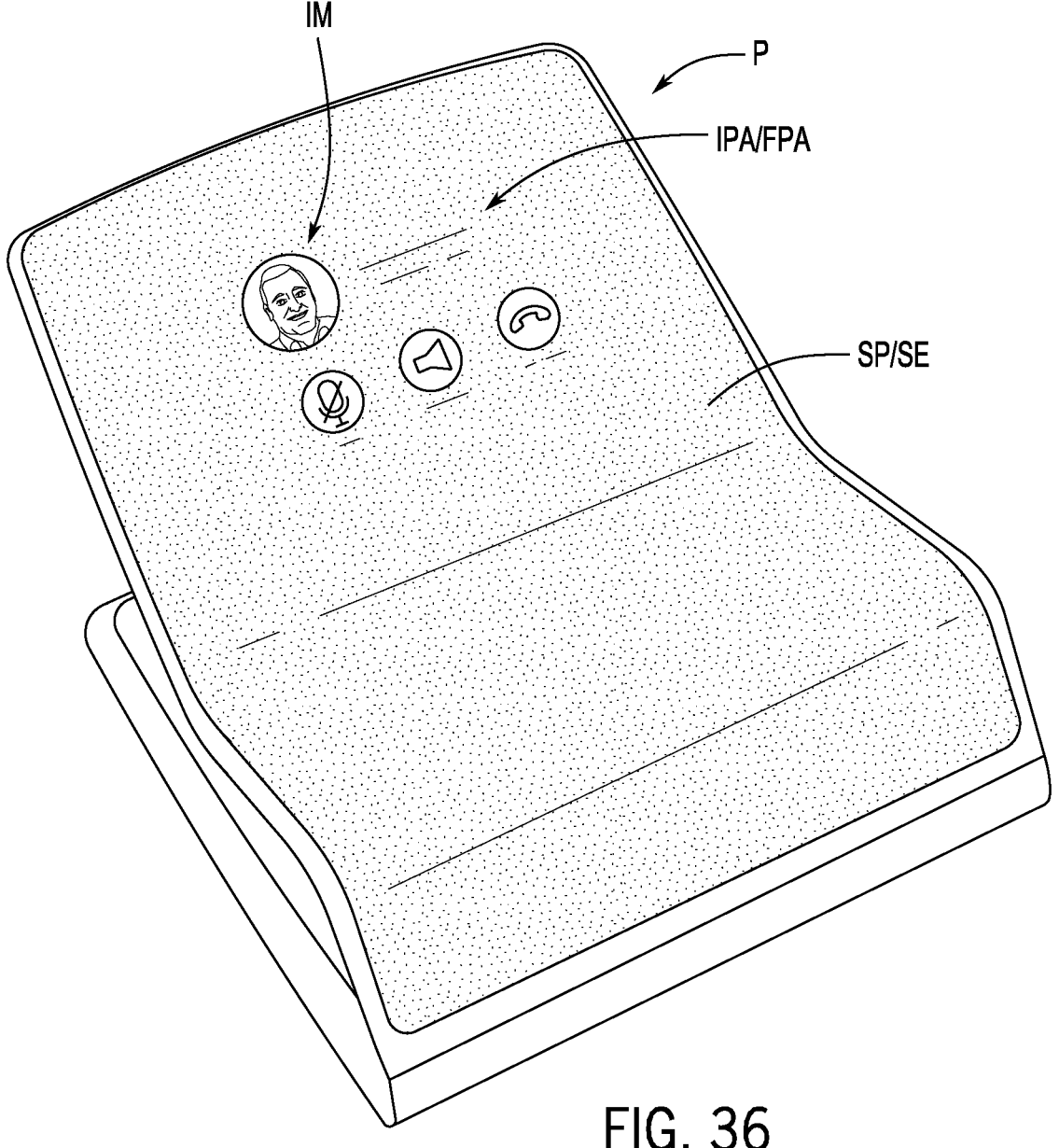
FIG. 36 is a schematic perspective view of a component for a vehicle interior according to an exemplary embodiment.
Figure 37A:
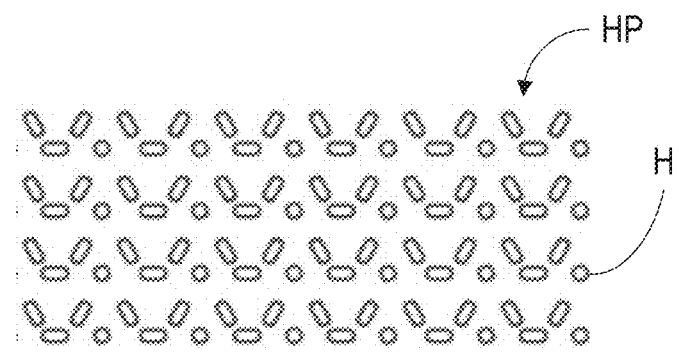
FIG. 37A is a schematic diagram of a pattern at a surface of a component for a vehicle interior according to an exemplary embodiment.
Figure 37B:
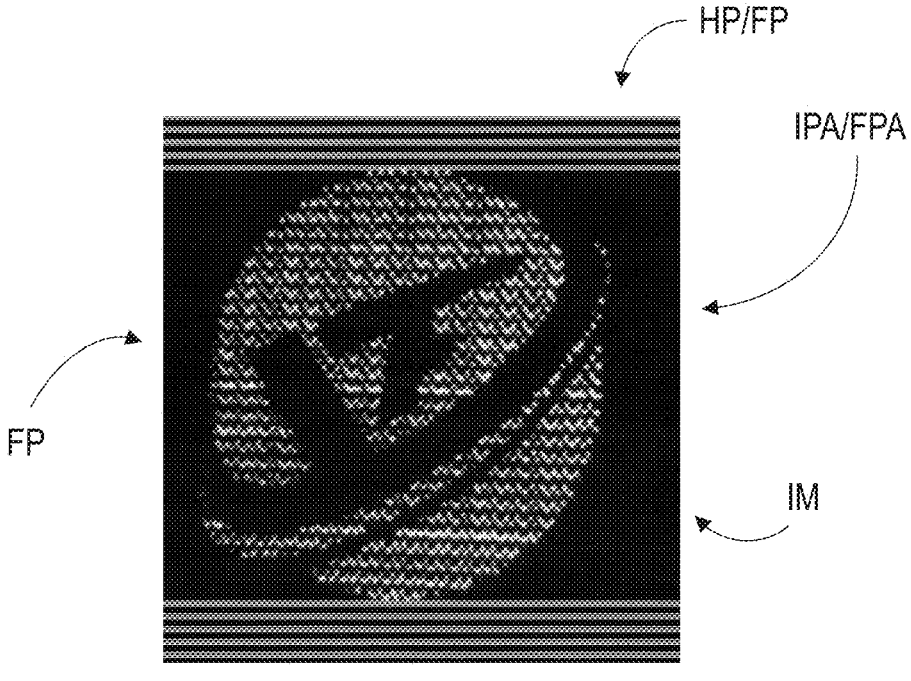
FIG. 37B is a schematic diagram of an image at a surface of a component for a vehicle interior according to an exemplary embodiment.
Figure 38A:
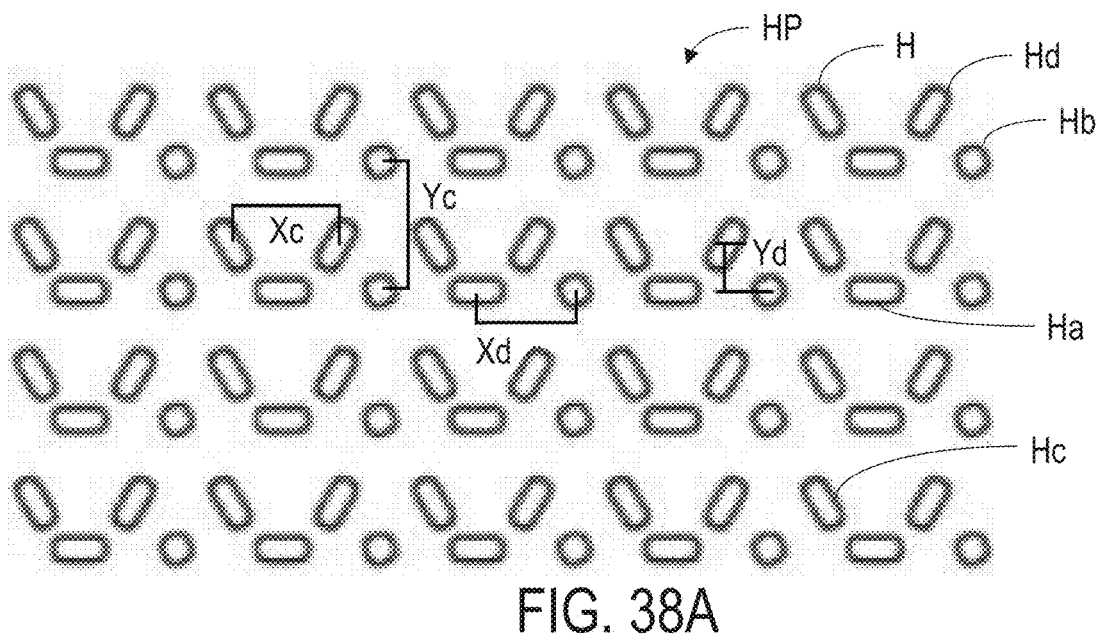
FIGS. 38A through 38B are schematic diagrams of a pattern at a surface of a component for a vehicle interior according to an exemplary embodiment.
Figure 38B:
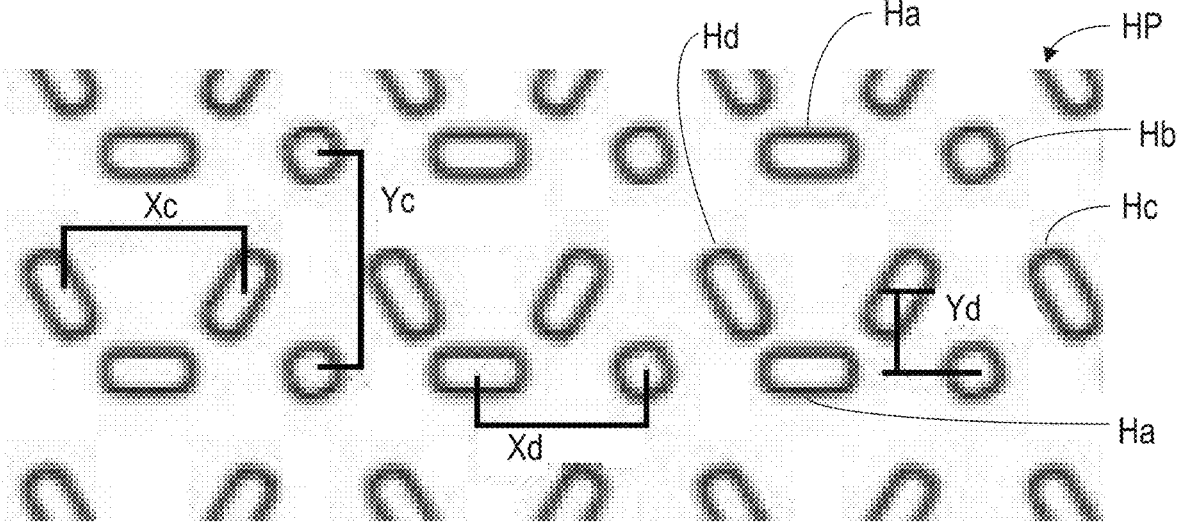
Figures 39A, 39B, 39C:
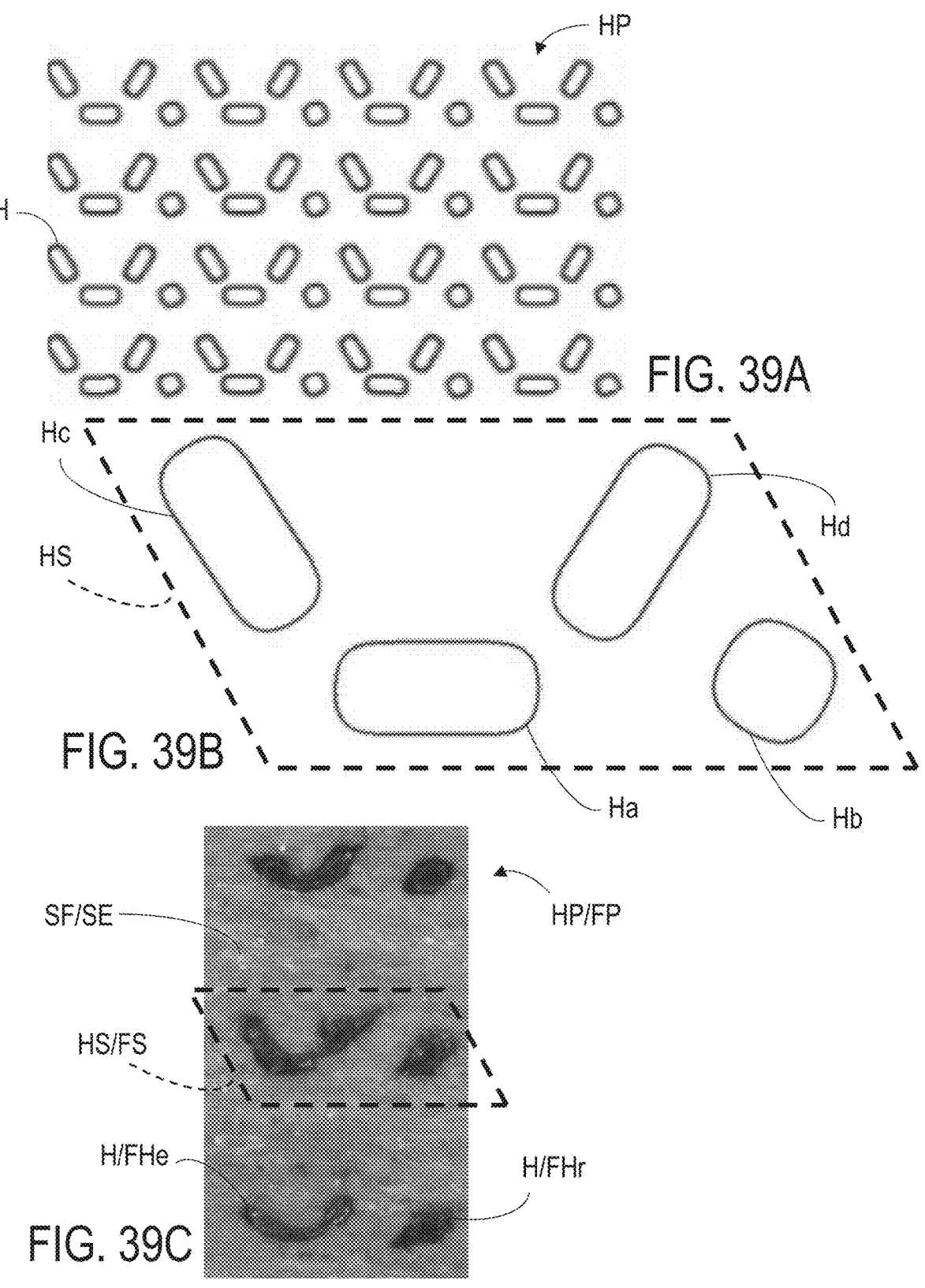
FIG. 39A is a schematic diagram of a pattern at a surface of a component for a vehicle interior according to an exemplary embodiment.
FIG. 39B is a schematic diagram of a segment of a pattern for a cover of a component for a vehicle interior according to an exemplary embodiment.
FIG. 39C is a schematic diagram of a pattern at a surface of a component for a vehicle interior according to an exemplary embodiment.
Figure 40A:
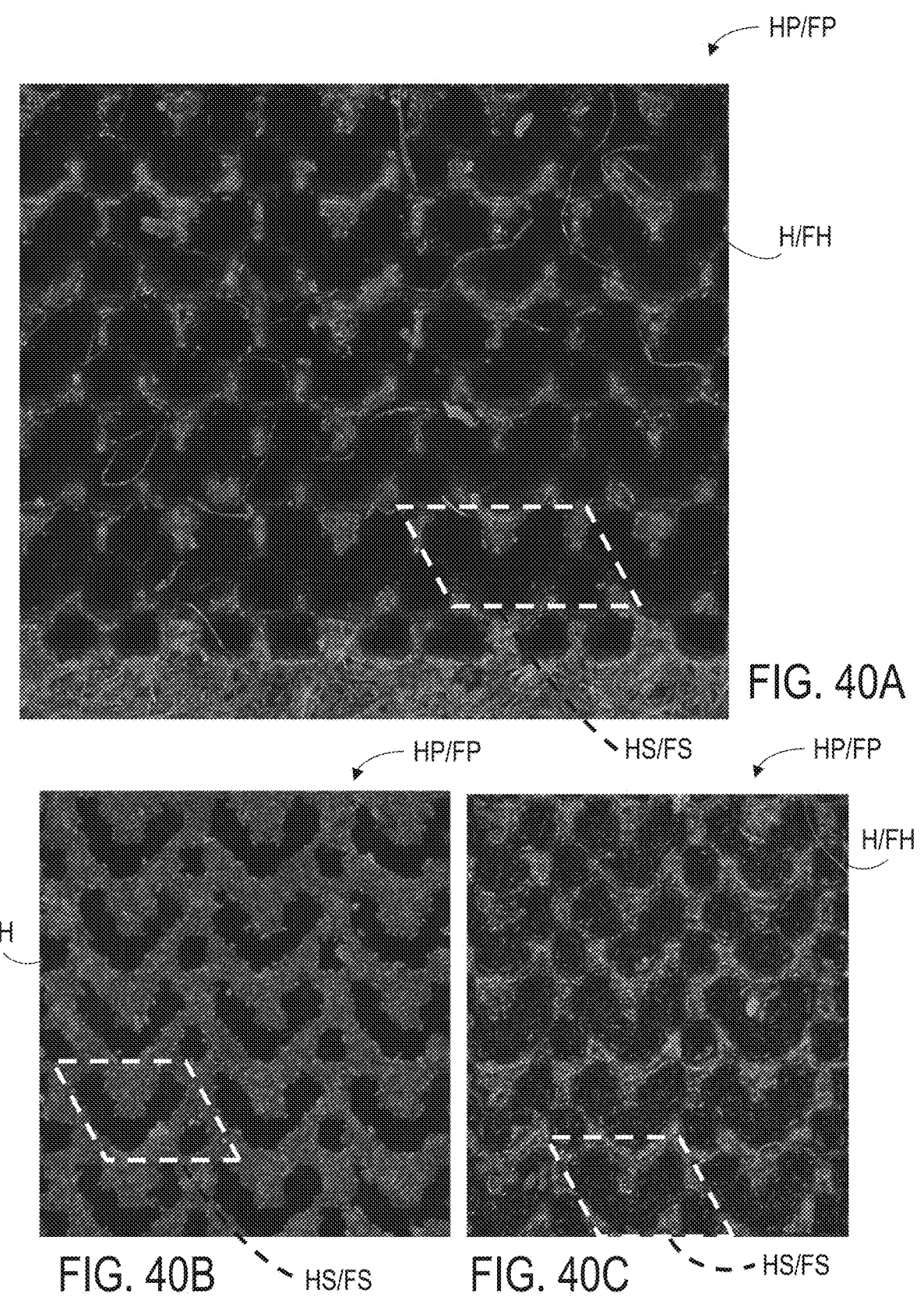
Figures 41A, 41B:
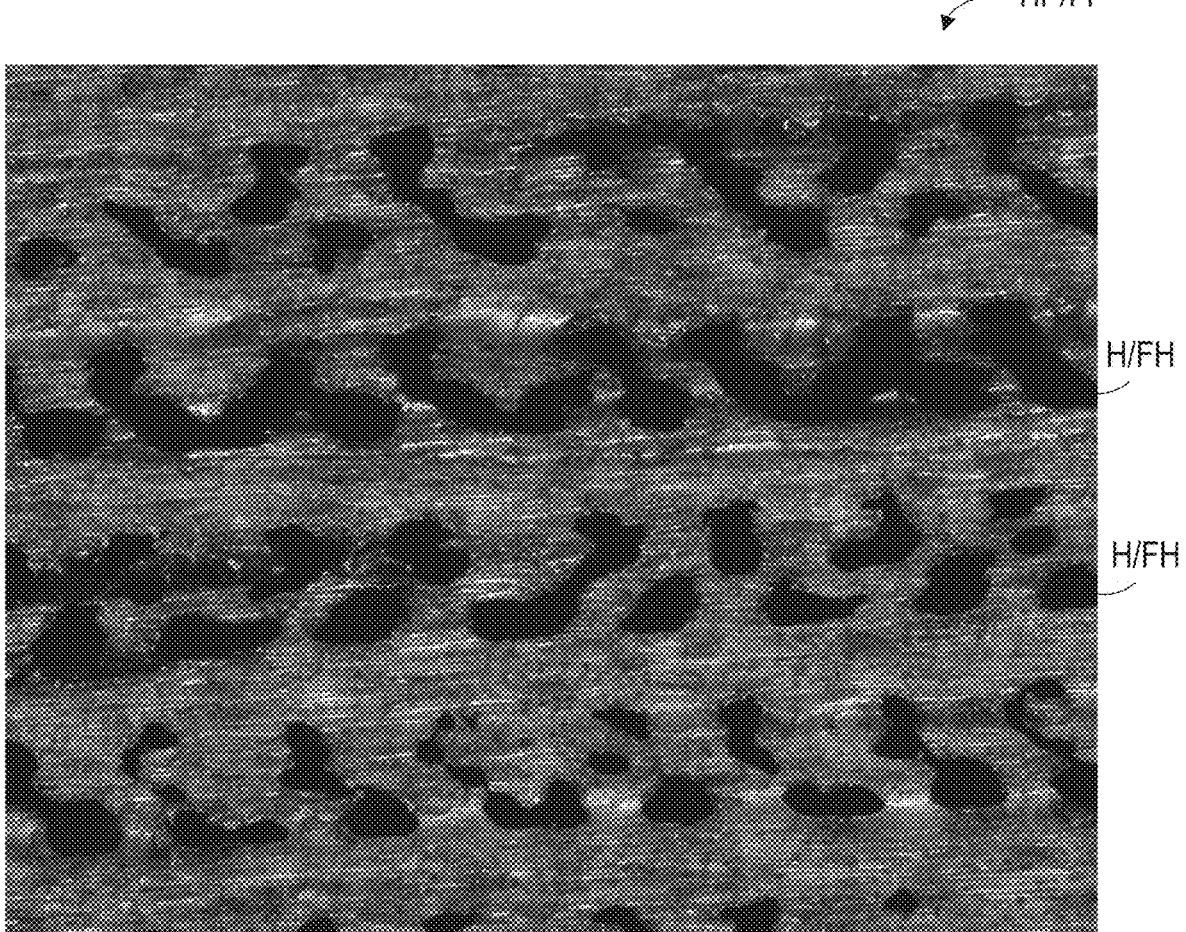
FIG. 41A is a schematic diagram of a pattern at a surface of a component for a vehicle interior according to an exemplary embodiment.
FIG. 41B is a schematic diagram of a segment of a pattern at a surface of a component for a vehicle interior according to an exemplary embodiment.
Figures 42A, 42B:
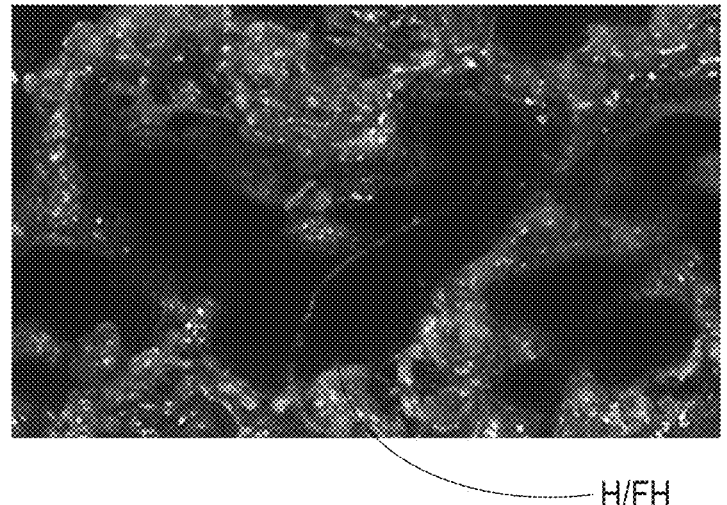
FIG. 42A is a schematic diagram of a pattern at a surface of a component for a vehicle interior according to an exemplary embodiment.
FIG. 42B is a schematic diagram of a segment of a pattern at a surface of a component for a vehicle interior according to an exemplary embodiment.

According to an exemplary embodiment as shown in FIGS. 7 and 24, the display D may be configured to be operated by a light source/light LS/L (such as an LED array, display panel, monitor, etc.) with a control system such as provided by a module M (such as with a processor, controller, etc.). See also FIGS. 48A-48B.

According to an exemplary embodiment as shown in FIGS. 3E-3J, 14A-14C, 25A-25D, 26, 27A-27B, 28A-28B, 29A-29B, 30A-30C, 31A-31C, 36, 50, 52, 53, 55A-55B, 56, 57, 58, 59 and 60, the image presentation area IPA of the cover T of component C/P providing the display D for presentation of the image IM may comprise a pattern area PA comprising holes H provided in a form/arrangement such as hole pattern HP comprising a set/unit of hole pattern segments HS; the pattern area PA may be provided in the form of image IM for the image presentation area IPA. See also FIGS. 3A-3D, 4A-4C, 5A-5D, 6, 6A-6D, 9A-9G, 10A-10C, 11A-11B, 12A-12C, 13A-13B, 22, 23 and 24. According to an exemplary embodiment as shown in FIGS. 9A-9G, 10A-10C, 13A-13B, 17A-17C, 18A-18B, 19A-19C, 22, 48A-48B and 51, the composite structure of the component C/P with cover T may comprise a fill material F for the holes H of the cover T; the fill material F may comprise a light-transmissive material configured to operate as a light guide LG to transmit light L from a light source LS to the visible surface SF of the cover T. See also FIGS. 4A-4C, 5A-5D, 6A-6D and 7.

According to an exemplary embodiment as shown in FIGS. 3E-3J, 14A-14C, 25A-25D, 26, 27A-27B, 28A-28B, 29A-29B, 30A-30C, 31A-31C, 36, 50, 52, 53, 55A-55B, 56, 57, 58, 59 and 60, the holes H may be formed in the cover T of the component C/P as formed hole formations FH through the internal surface/backing BL and to the external surface SF to provide a formed image presentation area FPA for the image presentation area IPA. See also FIGS. 4A-4C, 5A-5D, 6A-6D, 10A-10C, 11A-11C, 12A-12C, 13A-13B, 14A-14C and 22. According to an exemplary embodiment as shown in FIGS. 3A-3J, 6, 6A-6D, 10A-10C, 22, 24, 32A-32, 33A-33B, 34A-34B, 35A-35C, 36, 45A-45B, 46A-46C and 47A-47K, cover T of the composite structure of component C/P may be configured to provide a composite visual effect including the surface effect SE and image presentation area IPA; the formed image presentation area FPA may provide a visual effect at the external surface of cover T including image IM; the external surface SF of cover T may comprise a material configured to provide a visual effect such as surface effect SE (as may be provided by a veneer layer, surface finish, etc.); the composite visual effect at the visible/external surface SF of cover T comprises the visual effect of the image IM from the formed image presentation area FPA through the cover T and the visual effect of the surface effect SE from the material of the external surface of the cover T.

According to an exemplary embodiment as shown in FIGS. 3E-3J, 14A-14C, 25A-25D, 26, 27A-27B, 28A-28B, 29A-29B, 30A-30C, 31A-31C, 36, 52, 53, 55A-55B, 56, 57, 58, 59 and 60, the formed image presentation area FPA may comprise formed hole formations FH provided in the form/arrangement such as a formed hole formation pattern FP (generally corresponding to hole pattern HP) comprising a set/unit of formed hole formation segments FS (generally corresponding to hole pattern segments HS); the formed image presentation area FPA based on the pattern image area PA with hole pattern HP and sets of hole pattern segments HS will comprise the formed hole formation pattern FP with sets of formed hole formation segments FS configured to present the image IM for the image presentation area IPA of the cover. According to an exemplary embodiment as shown in FIGS. 3E-3J, 14A-14C, 25A-25D, 26, 27A-27B, 28A-28B, 29A-29B, 30A-30C, 31A-31C, 36, 38A-38B, 52, 53, 55A-55B, 56, 57, 58, 59 and 60, hole pattern segments HS will comprise a form/shape such as a geometric form (e.g. parallelogram, rhombus, etc.); the formed hole formation segments FS will comprise the corresponding form/shape such as the geometric form (e.g. parallelogram, rhombus, etc.); holes H of the hole pattern HP and hole pattern segment HS may comprise a generally regular form/shape (such as holes Ha/Hb/Hc/Hd); the general form of holes H may comprise, elongate forms, symmetrical forms, slots, circles, rectangles, squares, etc.; formed hole formations FH of the formed hole formation pattern FP and formed hole formation segment FS may comprise a generally irregular form/shape (such as formed hole formations FHe/FHr); the irregular formed hole formations FH of each formed hole formation segment FS are formed corresponding to the regular form holes H of each hole pattern segment HS. According to an exemplary embodiment as shown in FIGS. 15, 25A-25D, 27A-27B, 28A-28B, 29A-29B, 30A-30C, 31A-31C and 36, the forming process (such as laser-forming) and the material for the cover T (including material for backing layer BL) may produce irregular formed hole formations FH that may comprise irregular forms such as curved forms bridging multiple holes, bridged forms of multiple holes, expanded forms, melted forms, burned forms, asymmetrical forms, random-variation forms, contoured forms, etc. See also FIGS. 14A-14C, 52, 54, 56, 57, 58, 59 and 60.

According to an exemplary embodiment as shown in FIGS. 3E-3J, 14A-14C, 25A-25D, 26, 27A-27B, 28A-28B, 29A-29B, 30A-30C, 31A-31C, 36, 38A-38B, 50, 52, 53, 55A-55B, 56, 57, 58, 59 and 60, the pattern area PA of hole pattern HP comprising hole pattern segments HS may be arranged to provide the image IM for image presentation area IPA of the display D; the component/part C/P will provide the formed image presentation area FPA corresponding to the pattern area PA configured to present the image IM for the image presentation area IPA of the display D; the image presentation area IPA will be actuated by illumination from the module M and/or light source/light LS/L; the image presentation area IPA may comprise a form corresponding to a form of the image IM; the image presentation area IPA may comprise an image shape SH providing a form; the image presentation area IPA may comprise a general form (e.g. rectangle, square, oval, etc.) and be formed to be generally light-transmissive such that the image IM comprises content presented on a display panel of the display D; the image presentation area IPA may comprise a composite form/shape configured to present a composite visual effect (e.g. multiple colors, contrasts, effects, sections, segments, regions, etc.). See also FIGS. 3A-3D, 4A-4B, 5A-5D, 6A-6D, 10A-10C, 22, 23 and 24.

According to an exemplary embodiment as shown in FIGS. 3E, 35A-35C, 36, 43A, 45A-45B, 46A-46C and 53, the set of formed hole formations FH of the formed hole formation segments FS of the formed hole formation pattern FP for the formed image presentation area FPA for image presentation area IPA will be formed corresponding to pattern area PA such that image IM can be presented at the display D (when illuminated by light source/light LS/L and/or operated by module M); the image IM may comprise a form configured by the pattern area PA of the image presentation area; the image IM may comprise a form transmitted from the light source/light LS/L such as a display panel form the display D. See also FIGS. 52, 54, 56, 57, 58, 59 and 60 (examples of form/shape of the arrangement of segments/units of the pattern area).

According to an exemplary embodiment as shown schematically in FIGS. 7, 35A-35C and 36, a component C/P for a vehicle interior with a visible surface SF intended to be visible to an occupant when the component is installed in the vehicle interior configured to provide illumination from a light source/light LS/L may comprise a base B and a cover T for the base comprising an exterior surface providing the visible surface SF and an interior surface. See also FIGS. 3A-3J, 32A-32B, 33A-33B, 34A-34B, 46A-46C, 47A-47K and 48A-48B.

According to an exemplary embodiment as shown schematically in FIGS. 3E, 35A-35C, 36, 43A, 45A-45B, 46A-46C and 53, the cover T may be configured to provide an image presentation area IPA at the visible surface configured to present an image IM at a display D (e.g. providing a user interface). See also FIGS. 48A-48B. According to an exemplary embodiment as indicated schematically in FIGS. 3A-3J, 14A-14C, 25A-25D, 26, 27A-27B, 28A-28B, 29A-29B, 30A-30C, 31A-31C, 36, 38A-38B, 50, 52, 53, 55A-55B, 56, 57, 58, 59 and 60, the image presentation area IPA of the cover T may comprise a formed image presentation area IPA for the exterior surface of the cover T; the formed image presentation area IPA configured to present the image IM at the cover T may comprise at least one formed hole formation segment FS; each formed hole formation segment FS may comprise at least one formed hole formation; each formed hole formation segment FS may be based on a hole pattern segment HS; the image presentation area IPA of the cover T may comprise each formed hole formation at each formed hole formation segment FS in the formed image presentation area IPA; each formed hole formation segment FS may be based on a hole pattern segment HS for the image presentation area IPA.

According to an exemplary embodiment as indicated schematically in FIGS. 3E, 14A-14C, 52, 54, 56, 57, 58, 59 and 60, the image presentation area IPA of the cover T may comprise a hole pattern at the interior surface of the cover T; the image presentation area IPA of the cover T may comprise a pattern image area PA; the pattern image area PA of the cover T may comprise a hole pattern at the interior surface of the cover T; the hole pattern HP of the pattern image area PA may comprise at least one hole pattern segment HS. According to an exemplary embodiment as indicated schematically in FIGS. 25A-25D, 26, 27A-27B, 28A-28B, 29A-29B, 30A-30C, 31A-31C, 36 and 38A-38B, the formed hole formation segment FS may comprise at least one formed hole formation; each formed hole formation may be based on a hole segment of the hole pattern segment HS for the image presentation area IPA; each formed hole formation may comprise at least one opening through the cover T; the formed hole formation may comprise an opening on the exterior surface and on the interior surface of the cover T. See also FIGS. 15, 17A-17C, 19A-19C, 40A-40C and 48A-48B.

According to an exemplary embodiment as shown schematically in FIGS. 3A-3J, 4A-4B, 5A-5D, 6A-6D, 10A-10C, 11A-11C, 12A-12C, 13A-13B, 25A-25D, 26, 27A-27B, 28A-28B, 29A-29B, 30A-30C, 31A-31C, 36 and 38A-38B, the image presentation area IPA of the cover T may comprise a pattern image area PA comprising a hole pattern comprising a hole pattern segment HS; the pattern image area PA may comprise a hole pattern area PA comprising repetition of at least one hole pattern segment HS over the pattern image area PA. According to an exemplary embodiment as indicated schematically in FIGS. 3E-3J, 14A-14C, 25A-25D, 26, 27A-27B, 28A-28B, 29A-29B, 30A-30C and 31A-31C, the hole pattern segment HS may comprise a rhomboid form comprising a set of sides and a set of vertices and a set of pattern holes; the set of sides may comprise a top side SD and a bottom side SD and a left side SD and a right side; the set of vertices may comprise an upper left vertex VT and an upper right vertex VT and lower left vertex VT and a lower right vertex VT. According to an exemplary embodiment as indicated schematically in FIGS. 14A-14C and 52, the set of pattern holes may comprise at least one pattern hole and at least one pattern elongate hole. See also FIGS. 54, 56, 57, 58, 59 and 60. According to an exemplary embodiment as indicated schematically in FIGS. 14A-14C, the top side SD of the set of sides may be parallel to the bottom side SD of the set of sides; the left side SD of the set of sides may be parallel to the right side SD of the set of sides; the upper left vertex VT may be between the top side SD and the left side; the upper right vertex VT may be between the top side SD and the right side; the lower left vertex VT may be between the bottom side SD and the left side; the lower right vertex VT may be between the bottom side SD and the right side. According to an exemplary embodiment as indicated schematically in FIGS. 14A-14C, the set of pattern holes may comprise a pattern elongate hole adjacent the bottom side; the set of pattern holes may comprise a pattern elongate hole adjacent the left side; the set of pattern holes may comprise a pattern elongate hole aligned with a line from the upper right vertex VT bisecting the top side SD and the right side; the set of pattern holes may comprise a pattern elongate hole aligned with a line from the upper right vertex VT transecting the top side SD and the right side; the set of pattern holes may comprise a pattern hole adjacent the lower right vertex VT. See also FIGS. 3E-3J, 49A-49D and 52.

According to an exemplary embodiment as indicated schematically in FIGS. 14A-14C and 49A-49D, the pattern elongate hole may comprise a symmetrical shape; the pattern elongate hole may comprise a regular shape; the pattern elongate hole may comprise a slot. The pattern elongate hole may comprise a slot-like shape; the pattern elongate hole may comprise an oval-like shape; the pattern elongate hole may comprise a rectangle-like shape; the rectangle-like shape may comprise with rounded corners; the pattern elongate hole may comprise a capsule-like shape; the pattern elongate hole may comprise an oblong shape. See also FIGS. 50, 52, 54, 56, 57, 58, 59 and 60. According to an exemplary embodiment as indicated schematically in FIGS. 14A-14C and 49A-49D, the pattern hole may comprise a regular shape; the pattern hole may comprise a fully-symmetrical shape; the pattern hole may comprise a symmetrical shape; the pattern hole may comprise a generally circular shape. The pattern hole may comprise a generally block shape; the pattern hole may comprise a symmetrical shape comprising a circle or a square or a diamond; the pattern hole may comprise a circle-like shape or a square-like or a diamond-like shape; the square-like shape may comprise rounded corners. See also FIGS. 50 and 52. According to an exemplary embodiment as indicated schematically in FIGS. 3E-3J and 14A-14C, the upper left vertex VT of one hole pattern segment HS may be horizontally positioned above the lower right vertex VT of an adjacent hole pattern segment HS; the upper right vertex VT of one hole pattern segment HS may be horizontally positioned above the upper left vertex VT of an adjacent hole pattern segment HS; the side SD of one hole pattern segment HS may be shared as the side SD of an adjacent hole pattern segment HS.

According to an exemplary embodiment as indicated schematically in FIGS. 25A-25D, 26, 27A-27B, 28A-28B, 29A-29B, 30A-30C and 31A-31C, the hole pattern area PA may comprise a repeating set of hole pattern segments HS;

the hole pattern area PA may comprise a repeating arrangement of hole pattern segments HS. See also FIG. 52.

According to an exemplary embodiment as shown schematically in the FIGURES, the formed hole formation area FPA may be formed generally corresponding to the hole pattern area PA; the formed hole formation area FPA may comprise at least one formed hole formation segment FS. According to an exemplary embodiment as indicated schematically in FIGS. 25A-25D, 26, 27A-27B, 28A-28B, 29A-29B, 30A-30C, 31A-31C, 39A-39C and 40A-40C, the formed hole formation segment FS of the formed hole formation may generally correspond to at least one hole pattern segment HS of the hole pattern HP; the formed hole formation segment FS may comprise a formed hole formation segment FS; the formed hole formation may comprise a formed hole formation segment FS formed according to the hole pattern segment HS; the formed hole formation segment FS may comprise a rhomboid form generally corresponding to the rhomboid form of the hole pattern segment HS; a formed hole formation of the formed hole formation segment FS may be based on a pattern hole H of the hole pattern segment HS. According to an exemplary embodiment as indicated schematically in FIGS. 3E-3H, 14A-14C, 25A-25D, 26, 27A-27B, 28A-28B, 29A-29B, 30A-30C, 31A-31C and 40A-40C, the formed hole formation of the formed hole formation segment FS may comprise an irregular shape; the pattern hole H of the hole pattern segment HS may comprise a regular shape; a formed hole formation of the formed hole formation segment FS may comprise an irregular shape FHe/FHr; the formed hole formation segment FS based on the hole pattern segment HS may comprise a formed curved hole formation FHe; the formed hole formation segment FS may comprise a formed curved hole formation FHe generally corresponding to at least one pattern elongate hole H of the hole pattern segment HS; the formed hole formation segment FS may comprise at least one formed hole formation generally corresponding to at least one pattern elongate hole H of the hole pattern segment HS. According to an exemplary embodiment as indicated schematically in FIGS. 3E-3J, 14A-14C. 50 and 52, at least one pattern elongate hole H of the hole pattern segment HS may comprise a set of pattern elongate holes; the formed hole formation segment FS may comprise at least one formed hole formation generally corresponding to the set of pattern elongate holes of the hole pattern segment HS; at least one formed hole formation may comprise a formed curved hole formation FHe; at least one formed hole formation may comprise one formed curved hole formation FHe; the formed curved hole formation FHe may comprise a generally continuous aperture; the formed hole formation segment FS may comprise a set of formed hole formations FH generally corresponding to the set of pattern holes. According to an exemplary embodiment as indicated schematically in FIGS. 3E, 49A-49D, 52, 54, 56, 57, 58, 59 and 60, the formed image presentation area IPA may be based on the pattern image area PA; the formed image presentation area IPA may comprise the formed hole formation area FPA.

Figures 15, 16, 17A, 17B, 17C, 18A, 18B, 19A, 19B, 19C:
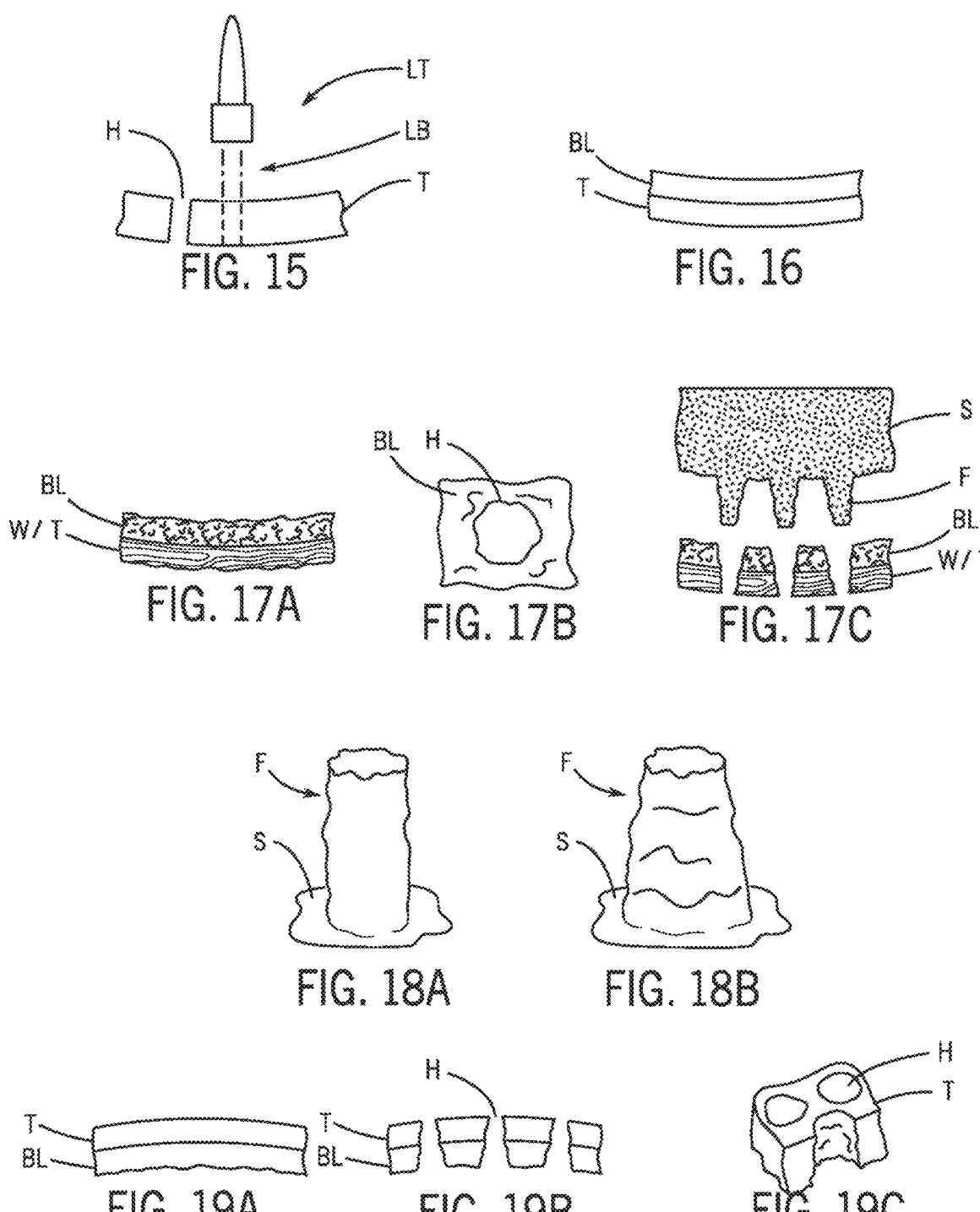
FIG. 15 is a schematic cut-away section view of a process to produce a cover for a component for a vehicle interior according to an exemplary embodiment.
FIG. 16 is a schematic cut-away section view of a process to produce a component for a vehicle interior according to an exemplary embodiment.
FIGS. 17A to 17C are schematic cut-away section view of a process to produce a component for a vehicle interior according to an exemplary embodiment.
FIG. 18A is a schematic cut-away perspective view of a light guide for a component for a vehicle interior according to an exemplary embodiment.
FIG. 18B is a schematic cut-away perspective view of a light guide for a component for a vehicle interior according to an exemplary embodiment.
FIG. 19A is a schematic cut-away section view of a cover for a component for a vehicle interior according to an exemplary embodiment.
FIG. 19B is a schematic cut-away section view of a cover for a component for a vehicle interior according to an exemplary embodiment.
FIG. 19C is a schematic cut-away perspective view of a cover for a component for a vehicle interior according to an exemplary embodiment.

According to an exemplary embodiment as shown schematically in FIG. 15, the formed hole formation area FPA may comprise a formed hole formation segment FS formed by a laser according to the hole pattern segment HS; the formed hole formation area FPA may comprise a formed hole formation segment FS formed as a perforation by a laser according to the hole pattern segment HS; the formed hole formation area FPA may comprise a formed hole formation segment FS laser-formed according to the hole pattern segment HS; the formed hole formation area FPA may comprise a formed hole formation segment FS formed as a set of apertures according to the hole pattern segment HS. See also FIGS. 25A-25D, 26, 27A-27B, 28A-28B, 29A-29B, 30A-30C, 31A-31C, 39A-39C and 40A-40C. According to an exemplary embodiment, the formed hole formation area FPA may comprise a formed hole formation segment FS formed as a set of laser-formed apertures according to the hole pattern segment HS; the formed hole formation area FPA may comprise a formed hole formation segment FS formed as a set of laser-perforated apertures according to the hole pattern segment HS. According to an exemplary embodiment as indicated schematically in FIGS. 25A-25D, 26, 27A-27B, 28A-28B, 29A-29B, 30A-30C, 31A-31C, 39A-39C and 40A-40C, the formed hole formation area FPA may comprise a formed hole formation segment FS formed as a set of fused apertures according to the hole pattern segment HS; the formed hole formation area FPA may comprise a formed hole formation segment FS formed as a set of melted apertures according to the hole pattern segment HS; the formed hole formation area FPA may comprise a formed hole formation segment FS formed as a set of burned apertures according to the hole pattern segment HS; the formed hole formation area FPA may comprise a repeating set of formed hole formation segments FS. According to an exemplary embodiment as indicated schematically in FIGS. 25A-25D, 26, 27A-27B, 28A-28B, 29A-29B, 30A-30C, 31A-31C, 39A-39C and 40A-40C, the formed hole formation area FPA may comprise a repeating set of formed hole formation segments FS corresponding to a repeating set of hole pattern segments HS; the formed hole formation area FPA may comprise a repeating arrangement of formed hole formation segments FS; the formed hole formation area FPA may comprise a repeating arrangement of formed hole formation segments FS corresponding to a repeating arrangement of hole pattern segments HS. See also FIGS. 3E, 49A-49D and 52. According to an exemplary embodiment as indicated schematically in FIGS. 3E, 32A-32B, 33A-33B, 34A-34B, 35A-35B, 36 and 43A, the image presentation area IPA with formed hole formation area FPA may be configured to provide an image IM presented by illumination. See also FIGS. 48A-48B. According to an exemplary embodiment as indicated schematically in FIGS. 43A, 44A-44B, 45A-45B and 46A-46C, the hole pattern area PA may be configured so that illumination of the image IM is visible at a viewing angle (e.g. a viewing angle VA or VO, viewing angle such as may be measured from perpendicular to the surface of the cover or from tangent to the surface of the cover).

According to an exemplary embodiment as shown schematically in FIGS. 3A-3J, 4A-4B, 5A-5D, 6A-6D, 10A-10C, 32A-32B, 33A-33B, 34A-34B, 35B-35C and 36, the cover T may comprise a decorative layer DL; the decorative layer DL may comprise a surface providing a surface effect SE such as a veneer; the veneer may comprise a natural material, a stone veneer, or a wood veneer (shown as veneer W). See also FIGS. 47A-47K. According to an exemplary embodiment as indicated schematically in FIGS. 9A-9G, the component may comprise a backing coupled to the decorative layer DL; the backing may comprise a backing layer BL configured to provide the interior surface of the cover T for the hole pattern area PA. According to an exemplary embodiment as indicated schematically in FIGS. 3E-3J, 7 and 9A-9G, the formed hole formation may be formed by melting of the backing layer BL; the formed hole formation may be formed by partial melting of the backing layer BL; the formed hole formation may be formed by bridging of the backing layer BL; the formed hole formation may be formed by fusing of the backing layer BL. See also FIGS. 25A-25D, 26, 27A-27B, 28A-28B, 29A-29B, 30A-30C and 31A-31C. According to an exemplary embodiment as indicated schematically in FIGS. 3A-3J, 4A-4B, 5A-5D, 6, 6A-6D, 7 and 48A-48B, the light source/light LS/L may be configured to provide illumination; the decorative layer DL may be configured to provide a visual effect SE; the light source/light LS/L may be configured to illuminate a light guide configured to provide a visual effect SE. See also FIGS. 10A-10C and 51. The visual effect SE of the decorative layer DL and the visual effect SE of the light guide may be configured to provide a composite visual effect SE. See also FIGS. 3A-3J, 6A-6D, 10A-10C, 35A-35C, 36, 43A, 44A-44B, 45A-45B, 46A-46C and 47A-47K. According to an exemplary embodiment as indicated schematically in FIGS. 3A-3F, 32A-32B, 33A-33B, 34A-34B, 35A-35C, 36, 43A, 44A-44B, 45A-45B and 46A-46C, the visible surface may be configured for a first state providing the visual effect SE of the decorative layer DL and a second state providing the composite visual effect SE of the visual effect SE of the light guide and the visual effect SE of the decorative layer DL.

According to an exemplary embodiment as shown schematically, the base may comprise an input device (such as for a user interface) comprising at least one of (a) module; (b) a switch; (c) a sensor; (d) a capacitive switch; (e) a capacitive switch sensor. See FIGS. 6, 6A-6D, 7 and 36. As indicated schematically in FIGS. 3A-3J, 4A-4B, 5A-5D, 6, 6A-6D, 7, 35A-35C and 36, the base B may comprise an input device aligned with the formed hole formation area FPA (e.g. such as for a user interface); the light source/light LS/L may be configured to illuminate the formed hole formation area FPA to illuminate the decorative layer DL to indicate a position of the input device; a module M may provide the light source/light L/LS and/or a controller/control system for the display (and user interface, etc.); at least one opening H for the cover T may be configured to at least one of (a) provide an outlet for light configured to provide illumination; (b) direct light to provide illumination at the visible surface; at least one opening H may comprise a pattern of holes HP configured to provide indicia identifying at least one vehicle control (e.g. a form of image IM). See also FIGS. 32A-32B, 33A-33B, 34A-34B and 47A-47K. The component may comprise at least one of a trim panel, instrument panel PL, armrest AR, floor console FC, door panel DP, headliner, dashboard, console, center console, steering wheel, seat, pillar, roof pillar, pillar trim, etc.

According to an exemplary embodiment as shown schematically in FIGS. 15, 61A-61B, 62A-62C, 63A-63C and 64A-64C, the component C/P with display D may be formed by a method comprising the steps of (a) providing the pattern image area PA comprising the hole pattern HP comprising a set of hole pattern segments HS at the interior surface of the cover T; (b) forming the formed image presentation area IPA as a set of formed hole formation segments FS based on the hole pattern segments HS of the image presentation area IPA for the exterior surface of the cover T; the set of formed hole formation segments FS may comprise a set of formed hole formations FH formed by perforation through the cover T; perforations such as hole formations FH may comprise laser perforation shown as formed hole formations FHe and FHr. See FIGS. 25A-25D, 26, 27A-27B, 28A-28B, 29A-29B, 30A-30C and 31A-31C. According to an exemplary embodiment as indicated schematically in FIGS. 25A-25D, 26, 27A-27B, 28A-28B, 29A-29B, 30A-30C, 31A-31C, 39A-39C and 40A-40C, the set of formed hole formations FH may comprise a set of irregular-shaped formed hole formations FHe/FHr; the step of forming the formed image presentation area IPA as a set of formed hole formation segments FS based on the hole pattern segments HS of the image presentation area IPA for the exterior surface of the cover T may comprise laser-forming formed hole formations FH through the interior surface of the cover T; the formed image presentation area FPA of the cover T may comprise the set of formed hole formations FH in at the interior surface of the cover T. According to an exemplary embodiment as indicated schematically in FIGS. 3G-3J, 25A-25D, 26, 27A-27B, 28A-28B, 29A-29B, 30A-30C, 31A-31C, 39A-39C and 40A-40C, the set of hole pattern segments HS may comprise a set of rhombus-shaped segments; the set of hole pattern segments HS may comprise a set of rhombus-shaped segments comprising at least one pattern elongate hole; the set of formed hole formation segments FS may comprise the set of rhombus-shaped segments; the set of formed hole formation segments FS may comprise a set of rhombus-shaped segments comprising at least one formed curved hole formation FHe.

According to an exemplary embodiment as shown schematically in FIGS. 3A-3J, 6A-6D, 7, 9A-9G, 32A-32B, 33A-33B, 34A-34B and 47A-47K, the component C/P with cover T may be configured for use as a functional/decorative element within a vehicle interior, including with use of various types of user interface configurations (e.g., audio, visual, interactive, lighting, haptics) and with various types of decorative layer configurations (e.g. veneer, stone veneer, wood veneer, coatings, etc.). See also FIGS. 10A-10C, 56, 57, 58, 59 and 60.

Exemplary Embodiments—A

According to an exemplary embodiment as shown schematically in the FIGURES, a component for an interior of a vehicle may comprise a cover/decorative layer with a hole pattern at an exterior surface configured to be illuminated by a light source to present an image (e.g. visible by an occupant facing and/or from a viewing angle).

According to an exemplary embodiment as shown schematically in the FIGURES, a component for a vehicle interior with a surface intended to be visible to an occupant when the component is installed in the vehicle interior configured to provide illumination from a light source may comprise a base and a cover coupled to the base comprising a hole pattern. The cover may comprise an exterior surface providing the surface and an interior surface. The hole pattern may comprise at least one opening through the cover. Each at least one opening may comprise a hole on the exterior surface and a formed aperture on the interior surface. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of a perforation of the backing layer. The formed aperture may be formed by partial burning of the backing layer. The cover may comprise a decorative layer. The component may comprise a light guide coupled to the decorative layer; the light guide may comprise a first portion configured to fill the at least one opening in the decorative layer. The light guide may comprise a light pipe. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The decorative layer may comprise a stone veneer. The component may comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one opening may be configured to at least one of (a) provide an outlet for light configured to provide illumination; (b) direct light to provide illumination at the surface. The at least one opening may comprise a pattern of holes configured to provide indicia identifying at least one vehicle control. The decorative layer may comprise a backer configured to prevent illumination to pass from a light source to an outer surface of the decorative layer. The component may comprise a light guide formed within the at least one opening of the decorative layer. The light guide may comprise a light-transmissive resin material formed in the at least one opening of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one opening may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

According to an exemplary embodiment as shown schematically in the FIGURES, a method of manufacturing a vehicle trim component may comprise the steps of providing a cover and laser-forming a hole pattern in the cover. The cover may comprise an exterior surface providing the surface and an interior surface. The hole pattern may comprise at least one opening through the cover. Each at least one opening may comprise a hole on the exterior surface and a formed aperture on the interior surface. The formed aperture may comprise a design form. The design form may comprise a generally rectangular form. The design form may comprise a generally square form. The design form may comprise rounded corners. The formed aperture may be larger than the design form. The formed aperture may comprise an irregular form. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of perforations in the backing layer. The formed aperture may be formed by partial burning of the backing layer. The pattern may comprise a set of holes and a set of formed apertures. The cover may comprise a decorative layer. The method may comprise the steps of providing the decorative layer in a tool and forming the decorative layer into a shape. The cover may comprise a decorative layer. The method may comprise the steps of providing the decorative layer in a mold, injecting a resin in the mold to form a light guide in the at least one opening of the decorative layer, providing a base and joining the decorative layer with the light guide to the base. The light guide may be configured to allow illumination to pass through the at least one opening of the decorative layer. Forming the at least one opening may comprise perforating the decorative layer with a laser. The method may comprise the step of applying a backer to an inner surface of the decorative layer. The backer may comprise a barrier configured to prevent transmission of light. The step of forming at least one opening in the decorative layer may comprise forming at least one opening in the backer to allow transmission of light through the at least one opening in the backer. The backer may comprise at least one layer of backing material. The backing material may comprise a sheet material attached to the inner surface of the decorative layer.

According to an exemplary embodiment as shown schematically in the FIGURES, a component for a vehicle interior may comprise a surface configured to be illuminated by a light source to present an interface for an occupant of the vehicle interior comprising a base, a cover layer coupled to the base comprising a pattern of openings and a light guide coupled to the cover layer. The light guide may comprise a set of projections configured to fit in the pattern of openings of the cover layer. The light guide may be configured to transmit illumination from the light source to present the interface through the pattern of openings of the cover layer. The pattern of openings may comprise at least one opening comprising a hole and a formed aperture. The cover layer may comprise a decorative layer for the surface; the decorative layer may comprise at least one of (a) a natural material; (b) a stone veneer; (c) a wood veneer; (d) a grained material; (e) a sheet material providing a surface effect. The pattern of openings may comprise at least one opening configured to at least one of (a) provide an outlet for light configured to provide illumination; (b) direct light to provide illumination. The pattern of openings may be configured to provide a display. The display may comprise at least one of a decorative region and an instrumentation region. The instrumentation region may comprise indicia identifying at least one vehicle control. The component may comprise a module configured to provide the light source and at least one sensor for the interface. The component may comprise a backer configured to reinforce the cover layer. The backer may comprise at least one backing layer. The backer may comprise the pattern of openings with formed apertures and holes so that illumination from the light source passes through the backer to the surface to provide the interface. The backer may be configured to prevent illumination from the light source to an outer surface of the decorative layer other than at the pattern of openings. The light guide may comprise a light-transmissive resin material. The light guide may comprise a resin material formed as the set of projections in the pattern of openings. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state. The cover layer may comprise a decorative layer comprising a thickness generally between 0.005 inches and 0.05 inches.

According to an exemplary embodiment as shown schematically in the FIGURES, the component providing the cover/decorative layer with hole pattern to present the image (e.g. when illuminated) may comprise any of a wide variety of components within the interior of the vehicle and/or may comprise any of a wide variety of similar or differing surface effects on the components (e.g. and wide variety of hole patterns and/or images).

According to an exemplary embodiment as shown schematically in the FIGURES, an improved component for a vehicle interior may comprise a cover such as a decorative layer providing a surface configured to present an image in an illuminated state; the component may comprise a cover such as a decorative layer providing a surface configured to present an image in an illuminated state that facilitates viewing by an occupant of the vehicle; the component may comprise a cover such as a decorative layer providing a surface configured to present an image in an illuminated state that presents an acceptable visual effect when in an non-illuminated state; the component may comprise a cover such as a decorative layer providing a surface configured to present an image that can be formed to a backing and/or a light guide and with suitable structural/mechanical properties for assembly and use in a vehicle interior.

Exemplary Embodiments—B

According to an exemplary embodiment as shown schematically in the FIGURES, the cover/decorative layer of the component may be provided with a hole pattern shown as a perforation pattern (e.g. laser-perforated hole pattern); the hold pattern may vary, including the design intent/design, shape of openings/holes, (e.g. oblong holes, rounded holes, round holes, orthogonal-shape holes, etc.), the grouping of holes, the orientation of holes, etc. According to an exemplary embodiment, the hole pattern may comprise a perforation pattern that facilitates an expanded viewing angle for the image when illuminated (e.g. allows the occupant when in multiple positions in the vehicle to view the image at the corresponding viewing angle relative to the component/surface). As indicated schematically, a pattern may be provided to allow wide angle viewing with an image comprising the hole pattern (e.g. perforations) that is perceptible as clear/crisp and readily viewed/easily interpreted from any location within the vehicle (more or less regardless of where the occupant reasonably may be situated within the vehicle interior). A pattern may comprise holes arranged in a design pattern shown as three oblong holes close-spaced together; when the design pattern is formed by laser perforation the hole pattern forms formed apertures which becomes a U-shaped aperture arrangement (e.g. due to the effect of the laser function, such as burn off of material); the U-shaped arrangement is configured to provide a visible image when illuminated (e.g. with wide viewing angle) but to be reasonably concealed when not illuminated; the arrangement comprises a reasonable spacing/distance apertures that facilitates light transmission for presentation of the illuminated image but that does not substantially compromise the structural integrity of the material/cover (e.g. as would allow tearing when handled, injection molded/filled, etc.). As shown schematically, the hole/opening pattern (e.g. design pattern) forming the U-shaped formed apertures provides an as-formed pattern that has an acceptable arrangement of openings and material (e.g. perforations, melted material, burned material, gaps, clumps, spacing, etc.); holes/perforations of the formed apertures (e.g. were, utilizing the laser such as on very thin veneer with injection-molding resin through the backside creating light-guide/light-pipe through the opening for light transmission from a light source from the apertures in the interior surface to the holes on the exterior surface).

According to an exemplary embodiment as shown schematically in the FIGURES, the component with cover may be configured for use as a functional/decorative element within a vehicle interior, including with use of various types of user interface configurations (e.g., audio, visual, interactive, lighting, haptics) and with various types of decorative layer configurations (e.g. veneer, stone veneer, wood veneer, coatings, etc.).

According to an exemplary embodiment as shown schematically in the FIGURES, the hole pattern may comprise a design form of three oblong shapes that when implemented/produced (e.g. by laser-perforation on the interior surface of the cover) results in a formed aperture having the form of a single/merged U-shaped aperture. As indicated schematically, at laser-forming of the formed aperture based on the design form of the oblong shapes the oblong shapes may interconnect (e.g. may not create a "clean" hole due to the excess burn-off from the laser, etc.); the pattern of the design form can be selected with spacing between the oblong shapes such that the formed aperture from the laser operation will create a U-shaped aperture that is more suitably fitted for presentation of the image when illuminated (e.g presented at the exterior surface of the cover); accommodation can be made in the design form for the laser operation (e.g. burn-off, melting, etc.) including variations for the type of laser used and/or the speed/intensity and other parameters of the laser operation.

According to an exemplary embodiment as shown schematically in the FIGURES, it has been observed that the design form providing the formed apertures as a generally U-shaped aperture provides acceptable performance in facilitation of off-angle viewing of the image when illuminated; a combination of lighting effect from horizontal oblong holes (e.g. at top and bottom) and from angled oblong holes (e.g at side) enhances the appearance at a wide range of viewing angles; connection of the elements of the design form in the formed aperture may provide a seamless appearance and may facilitate fit of holes in a selected pattern (e.g. allowing greater resolution, quantity, etc. of holes for a desired shape, con, decorative pattern, etc.). According to an exemplary embodiment as shown schematically in the FIGURES, the set of generally U-shaped apertures in the pattern can be optimized to present a desired shape with spacing and structure to provide suitable viewing and suitable mechanical properties (e.g. resistance from tearing, distortion, etc. including during production, injection molding, handling, etc.); such a perforation pattern may provide enhanced image quality for viewing from multiple/all direction. According to an exemplary embodiment as shown schematically in the FIGURES, a pattern form may be provided in a "honeycomb" structure; the laser operation (e.g. burn-off/melt of material from the laser) may make a design form of the three ellipses into a formed aperture of a single/connected aperture.

According to an exemplary embodiment as shown schematically in the FIGURES, the component will be configured for use with natural materials that can be formed/facilitated into products with covers with intended decorative effects; as indicated schematically, a perforation pattern allows real wood, stone and other natural materials to be visible and work seamlessly with lighting and electronics while being visible throughout the vehicle by users (e.g. integrated into an intended visual effect).

According to an exemplary embodiment as shown schematically in the FIGURES, vehicle interior components may be produced that integrate natural materials, including stone veneer and/or wood veneer (e.g. facilitating production of components with covers of veneer with laser perforations that provide a viable solution for lighting integrated with natural material surfaces). According to an exemplary embodiment as shown schematically in the FIGURES, layout/dimensions of elements of the design form such as the "ellipses" and "dots" and angle of slanted "ellipses" and spacing between perforation holes as well as the overall layout of the pattern may be varied to produce an intended effect in the formed apertures and the implementation of the pattern and image on the cover. As indicated schematically, the overall improvement of off-angle viewing can be achieved by use of ellipses in the pattern (e.g. to display and effectively/evenly fill the shape for the image at the surface when illuminated by light while effectively concealing holes/pattern at the surface when unilluminated by light); close arrangement of ellipses may allow the light to be visible more clearly at wider viewing angles; sections of light in the pattern may be arranged to be visible in multiple directions and may provide a sharper image (rather than a blotchier optical appearance); spacing and shaping and sizing of the design elements of the pattern/hole pattern may enhance appearance as intended (e.g. with a small dot between the clumps of ellipses to "break up" the visual effect at the surface when not backlighted/unilluminated to hide the pattern and when backlighted/illuminated to display a generally more "seamless" appearance including between element such as the ellipses). According to an exemplary embodiment as shown schematically in the FIGURES, the configuration of the cover with laser perforations through veneer will improve off-angle viewing, including for decorative elements that may be positioned off to a side and/or not directly in a line of sight for the occupant; the configuration is intended to improve visual appearance within a wide range of viewing angle for the occupant to present the image when illuminated (e.g. icons, elements, patterns, etc.); the pattern may be designed/improved to enhance greater off-angle viewing (e.g. oblong shape consist of a square with two three degree arcs interconnecting on both ends, dots consist of four three degree arcs interconnected, etc.)

According to an exemplary embodiment as shown schematically in the FIGURES, the pattern will not be noticeably visible (at casual observance) on the surface of the cover when unilluminated (e.g. when "dead-fronted"); the pattern will provide improved image quality including at off-angle viewing when illuminated; and the pattern will provide suitable mechanical properties such as not to tear during handling, assembly, injection molding, etc. As indicated schematically, the pattern will be effective for straight edges and curved ends to be formed in the formed aperture (generally); the pattern should also be able to provide clear off-angle viewing at narrower portions of shapes; when viewing an image at a sharp angle it is preferred to present a clear view of the outline of the shape as well even/consistent lighting throughout the body of the shape. According to an exemplary embodiment as shown schematically in the FIGURES, the configuration of the cover will not produce any substantial loss of clarity as viewing angle becomes sharper (within a reasonable threshold for an occupant of the vehicle interior).

According to an exemplary embodiment as shown schematically in the FIGURES, the three geometric shape referred to as "stadium" (e.g. with oblong perforations/holes that converge into one hole during the laser operation) will be provided with spacing between rows of perforations that will enhance illumination effect but will not destroy the structural integrity of the material (e.g. will not remove material as to weaken to risk of mechanical failure) and that will not be readily visible when unilluminated (e.g. "dead-fronted"); the design intent is an even view at all angles and even light on thinnest portions of a shape (e.g. thin end of image shape) as for wider portions.

According to an exemplary embodiment as shown schematically in the FIGURES, to achieve effectiveness of perforations such shapes will be a minimum of 0.7 mm in front/open/face width (e.g. to accommodate geometric stadium groupings); acceptable parts must have geometric stadiums connected on backside and on front side they must be connected (e.g. to a degree as indicated); an acceptable visual effect may be provided out of a large quantity of connected formed apertures; small connecting between rounded square and geometric stadium groupings may be acceptable when connection hole width is not excessive (e.g. not visible generally when unilluminated). (As indicated, cover with holes and/or formed apertures are shown at approximately 40× magnification.) Selection of the hole pattern may be configured to conceal/hide the holes on the surface (e.g. on the veneer).

According to an exemplary embodiment as shown schematically in the FIGURES, a pattern of holes not in compliance may present noticeable geometric stadium groupings not connected and/or blocking of holes by material. According to an exemplary embodiment as shown schematically in the FIGURES, rounded squares and geometric stadium groupings will tend to form a suitable a connection hole/path; the connection path of excessive width or perforations with visibly excessive burning marks may be unacceptable as visible in default/unilluminated (e.g. when off/"dead-fronted"). According to an exemplary embodiment as shown schematically in the FIGURES, unacceptable perforations and/or geometric stadium groupings will appear as not connected and/or with blocked material and/or with excessive width of connections between rounded squares and geometric stadium.

According to an exemplary embodiment as shown schematically in the FIGURES, the laser apparatus for the laser operation may be a laser-device (carbon dioxide/CO2, ultraviolet/UV laser, etc.) moving the laser across the surface. In the laser operation, the perforation holes will tend to be wider and more pronounced on back side (e.g. the interior surface) of the cover; on the front side (e.g. the perforation holes will tend to be thinner and smaller; when forming of perforation holes is obstructed by material (e.g. "tougher" material such as elevated stone or tougher wood grain), an additional pass over with the laser at a lower power is made to remove the obstruction. According to an exemplary embodiment as shown schematically in the FIGURES, the laser operation may be performed with a laser apparatus (e.g. with CO2, UV or fiber/fiber-optic, galvanometer-included/mirror-directed laser, UV plotting laser, etc.).

According to an exemplary embodiment as shown schematically in the FIGURES, the operation/process of laser perforation may consist of consistent speed and power throughout or variability in different sections (e.g. slowing speed at the joining of geometric stadiums for a more even connection); increasing power and frequency at raised surfaces across a texture (elevation in stone surface or tougher wood grain); slowing down speed between moving from geometric stadium grouping to rounded square may also be used to decrease the occurrence of connection between groupings and rounded square.

According to an exemplary embodiment as shown schematically in the FIGURES, materials such as veneer, stone veneer, wood veneer, leather, TPO, fabric, wood, stone, etc. may be used for the cover/decorative layer; a coating (e.g. lacquer, protective coating, etc.) may be applied at the cover of the part/component for surface protection (e.g. aging/exposure protection, sunlight protection, scratch-proofing, anti-mar protection).

According to an exemplary embodiment as shown schematically in the FIGURES, the laser operation of perforation (e.g. forming formed apertures) on stone/veneer may be relatively difficult due to the changing texture and elevation on the surface; laser operation/production may be less difficult if scanning the surface is completed before the laser operation (e.g. to communicate to laser that/where elevated surface/texture requires more power/time/intensity).

According to an exemplary embodiment as shown schematically in the FIGURES, certain stone veneer materials exhibit varying properties in the laser operation.

Exemplary Embodiments—C

According to an exemplary embodiment, an improved vehicle interior component may comprise a cover, such as a decorative layer, which provides a surface configured to present an image under an illumination state. The arrangement of the pattern of holes at the surface of the cover is intended to improve the functional/optical performance of the component including concealment of holes/hole formations and improved angle of visibility and regularity (reduction of jagged edges of the pattern/contour).

According to an exemplary embodiment, the hole pattern may comprise a plurality of openings passing through the cover to form an exterior pattern comprising a plurality of holes on the exterior surface and an interior pattern comprising a plurality of formed apertures on the interior surface. The plurality of holes may include at least one or a combination of circular holes, rounded square holes, semicircular holes, elongated holes, elliptical holes, polygonal holes, star-shaped holes, heart-shaped holes, ring-shaped holes, fan-shaped holes, crescent-shaped holes, conical holes and tooth-shaped holes, by addition or subtraction. The plurality of holes may correspond to the desired contour to form a visible contour conforming with the desired contour. When the holes forming the visible contour are circular holes, the circular holes may be tangent to the desired contour. When the holes forming the visible contour are elongated holes, the elongated holes may be provided with exterior long sides overlapping the desired contour. When the visible contour comprises a sharp corner, the sharp corner is formed by at least one of: (1) at least two intersecting elongated holes; and (2) polygonal holes. The desired contour may include at least one of: (1) an exterior contour delimiting a closed region alone; and (2) an exterior contour and an interior contour delimiting a closed region together. A plurality of holes may be in the closed region, and the plurality of holes include at least one or a combination of circular holes, rounded square holes, semi-circular holes, elongated holes, elliptical holes, polygonal holes, star-shaped holes, heart-shaped holes, ring-shaped holes, fan-shaped holes, crescent-shaped holes, conical holes and tooth-shaped holes, by addition or subtraction. The holes in the closed region may comprise at least one combined unit, each combined unit being formed by combining a plurality of holes according to a predetermined arrangement mode. Each combined unit may comprise at least one elongated hole. The elongated hole may be an oblong hole, and the at least one combined unit may include at least one first combined unit comprising two oblong holes having a length direction at an included angle of 20 deg-80 deg to each other and/or at least one second combined unit comprising one oblong hole and one circular hole in an extension line of a length direction of the oblong hole and/or at least one third combined unit consisting of at least one first combined unit and at least one second combined unit. A length of the oblong hole may be equal to 1.5-3 times a diameter of the circular hole, and/or a width of the oblong hole may be equal to the diameter of the circular hole. An aperture between adjacent holes may be equal to 0-5 mm. An area of a single hole may be set to 0.0007-10 sq mm. When the hole is a circular hole, the area of the hole may be set to 0.0007-0.8 sq mm.

According to an exemplary embodiment as shown schematically in FIGS. 49A-49D, the cover may comprise a pattern formed of a plurality of holes H (as an example) as viewed from the exterior surface of the cover. The holes may have various dimensional forms/shapes (as an example) at least one or a combination of circular, elongated (e.g., oblong) and other forms/shapes as shown (as an example) rounded square, semi-circular, elliptical, polygonal, star-shaped, heart-shaped, ring-shaped, fan-shaped, crescent-shaped, conical and tooth-shaped forms/shapes, by addition or subtraction. An area of a single hole may especially be set to 0.0007-10 sq mm (corresponding to elongated holes for example), which area range may cover the area of holes of various shapes and can ensure concealment of the pattern without illumination, while ensuring sufficient brightness of the pattern during illumination. When the hole is circular, the area of the hole may especially be set to 0.0007-0.8 sq mm.

According to an exemplary embodiment as shown schematically in FIGS. 49A-49D, the holes may include a variety of arrangements (e.g. hole patterns/arrangements, hole pattern segment arrangements, etc.). The first arrangement AR1 of holes H includes a plurality of rows of circular holes in parallel in the X direction, and two adjacent rows of circular holes are staggered with each other in the Y direction. The second arrangement AR2 of holes H includes a plurality of rows of oblong holes in parallel in the X direction, each row of oblong holes has a length direction in the X direction, and two adjacent rows of oblong holes are staggered with each other in the Y direction. The third arrangement AR3 of holes H includes a plurality of rows of oblong holes in parallel in the X direction, two adjacent rows of oblong holes have a length direction in the X direction and in the Y direction, respectively, and the two adjacent rows of oblong holes are staggered with each other in the Y direction. The fourth arrangement AR4 of holes H is composed of a plurality of parallelogram-shaped combined units E3, each combined unit E3 includes one circular hole and three oblong holes, the length directions of two adjacent oblong holes are at an inclined angle of 60 deg to each other, and the circular holes are at the intersection points of the extension lines of the length directions of the three oblong holes. Compared with the first arrangement AR1, the second arrangement AR2 increases the viewing angle range of the hole pattern in the X direction, the third arrangement AR3 increases the viewing angle range of the hole pattern in the X direction and in the Y direction, and the fourth arrangement AR4 increases the viewing angle range of the hole pattern almost in all directions. Thus, the fourth arrangement AR4 of holes H is a better arrangement, and the combination of circular holes and a plurality of oblong holes may provide enhanced image quality for viewing from multiple/all directions.

Figures 50, 51:
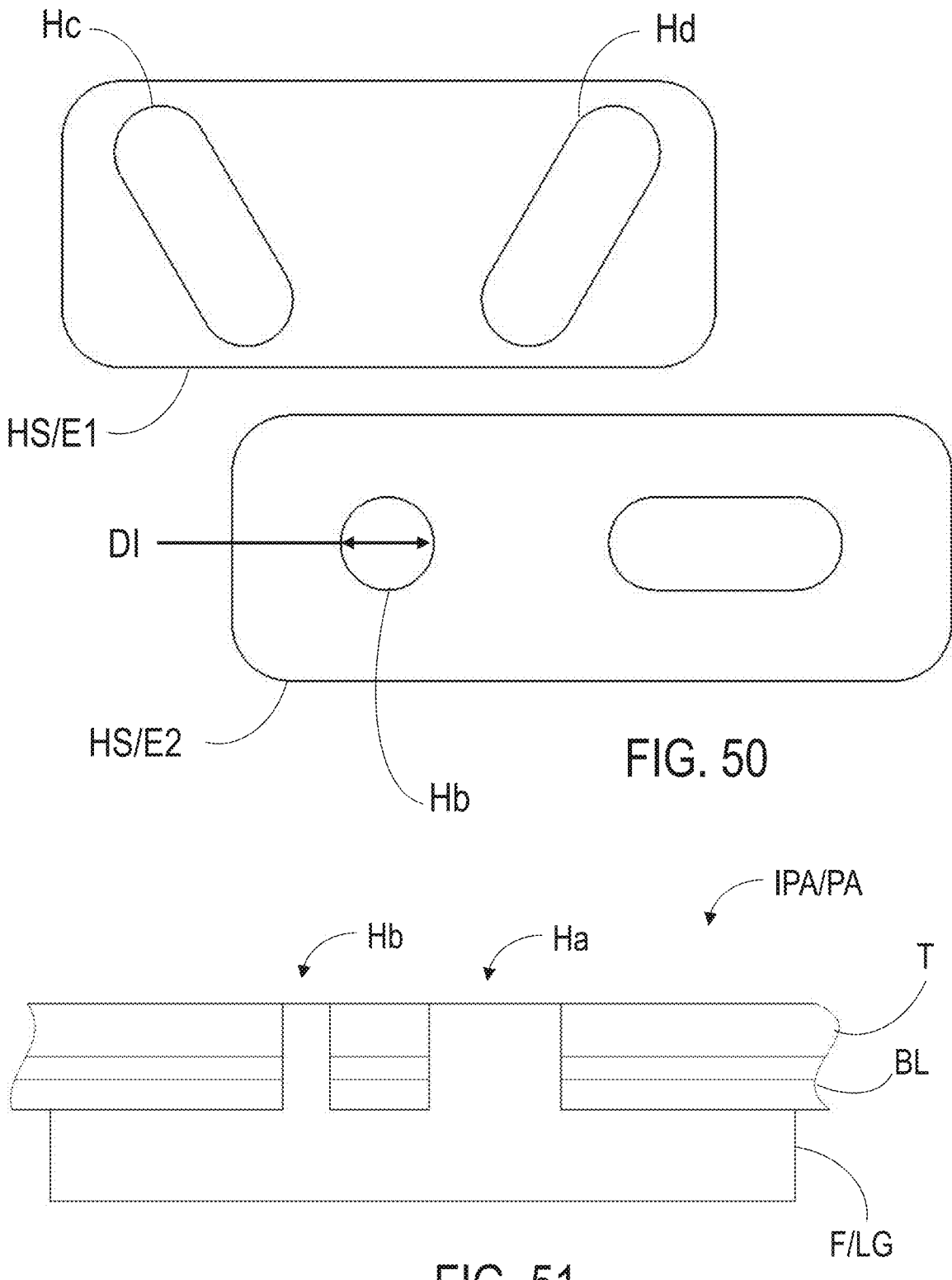
FIG. 50 is a schematic diagram of a segment of a pattern for cover of a component for a vehicle interior according to an exemplary embodiment.
FIG. 51 is a schematic partial cross-section view of a component for a vehicle interior according to an exemplary embodiment.

According to an exemplary embodiment as shown schematically in FIGS. 50 and 51, a parallelogram-shaped combined unit E3 is composed of a first combined unit E1 and a second combined unit E2, the first combined unit E1 comprises two oblong holes with length directions at an inclined angle of 60 deg to each other, and the second combined unit E2 comprises one oblong hole and one circular hole on an extension line of the length direction of the oblong hole. Different oblong holes may have the same shape and size, and the circular holes may be at the intersection points of the extension lines of the length directions of the three oblong holes. It is understood that the combined units of the holes H may include various implementation variants; in the first combined unit E1, the inclined angle between the length directions of the two oblong holes may be chosen to be any other angle than 60 deg (in particular any angle between 20 deg and 80 deg); the holes H in each combined unit may be designed in various shapes according to actual needs.

According to an exemplary embodiment as shown schematically in FIGS. 50 and 51, the circular hole has a diameter of (as an example) 0.1-0.3 mm; the oblong hole has a length of about 1.5-3× the diameter DI and a width (as an example) about equal to the diameter DI; in the first combined unit E1, a minimum aperture between the two oblong holes is about 0-5 mm (when the minimum aperture is 0, the two oblong holes abut against each other); in the second combined unit E2, an aperture between the circular hole and the oblong hole is about 0-5 mm (when the minimum aperture is 0, the circular hole and the oblong hole abut against each other). "Z" represents a viewing distance of an oblong hole at different viewing angles, which is about 1-3× the diameter DI (as an example) when the viewing angle is at an inclined angle VA of about 45 deg to the Y direction, the viewing distance Z is about 1.5× the diameter DI (greater than the viewing distance for a circular hole). VO represents a viewing angle from above the cover, which depends on the thickness TH of the cover (e.g., 0.1-0.8 mm) and the size of the hole H, so that the viewing angle VO in the length direction of the oblong hole is greater than the viewing angle VO of a circular hole. The oblong holes may have concealment and an increased one-way viewing angle, and the oblong holes in different directions may increase the viewing angles in different directions.

According to an exemplary embodiment, the step of laser-forming a hole pattern in the cover may comprise disposing a plurality of holes corresponding to the desired contour to form a visible contour conforming with the desired contour. The desired contour may include at least one of: (1) an exterior contour delimiting a closed region; and (2) an exterior contour and an interior contour delimiting a closed region together. The step of laser-forming a hole pattern in the cover may further comprise disposing a plurality of holes in the closed region. The holes in the closed region may comprise at least one combined unit, each combined unit being formed by combining a plurality of holes according to a predetermined arrangement mode. The step of laser-forming a hole pattern in the cover may further comprise arranging at least one adjustment unit between the holes forming the visual contour and the at least one combined unit, each adjustment unit comprising at least one hole.

Figures 52, 53, 54:
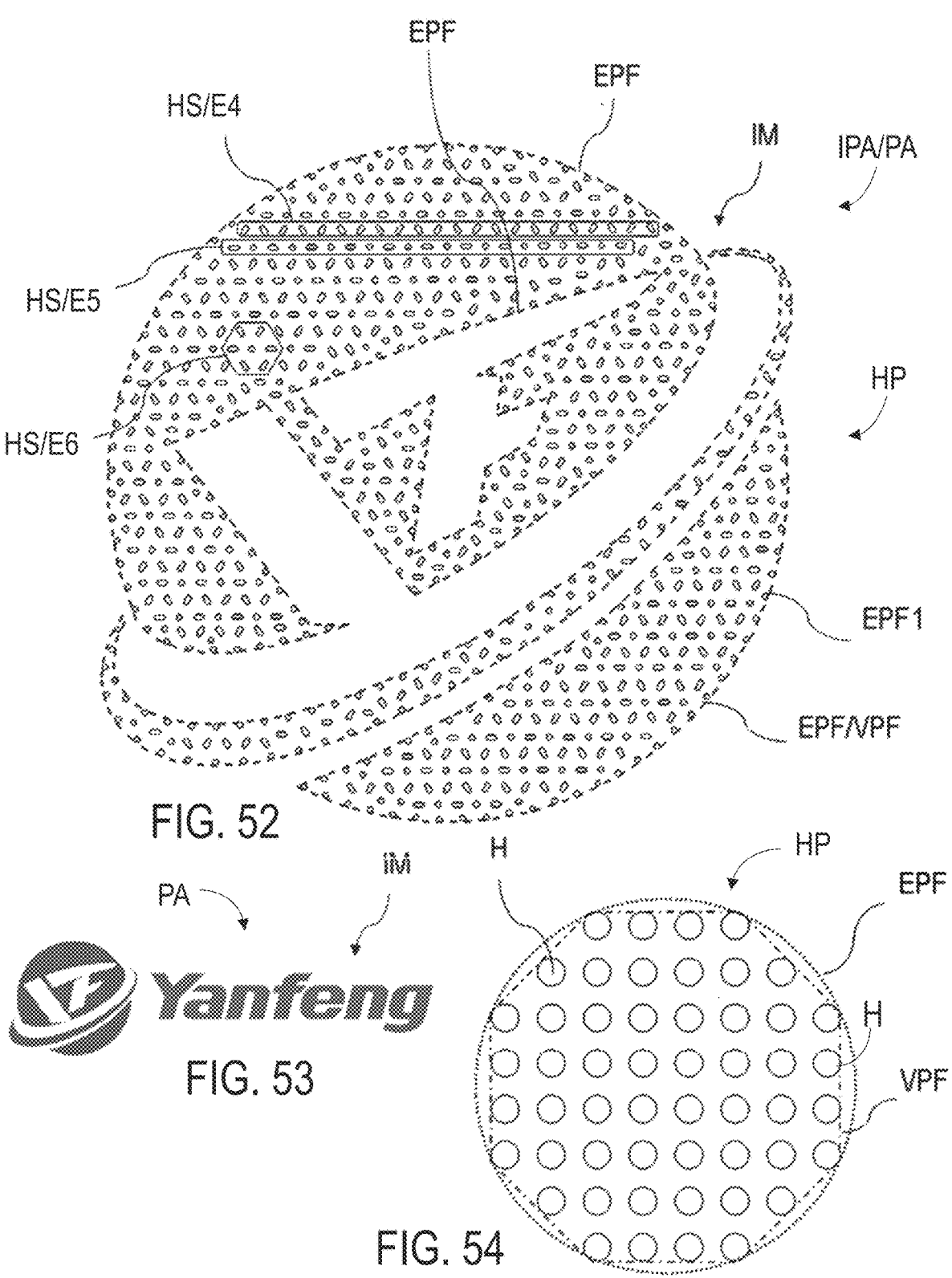
FIG. 52 is a schematic diagram of an image at a surface of a component for a vehicle interior according to an exemplary embodiment.
FIG. 53 is a schematic diagram of an image at a surface of a component for a vehicle interior according to an exemplary embodiment.
FIG. 54 is a schematic diagram of a pattern at a surface of a component for a vehicle interior according to an exemplary embodiment.

According to an exemplary embodiment as shown schematically in FIGS. 52 and 53, the arrangement method of the hole pattern capable of displaying an image IM (e.g., marks) may comprise the following steps:

(1) Determining the desired contour EPL and the combined units according to the required hole pattern. The "desired contour" shall be understood as a contour predetermined according to the boundary of a required hole pattern (e.g., brand marks and signal marks) before the holes H are provided. The desired contour EPL may comprise either an exterior contour EPL1 delimiting the closed region alone or an exterior contour EPL1 and an interior contour EPL2 delimiting the closed region together. The combined units are adapted to be arranged in the closed regions and include (as an example) the first combined unit E1, the second combined unit E2, the parallelogram-shaped combined unit E3 composed of the first combined unit E1 and the second combined unit E2, other combined units E4 and E5 composed of a single row of a plurality of holes and a hexagon-shaped combined unit E6 composed of a plurality of holes.

(2) Providing a plurality of holes H corresponding to the desired contour EPL to form a visible contour VPL conforming with the desired contour EPL. These holes H forming the visual contour VPL can be designed according to actual needs into the various shapes (as an example) in the case that the holes H forming the visual contour VPL are circular holes, the circular holes are tangent to the desired contour EPL (see FIG. 52); in the case that the holes H forming the visible contour VPL are elongated holes, the elongated holes are in such a way that their exterior long sides ("exterior" is defined with reference to the interior-exterior direction of the pattern IM) overlap the desired contour EPL (refer to FIG. 56); when the visible contour VPL comprises a sharp corner, the sharp corner is formed by at least two intersecting elongated holes (see FIG. 56) and/or by polygonal holes. Compared with an arrangement in which the contour of the image is not first outlined through the holes H (see FIGS. 10B and 54, in which the outlined visual contour VPL does not coincide with the desired contour EPL, resulting in a jagged edge of the visual contour VPL), the arrangement may improve the jagged edge of the visual contour VPL of the image IM (see also FIG. 56) because the visual contour VPL conforms with the desired contour EPL.

(3) Arranging at least one predetermined combined unit in a suitable arrangement in the closed region delimited by the desired contour EPL/outlined visual contour VPL. For some relatively-small-sized specific regions (e.g., relatively narrow regions) delimited by the desired contour EPL/outlined visual contour VPL, one or more specifically-shaped (e.g., circular or elongated) holes H may be only between the holes H forming the visual contour VPL, or the specific regions may only comprise the holes H forming the visual contour VPL.

(4) Optionally arranging at least one adjustment unit between the holes forming the visual contour VPL and at least one combined unit or between adjacent combined units, each adjustment unit comprising at least one hole, such as a circular hole and/or an elongated hole, or fine-adjusting the arrangement of at least one of the combined units itself to ensure that the aperture between adjacent holes meets the required value (for example 0-5 mm).

Figures 55A, 55B, 56:
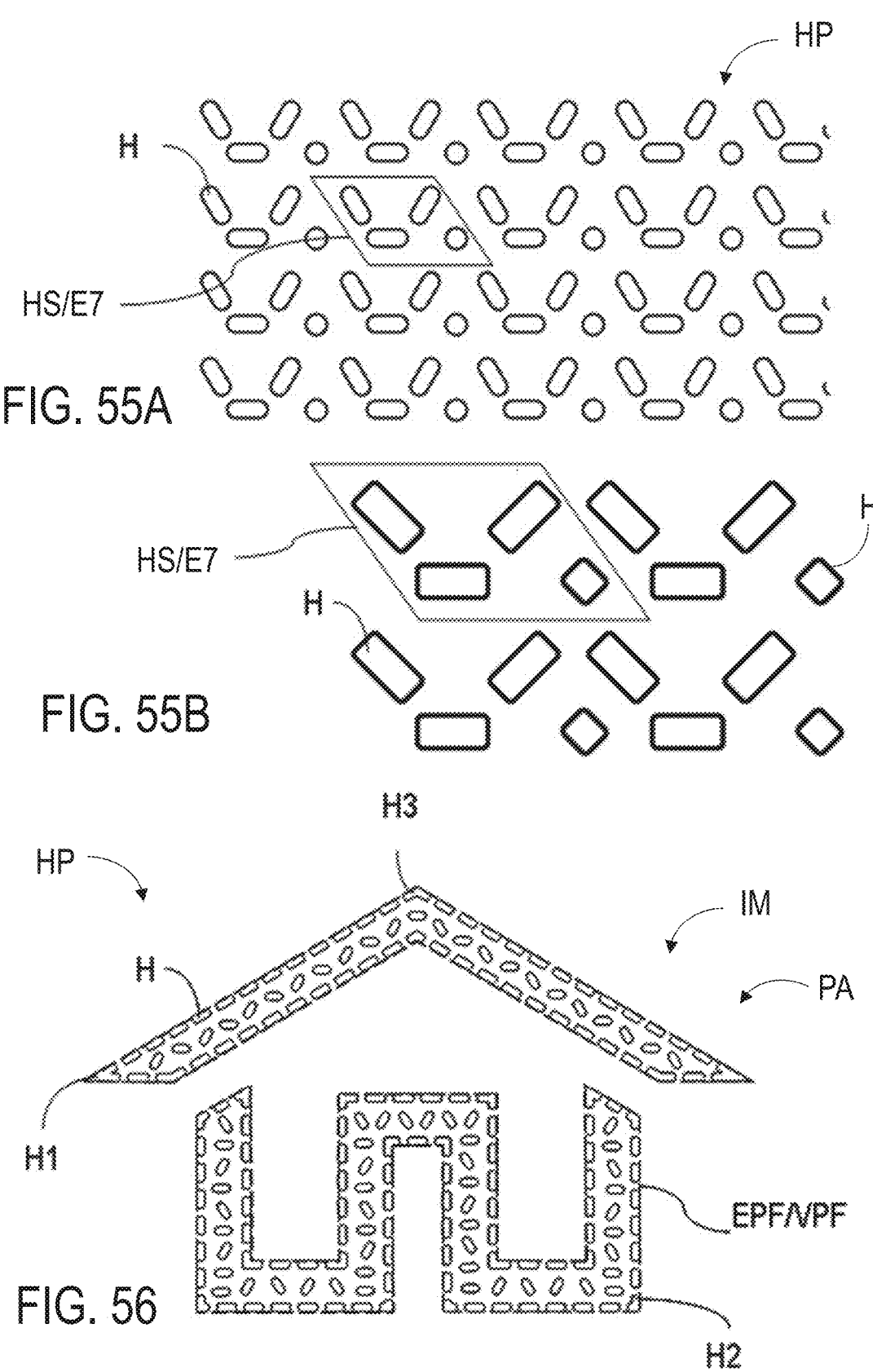
FIG. 55A is a schematic diagram of a pattern at a surface of a component for a vehicle interior according to an exemplary embodiment.
FIG. 55B is a schematic diagram of a pattern at a surface of a component for a vehicle interior according to an exemplary embodiment.
FIG. 56 is a schematic diagram of an image at a surface of a component for a vehicle interior according to an exemplary embodiment.
Figure 57:
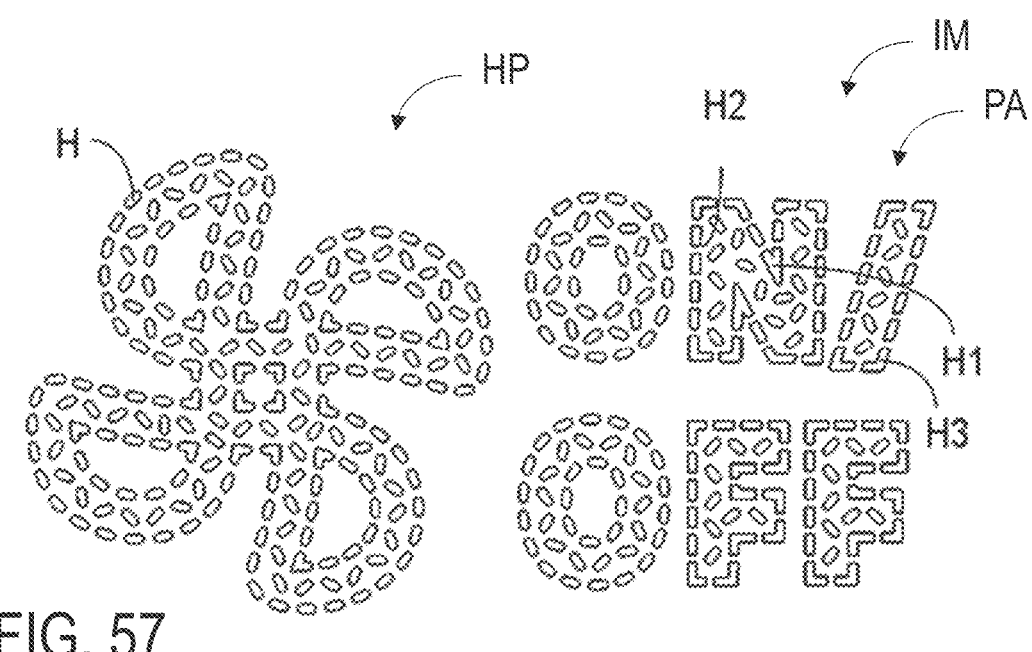
FIG. 57 is a schematic diagram of an image at a surface of a component for a vehicle interior according to an exemplary embodiment.
Figure 58:
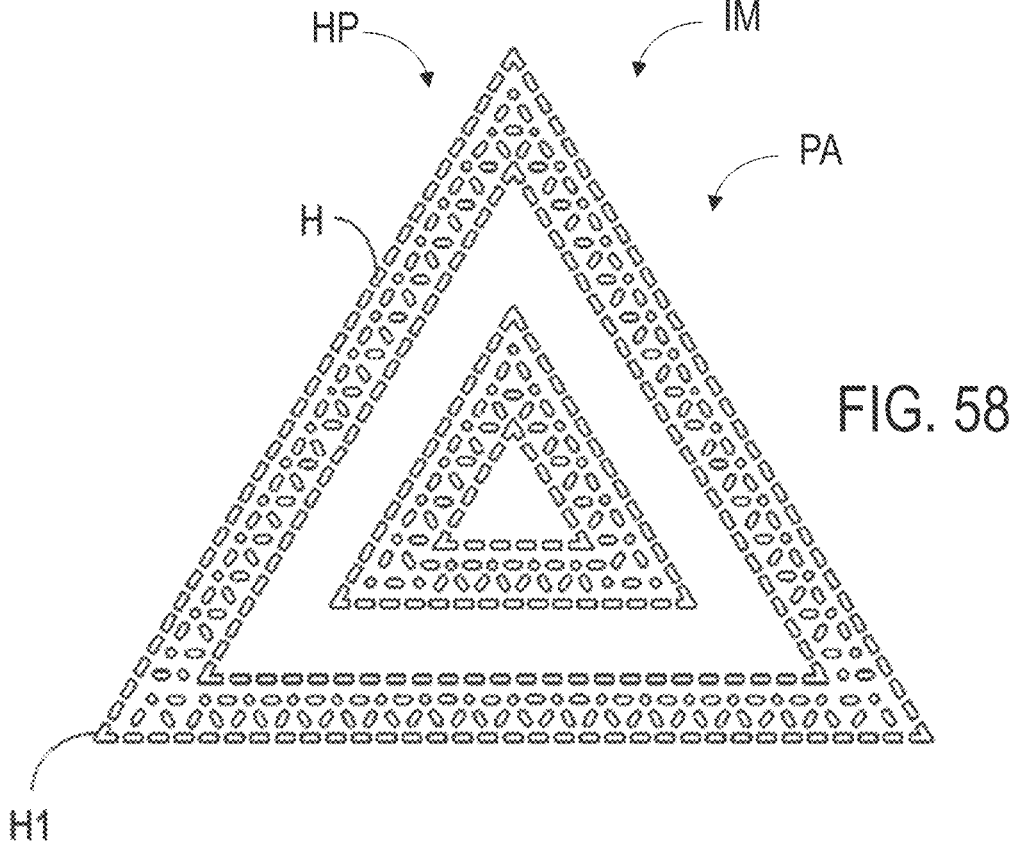
FIG. 58 is a schematic diagram of an image at a surface of a component for a vehicle interior according to an exemplary embodiment.
Figures 59, 60:
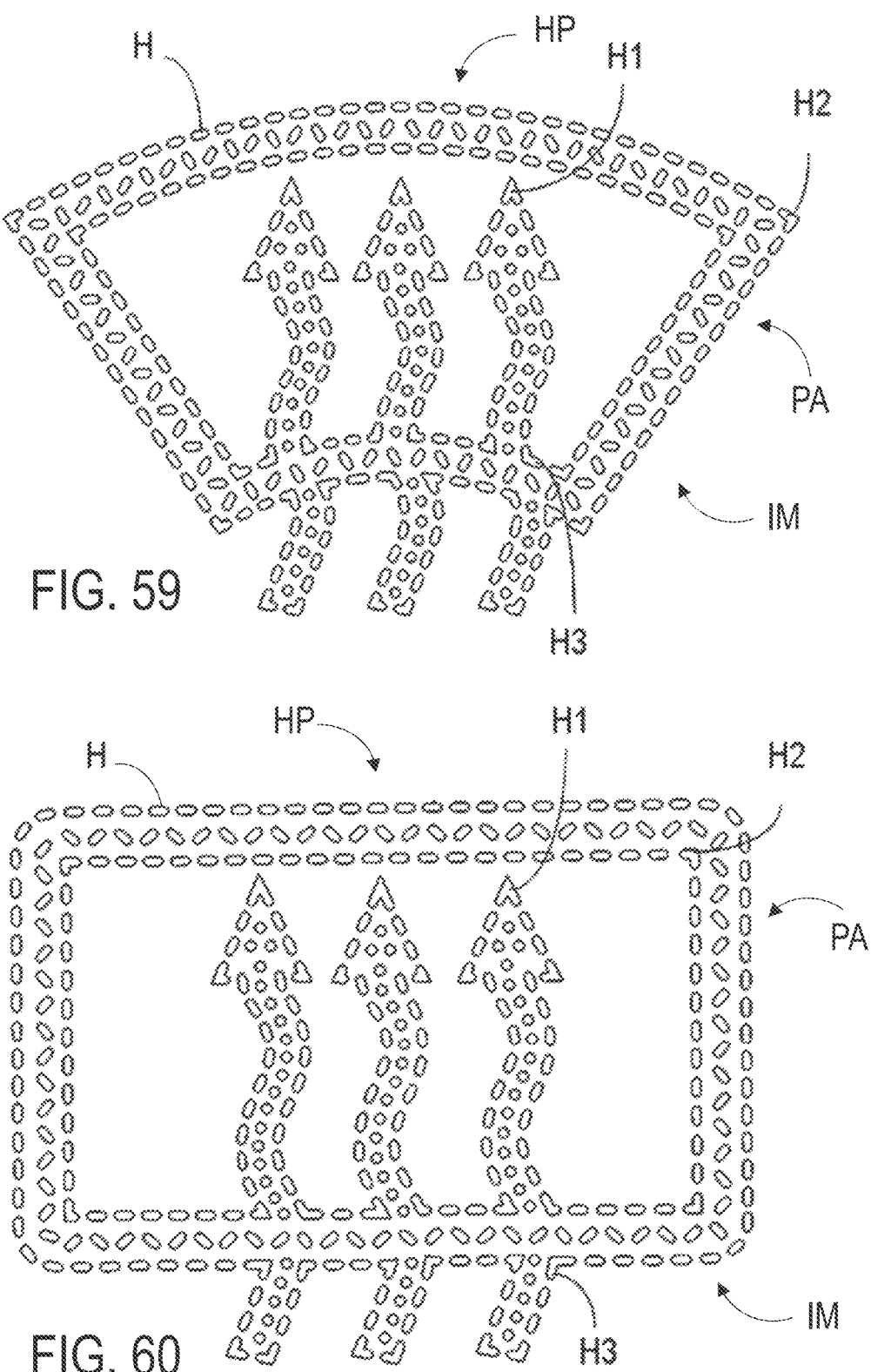
FIG. 59 is a schematic diagram of an image at a surface of a component for a vehicle interior according to an exemplary embodiment.
FIG. 60 is a schematic diagram of an image at a surface of a component for a vehicle interior according to an exemplary embodiment.

According to an exemplary embodiment as shown schematically in FIG. 55A, the first combined unit E1 and the second combined unit E2 may form another parallelogram-shaped combined unit E7 different from the combined unit E3 by the combination based on different relative positions, three oblong holes form an upwardly-flared substantially U-shaped configuration ("stadium") with circular holes on the extension line of the length direction of the oblong holes at the bottom. According to an exemplary embodiment as shown schematically in FIG. 55B, the oblong holes of the combined unit E7 may be changed to rounded rectangular holes having a similar shape, and the circular holes may be changed to rounded square holes having a similar shape.

According to an exemplary embodiment as shown schematically in FIGS. 56, 57, 58, 59 and 60, for the desired contour EPL/outlined visible contour VPL (including exterior and interior edges) for the particular pattern shown, when the contours comprise sharp corners, the sharp corners may be defined by two intersecting elongated holes, such as two intersecting elongated holes H1 with an outlined acute angle, two intersecting elongated holes H2 with an outlined right angle, and two intersecting elongated holes H3 with an outlined obtuse angle.

Exemplary Embodiments—D

Referring to FIGS. 1A and 1B, a vehicle V providing an interior I is shown according to an exemplary embodiment. The interior I of the vehicle V may comprise interior components/systems, including panels (e.g., instrument panels and door panels) and consoles (e.g., a floor console and an overhead console) and other decorative components. See also FIGS. 1B, 2A, 4A, 5A and 36.

According to exemplary embodiments as shown schematically in FIGS. 1B and 2A, the interior of the vehicle may comprise a component C configured to provide a user interface/system, for example by means of a display D configured to display an image IM. According to an exemplary embodiment as shown schematically in FIGS. 2A and 3A-3C, the user interface system/component C may include a surface/panel that provides a surface effect SE (e.g., texture, color, contour, visual effect and image display); as shown schematically in FIGS. 3A and 3B, the component C may include a surface effect SE, such as wood decoration/texture (e.g., wood veneer and finishing); as shown schematically in FIGS. 3C and 3D, the component C may include a surface effect SE, such as a shaped/molded contour (e.g., with a visual/texture effect such as plastic, metal and natural materials).

As schematically indicated according to the exemplary embodiments in FIGS. 3A-3D, the component C may be configured to be illuminated (e.g., from a light source). See also FIG. 7 (e.g., light source L and illumination/control module M). As schematically indicated in FIGS. 3A and 3C, prior to providing illumination, the component C may be configured to present the general appearance of a cover/surface (e.g., a wood veneer/surface in FIG. 3A or a contour/surface in FIG. 3B). As schematically indicated in FIGS. 3B and 3D, when the illumination is provided (e.g., from the light source L through the substrate/surface to the cover/surface), the component C may be configured to present a desired visible effect through the surface effect as shown by the image IM (e.g., an illumination image visible through/on the surface). As schematically indicated, the image IM is presented in a luminous form on a surface (for example, a user interface) of the component C. See FIGS. 3B and 3D (showing images IM in the form of icon set types that may indicate a locked or unlocked state of a vehicle door or other systems). According to an exemplary embodiment as shown schematically in FIGS. 3B, 3D, 49A-49D, 50, 51, 55A-55B, 56, 57, 58, 59 and 60, the image IM presenting an icon set that indicates a locked/unlocked state may include a set of apertures/perforations as shown by holes H passing through the cover/surface (e.g., holes passing through the cover and any intermediate layers (e.g., a backing/layer of a light-proof material)) to transmit light from the light source (e.g., present a backlit image in a form presented at the light source and/or through an arrangement/pattern of holes). See also FIGS. 11A-11C, 12A-12C and 13A-13B.

According to an exemplary embodiment as shown schematically in FIGS. 4A-4B and 5A-5D, a component P may be configured to be implemented in a decorative part/component C/P, shown as a floor console FC, to present a display D of a decorative component/part P of an instrument panel IP or a door panel DP; according to exemplary embodiments, the decorative part/component may be configured as any of a variety of other interior decorative components of a vehicle (including decorative components/products). According to an exemplary embodiment as shown schematically in FIGS. 4B and 5B, the decorative component may provide a surface on which an ornamental design/visual effect (when illuminated by a light source/backlit display) shown as an image IM may be presented. See also FIGS. 6B-6D. According to an exemplary embodiment as shown schematically in FIGS. 4A and 5A, the decorative component may exhibit a surface effect (without images) unless/until illuminated by a light source (e.g., until backlit from a light source). See also FIGS. 3A, 3C, 4A, 5A and 6A.

Referring to FIGS. 2B-2C, 4C, 6, 6A-6D and 7, the part/product P may include a user interface including a decorative region DR in which an ornamental design/visual effect, such as a decorative image (e.g., a decorative image visible on the surface in FIG. 6B), may be presented, and an instrument region IR in which a visual effect, such as content in the form of information/signals (e.g., content visible on the surface in FIG. 6C) may be presented. As schematically indicated, when the component/user interface is illuminated, the image may be presented/projected through a surface effect SE of the cover of the component (the effect is visible when the image is not presented), shown as a wood-decorated/textured effect W. Compare FIG. 6A (off/not illuminated) with FIG. 6D (illuminated).

As schematically indicated in FIGS. 6A-6D, the decorative component/product C/P has a surface effect shown as a wood decoration/texture W, the surface effect may be configured to provide a desired ornamental design/visual effect in the decorative region DR when backlighting is provided (e.g., from module L in FIG. 7), and to provide an information/instrument display in the instrument region IR when backlighting is provided (e.g., from module M in FIG. 7). As shown schematically according to an exemplary embodiment in FIG. 6A, the product P presents a surface effect of a wood decoration/texture W (e.g., a cover layer) before the illumination is provided (e.g., until backlit from a light source L). According to an exemplary embodiment as shown schematically in FIGS. 6B and 6D, when the decorative region DR is illuminated (e.g., backlit from the light source L), an ornamental/visual effect shown as a decorative image of a specified industrial design (e.g., a circular-shaped lighting arrangement) is presented on the wood-decorated/textured surface W of the product P; as shown schematically in FIGS. 6C and 6D, when the instrument region IR is illuminated (e.g., backlit from the light source M), an information/data display is presented on the wood-decorated/textured surface W of the product P. See also FIG. 4B.

As shown schematically according to an exemplary embodiment in FIG. 7, the assembly/product P may comprise a composite structure comprising a cover/top layer P (e.g. providing a surface/surface effect) and a backing layer (shown as a backing layer BL) and a substrate S (which may comprise or be attached to a carrier/structure); as shown schematically in FIG. 7, a light source L (e.g., an LED array/substrate aligned with the decorative region DR) and an instrument module M (e.g., a module including a light source aligned with the instrument region IR) may be provided to illuminate and/or actuate the user interface. According to an exemplary embodiment as indicated schematically, the module (e.g. shown as illumination/control module M) may comprise a controller/control system and include and/or be configured to operate the light source/light L (e.g. light panel, display panel, LED array, LED display, monitor, LED monitor, light array, light base, light module, integrated circuit/light panel, integrated circuit/display, etc.) for the display D and/or to provide the image presentation area IPA of the component/part C/P (e.g. at a surface, at a surface with a user interface, with a user interface comprising an input device, etc.).

Figures 8A, 8B, 9A, 9B, 9C, 9D, 9E, 9F, 9G:
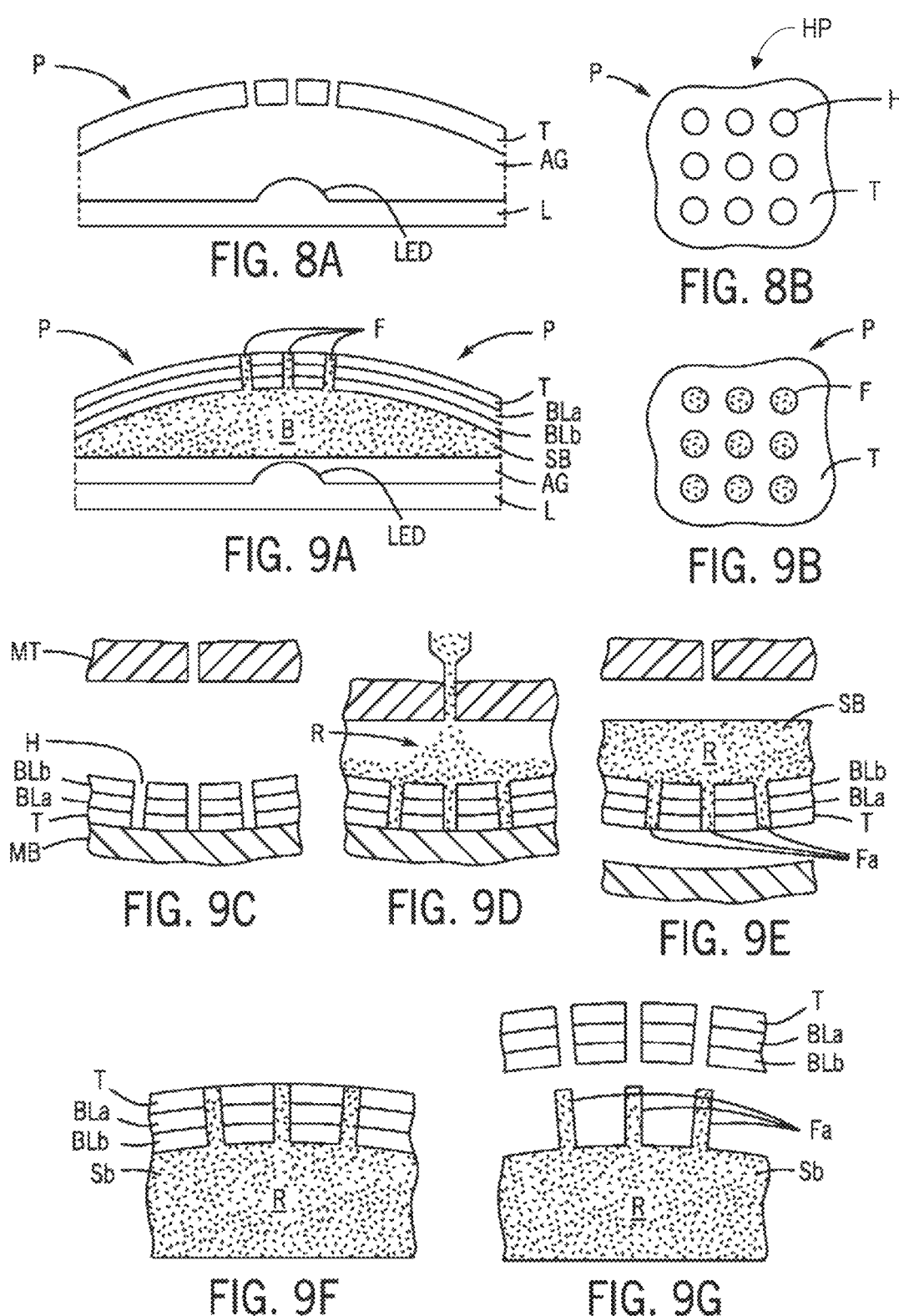
FIG. 8A is a schematic cut-away section view of a component for a vehicle interior according to an exemplary embodiment.
FIG. 8B is a schematic cut-away plan view of a component for a vehicle interior according to an exemplary embodiment.
FIG. 9A is a schematic cut-away section view of a component for a vehicle interior according to an exemplary embodiment.
FIG. 9B is a schematic cut-away plan view of a component for a vehicle interior according to an exemplary embodiment.
FIGS. 9C to 9E are schematic section views of a process to produce a component for a vehicle interior according to an exemplary embodiment.
FIG. 9F is a schematic cut-away section view of a panel of a component for a vehicle interior according to an exemplary embodiment.
FIG. 9G is a schematic cut-away exploded section view of a panel of a component for a vehicle interior according to an exemplary embodiment.
Figures 10A, 10B, 10C:
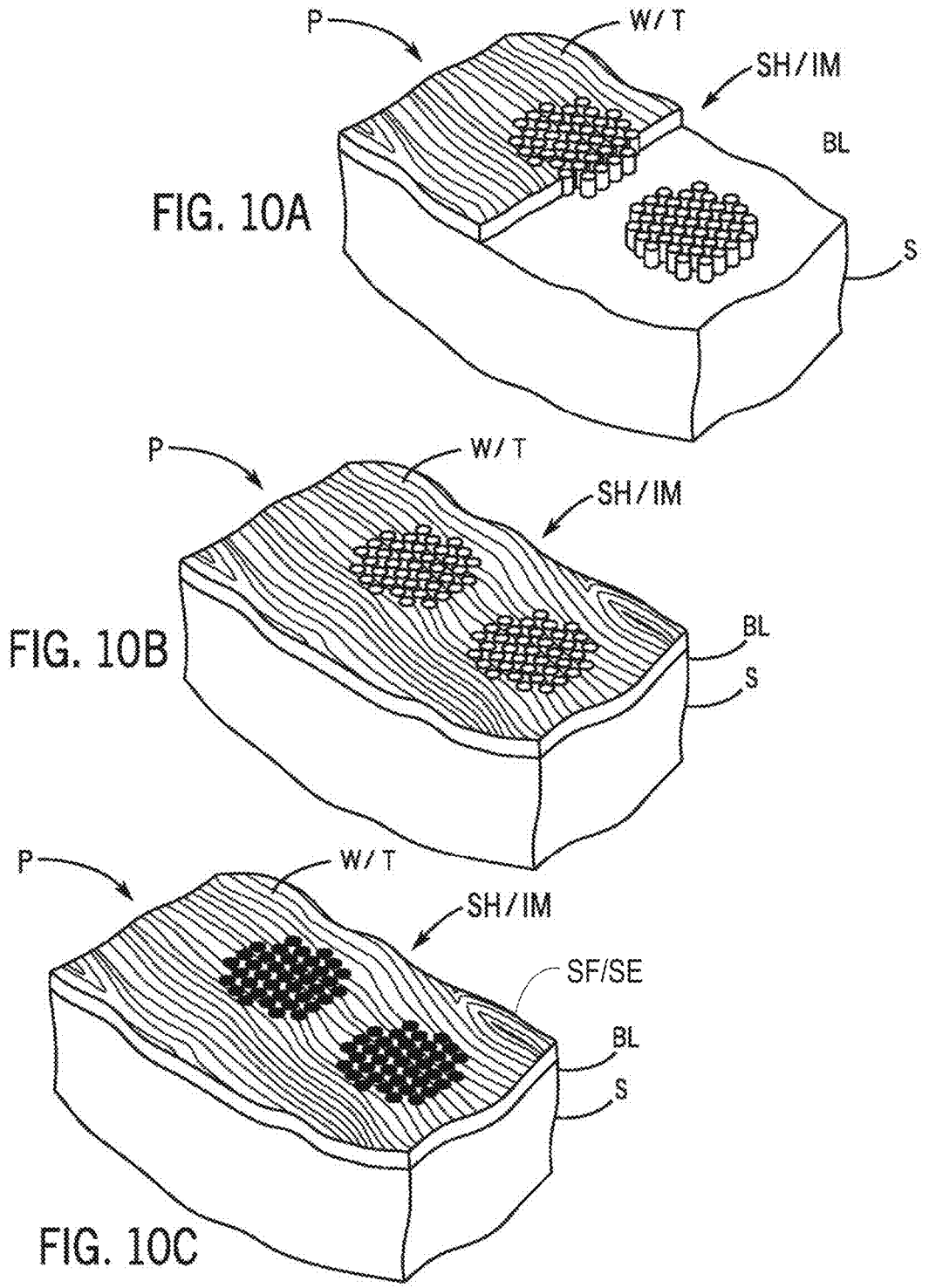
FIG. 10A is a schematic perspective cut-away view of a component for a vehicle interior according to an exemplary embodiment.
FIG. 10B is a schematic perspective cut-away view of a component for a vehicle interior configured to present a display/image according to an exemplary embodiment.
FIG. 10C is a schematic perspective cut-away view of a component for a vehicle interior configured to present a display/image according to an exemplary embodiment.
Figures 11A, 11B, 11C, 12A, 12B, 12C, 13A, 13B:
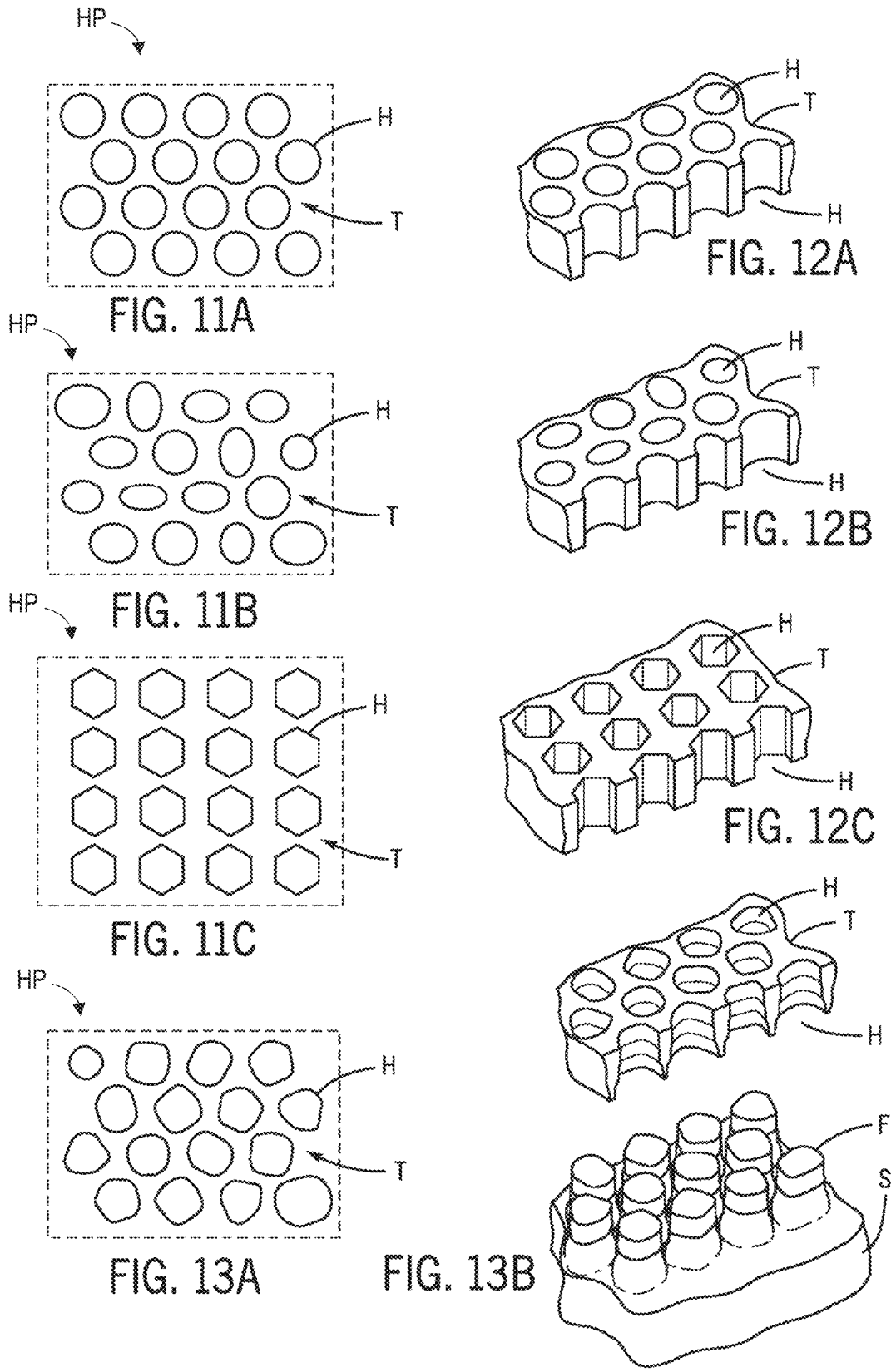
FIG. 11A is a schematic cut-away plan view of a component for a vehicle interior according to an exemplary embodiment.
FIG. 11B is a schematic cut-away plan view of a component for a vehicle interior according to an exemplary embodiment.
FIG. 11C is a schematic cut-away plan view of a component for a vehicle interior according to an exemplary embodiment.
FIG. 12A is a schematic cut-away perspective view of a component for a vehicle interior according to an exemplary embodiment.
FIG. 12B is a schematic cut-away perspective view of a component for a vehicle interior according to an exemplary embodiment.
FIG. 12C is a schematic cut-away perspective view of a component for a vehicle interior according to an exemplary embodiment.
FIG. 13A is a schematic cut-away plan view of a component for a vehicle interior according to an exemplary embodiment.
FIG. 13B is a schematic cut-away exploded perspective view of a component for a vehicle interior according to an exemplary embodiment.

Referring to FIGS. 9A and 9B, the component/product P may comprise a composite structure with a light array/module L/B (including light sources such as LEDs/arrays) and a substrate/light guide S/LG (including a light-transmissive and/or substantially transparent material Fb), the substrate/light guide supports a surface/cover T/DL and a backing shown as a layer BLa/BLb (e.g., a backing layer BL of paper, films, foils, fiber, sheets and other materials); as schematically indicated, holes are on the surface/cover with a backing for transmitting light from the light source L/B through the substrate/fill Fa/Fb. See also FIG. 9B (showing the surface of substrate S/fill Fa with a light-transmissive material, the substrate/filler material/fill transmitting light from the light source as a light guide). According to an exemplary embodiment as indicated schematically in the FIGURES, the backing/backing layer for the cover may comprise at least one layer (e.g. one layer, two layers, three layers, etc.) for construction/assembly/formation of the composite structure of the part/component; each backing/backing layer may comprise the same material and/or a different material and/or the same thickness and/or a different thickness, etc.

As shown schematically according to exemplary embodiments in FIGS. 9C-9F, the component may be formed by injection molding (e.g., in a tool comprising mold portions MT and MB) the material (e.g., a transparent and/or light-transmissive material) of the substrate S/fill F onto a cover/backing provided with holes; the substrate material F forms a protrusion Fa (e.g., a column shown as a light-transmissive and transparent/translucent substrate material) in the hole; the protrusion/filler column (e.g. fill material) is configured to act as a light guide. See also FIGS. 9F and 9G.

According to an exemplary embodiment as shown schematically in FIGS. 3A-3D and 10A-10C, according to exemplary embodiments, the component product P may comprise a cover shown as a wood veneer/surface W/SE (wood decoration/texture), the cover being provided with a backing, shown as a layer arrangement BL on a substrate S; the surface of the product P (e.g., a component C with a display D) may be configured to be illuminated (e.g., from a light source L below the substrate) through the wood-decorated cover W and backing arrangement BL via a pattern/arrangement H of a series of apertures/holes; the apertures/holes are filled with a column/fill material F (e.g., a light-transmissive and transparent/translucent resin R molded with the substrate S under the cover/backing). See also FIGS. 9A-9G, 13A-13B, 17A-17C, 18A-18B and 19A-19C. According to an exemplary embodiment as shown schematically in FIGS. 3B, 3D, 4A, 5A and 6A-6D, the pattern/arrangement of apertures/holes H and corresponding column/fill material F may include shapes/images SH/IM, such as geometric shapes and symbols, so as to present an ornamental/visual effect or information/displays (e.g., luminous forms when illuminated from a light source L/M) on the wood-decorated/textured surface W of the product P. See also FIGS. 2B-2C, 4C, 9A-9G and 10A-10C.

As schematically indicated in FIGS. 6A, 6D, 7 and 10A-10C, prior to providing illumination (e.g., from a light source L/M through the substrate/fill material F for a hole H), the backlit decorative component product P may be configured to present the general appearance of a wood veneer/surface W in the decorative region DR and the instrument region IR; when the illumination is provided (e.g., from a light source L through the substrate/fill material F for the hole H), the backlit decorative component product P may be configured to present a desired ornamental design/visual effect in the decorative region DR through the wood veneer/surface W and/or to present an informational display in the instrument region IR.

According to an exemplary embodiment as shown schematically in FIGS. 11A-11C, 12A-12C, 13A-13B, 49A-49D, 50-52, 55A-55B and 56-60, the cover/layer T/BL may comprise holes H presented in a uniform pattern, but of various dimensional forms/shapes (e.g., circular, elongated (e.g., oblong), hexagonal and irregular shapes). See also FIGS. 15 and 16 (showing a laser tool/system LT providing a light beam LB to form a hole in a cover/backing T/BL). According to an exemplary embodiment as shown schematically in FIG. 13B, the filler/column F formed from the substrate material (e.g., a shaped material/fill configured to be light-transmissive, translucent or transparent) takes the form of holes/apertures in the cover/backing; uniformly-shaped holes form a uniformly-shaped/shaped filler/column; the irregularly-shaped holes are filled with irregularly-shaped/shaped columns (see FIGS. 17A-17C, 18A-18B and 19A-19C). See also FIGS. 9A-9G.

As shown schematically according to an exemplary embodiment, the wood veneer cover/layer (front) and the backing layer (e.g., paper/sheet behind the wood veneer cover/layer) (back) may include holes/apertures (e.g., perforations formed by a laser tool). As shown schematically, the surface/uniformity of the wood veneer cover/layer and the backing layer includes irregular forms (e.g., significant variations in surface, uniformity and other aspects); the holes/apertures formed through the cover/backing layer include irregular forms (e.g., variations in size, uniformity and other aspects). See FIGS. 13A-13B (e.g., hole patterns in the material of the fibrous sheet/veneer), 17A-17C, 18A-18B and 19A-19C.

As shown schematically according to an exemplary embodiment, the configuration for forming holes/apertures (e.g., perforations) by a laser tool/system LT providing a laser beam LB is shown; the setting/configuration of the laser tool may include the frequency/density of the laser formed/applied holes and the line width between the laser formed/applied holes; as schematically indicated, according to exemplary embodiments (e.g., for forming holes/apertures (e.g., point frequency and line width of an instrument region image)), the laser formed/applied holes in the cover/backing of the component may include variations in forms/shapes (e.g., generally circular, hexagonal and irregular shapes due to different materials). See also FIG. 15 (showing operation of laser tool LT, light beam LB forming holes/apertures in layer T).

Exemplary Embodiments—E

As schematically indicated in FIGS. 1B, 2A-2C, 4A and 5A, the component C may comprise a part/panel P (e.g., a panel C/P and/or a display C/D configured to be operated, illuminated and backlit) configured to present the display D in a vehicle interior (e.g., for a console shown as a floor console FC, and a panel shown as an instrument panel IP and/or a door panel DP); the display D is configured (e.g., selectively illuminated) in operation to present an image IM to an occupant of the vehicle (e.g., on a user interface, a display panel, a control/operator and an instrumentation, and/or for a decorative effect); the display D may be configured to present an image IM in the decorative region DR and/or the instrument region IR. See also FIGS. 3A-3D, 4A-4C, 6 and 6A-6D. According to an exemplary embodiment schematically indicated in FIG. 5B, the image IM presented on the display D may be configured as a user interface/control (shown as a door lock and/or a window lock); as schematically indicated in FIGS. 6A-6D, the image IM may include decorative effects (e.g., by illumination) presented in a decorative region DR of the display D and/or instrument/information (e.g., by illumination and backlighting) presented in an instrument region IR of the display D. According to exemplary embodiments schematically indicated in FIGS. 2A-2B, components (e.g., shown as a display C/D and a panel C/P with a display D) may comprise a display (e.g., by selective illumination from a module, e.g., comprising an array of light emitting diodes/LEDs) configured to provide an illumination region presenting instrumental and/or decorative effects. See FIGS. 9A and 10A.

As schematically indicated according to exemplary embodiments in FIGS. 15, 16 and 61A-61B, the shaping of the holes/apertures (e.g., perforations by laser tools or other means/mechanical methods) for the vehicle interior component (e.g., a backlit decorative component) may include various patterns/arrangements (e.g., configured to present an image SH/IM for display on the surface of the component when illuminated by the light source L and/or a module M). See also FIGS. 3A-3D, 6A-6D, 10A-10C, 11A-11C, 12A-12C, 13A-13B, 49A-49D and 50-54, 55A-55B, 56, 57, 58, 59 and 60. As schematically indicated according to an exemplary embodiment, the wood veneer cover/layer (front) and the backing layer (behind the wood veneer cover/layer) (back) with holes/apertures (e.g. perforations formed by laser tools) provide visual/surface effects for the vehicle interior component (e.g., a backlit decorative component configured to be illuminated by a light source L/M/LED). See FIGS. 3A-3D, 6A-6D, 7, 9A and 10B-10C.

As schematically indicated according to an exemplary embodiment, the component providing displays/panels (e.g., configured to present the image IM when actuated/illuminated) may comprise a cover layer of a material configured to provide a visual effect on the surface (e.g., shown as a wood-textured surface effect W/SE). See FIGS. 3A-3D, 6A-6D and 10A-10C. According to an exemplary embodiment, as schematically indicated, the cover layer may be provided with backing arrangements (e.g., one or more layers with an adhesive/coating that may be attached by means of adhering, heat pressing, heat activation and lamination) (e.g., attached behind a veneer, a wood veneer, a wood-textured or textured material and surface effect layer) to provide reinforcement (at the holes/apertures) and enhance strength for protection from damage, facilitate handling, and provide environmental resilience (e.g., to water and flame), for shielding and/or flexibility, etc. See FIGS. 5D, 7, 9A-9G, 10A-10C, 16, 17A-17C, 19A-19C and 61A-61B. According to an exemplary embodiment, the backing layer may comprise a backing material. According to an exemplary embodiment, the backing layer may comprise a veneer backing material providing a carrier/coating.

According to an exemplary embodiment as shown schematically in the FIGURES, a component for an interior of a vehicle may comprise a cover/decorative layer with a hole pattern at an exterior surface configured to be illuminated by a light source to present an image (e.g. visible by an occupant facing and/or from a viewing angle).

According to an exemplary embodiment as shown schematically in the FIGURES, a component for a vehicle interior with a surface intended to be visible to an occupant when the component is installed in the vehicle interior configured to provide illumination from a light source may comprise a base and a cover coupled to the base comprising a hole pattern. The cover may comprise an exterior surface providing the surface and an interior surface. The hole pattern may comprise at least one opening through the cover. Each at least one opening may comprise a hole on the exterior surface and a formed aperture on the interior surface. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of a perforation of the backing layer. The formed aperture may be formed by partial burning of the backing layer. The cover may comprise a decorative layer. The component may comprise a light guide coupled to the decorative layer; the light guide may comprise a first portion configured to fill the at least one opening in the decorative layer. The light guide may comprise a light pipe. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The decorative layer may comprise a stone veneer. The component may comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one opening may be configured to at least one of (a) provide an outlet for light configured to provide illumination; (b) direct light to provide illumination at the surface. The at least one opening may comprise a pattern of holes configured to provide indicia identifying at least one vehicle control. The decorative layer may comprise a backer configured to prevent illumination to pass from a light source to an outer surface of the decorative layer. The component may comprise a light guide formed within the at least one opening of the decorative layer. The light guide may comprise a light-transmissive resin material formed in the at least one opening of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one opening may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

According to an exemplary embodiment as shown schematically in the FIGURES, a method of manufacturing a vehicle trim component may comprise the steps of providing a cover and laser-forming a hole pattern in the cover. The cover may comprise an exterior surface providing the surface and an interior surface. The hole pattern may comprise at least one opening through the cover. Each at least one opening may comprise a hole on the exterior surface and a formed aperture on the interior surface. The formed aperture may comprise a design form. The design form may comprise a generally rectangular form. The design form may comprise a generally square form. The design form may comprise rounded corners. The formed aperture may be larger than the design form. The formed aperture may comprise an irregular form. The formed aperture on the interior surface may comprise a laser-formed perforation. The formed aperture on the interior surface may comprise an irregular shape. The at least one opening may be formed by laser perforation of the cover from the interior surface through to the exterior surface. The hole may comprise a formed hole. The formed hole may have a shape different than the formed aperture. The at least one opening may be formed by laser perforation of the cover from the interior surface through to the exterior surface. The hole may be smaller than the formed aperture. The formed aperture may be formed by melting. The formed aperture may be formed by bridging. The formed aperture may be formed by expansion. The at least one opening may be configured to transmit illumination from the light source through the cover. The hole pattern may comprise an image for illumination. The hole pattern may be configured so that illumination of the image is visible at a viewing angle. The viewing angle may be measured perpendicular to the surface of the cover. The viewing angle may be measured tangent to the surface of the cover. The cover may comprise a decorative layer. The decorative layer may comprise a veneer. The veneer may comprise a stone veneer. The veneer may comprise a wood veneer. The veneer may comprise a backing. The backing may comprise a backing layer configured to form the formed aperture. The formed aperture may be formed by melting of the backing layer. The formed aperture may be formed by partial melting of the backing layer. The formed aperture may be formed by bridging of the backing layer. The formed aperture may be formed by expansion of perforations in the backing layer. The formed aperture may be formed by partial burning of the backing layer. The pattern may comprise a set of holes and a set of formed apertures. The cover may comprise a decorative layer. The method may comprise the steps of providing the decorative layer in a tool and forming the decorative layer into a shape. The cover may comprise a decorative layer. The method may comprise the steps of providing the decorative layer in a mold, injecting a resin in the mold to form a light guide in the at least one opening of the decorative layer, providing a base and joining the decorative layer with the light guide to the base. The light guide may be configured to allow illumination to pass through the at least one opening of the decorative layer. Forming the at least one opening may comprise perforating the decorative layer with a laser. The method may comprise the step of applying a backer to an inner surface of the decorative layer. The backer may comprise a barrier configured to prevent transmission of light. The step of forming at least one opening in the decorative layer may comprise forming at least one opening in the backer to allow transmission of light through the at least one opening in the backer. The backer may comprise at least one layer of backing material. The backing material may comprise a sheet material attached to the inner surface of the decorative layer.

According to an exemplary embodiment as shown schematically in the FIGURES, a component for a vehicle interior may comprise a surface configured to be illuminated by a light source to present an interface for an occupant of the vehicle interior comprising a base, a cover layer coupled to the base comprising a pattern of openings and a light guide coupled to the cover layer. The light guide may comprise a set of projections configured to fit in the pattern of openings of the cover layer. The light guide may be configured to transmit illumination from the light source to present the interface through the pattern of openings of the cover layer. The pattern of openings may comprise at least one opening comprising a hole and a formed aperture. The cover layer may comprise a decorative layer for the surface; the decorative layer may comprise at least one of (a) a natural material; (b) a stone veneer; (c) a wood veneer; (d) a grained material; (e) a sheet material providing a surface effect. The pattern of openings may comprise at least one opening configured to at least one of (a) provide an outlet for light configured to provide illumination; (b) direct light to provide illumination. The pattern of openings may be configured to provide a display. The display may comprise at least one of a decorative region and an instrumentation region. The instrumentation region may comprise indicia identifying at least one vehicle control. The component may comprise a module configured to provide the light source and at least one sensor for the interface. The component may comprise a backer configured to reinforce the cover layer. The backer may comprise at least one backing layer. The backer may comprise the pattern of openings with formed apertures and holes so that illumination from the light source passes through the backer to the surface to provide the interface. The backer may be configured to prevent illumination from the light source to an outer surface of the decorative layer other than at the pattern of openings. The light guide may comprise a light-transmissive resin material. The light guide may comprise a resin material formed as the set of projections in the pattern of openings. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state. The cover layer may comprise a decorative layer comprising a thickness generally between 0.005 inches and 0.05 inches.

According to an exemplary embodiment as shown schematically in the FIGURES, the component providing the cover/decorative layer with hole pattern to present the image (e.g. when illuminated) may comprise any of a wide variety of components within the interior of the vehicle and/or may comprise any of a wide variety of similar or differing surface effects on the components (e.g. and wide variety of hole patterns and/or images).

According to an exemplary embodiment as shown schematically in the FIGURES, an improved vehicle interior component may comprise a cover such as a decorative layer providing a surface configured to present an image in an illuminated state; the component may comprise a cover such as a decorative layer providing a surface configured to present an image in an illuminated state that facilitates viewing by an occupant of the vehicle; the component may comprise a cover such as a decorative layer providing a surface configured to present an image in an illuminated state that presents an acceptable visual effect when in an non-illuminated state; the component may comprise a cover such as a decorative layer providing a surface configured to present an image that can be formed to a backing and/or a light guide and with suitable structural/mechanical properties for assembly and use in a vehicle interior.

As shown schematically in the FIGURES, the component/display may serve various functions (e.g., decorative/ornamental, functional/visual, integrated, instrumental/control functions) of a vehicle interior in various shapes and forms and/or through various configurations/materials and/or through various hole/aperture patterns and/or through various surface effects/arrangements and/or through various types of modular/control system operations for lighting/backlighting. For example, see FIGS. 1B, 2A-2C, 3A-3D, 4A-4C, 5A-5B, 6, 6A-6D, 9A, 10A-10C, 11A-11C, 12A-12C, 13A-13B, 49A-49D, 50-53, 55A-55B, 56, 57, 58, 59 and 60.

Exemplary Embodiments—F

According to exemplary embodiments as shown schematically in FIGS. 1A, 1B and 2A, a vehicle V may comprise a vehicle interior I which may provide components C, such as panels, consoles and compartments. The component C may provide a display D (e.g., display panel, illumination, data display and display screen) to present information, alerts, entertainment, data, etc. (e.g., data/information available from various sources, such as the images IM shown in FIGS. 2A, 3A and 3B) to vehicle occupants. The vehicle interior may provide various display configurations at various positions and locations to serve various purposes. See FIGS. 1B and 2A.

According to an exemplary embodiment, the component may include a decorative component, a panel, a console, etc. (e.g., an instrument panel, a door, a seating region, a cockpit, a central region and an overhead region) provided by the vehicle interior. See FIGS. 1B and 2A.

As schematically indicated according to an exemplary embodiment, the display D of the component may present an image IM and/or information (e.g., data/information, instruments, indicators, controls, entertainment and communications). See FIGS. 2A and 3B. According to an exemplary embodiment, the image may include a set of holes H.

According to an exemplary embodiment, the component C and/or the display D (if provided on the component) may provide a contoured form/shape designed/intended to integrate with the interior design/aesthetics of the vehicle V. According to an exemplary embodiment, the component C may provide a visual effect and be shaped (e.g., into a shape/contour).

According to exemplary embodiments as shown schematically in FIGS. 5A-5D, 9A, 9F, 9G, 49A-49D, 50-53, 55A-55B, 56, 57, 58, 59 and 60, a vehicle interior component P/C is shown as a door panel and may include a surface intended to be visible to an occupant when the component P/C is mounted in the vehicle interior. According to an exemplary embodiment as shown schematically in FIG. 5B, the assembly P/C may be configured to provide illumination, shown as an image IM, from a light source. The component P/C may comprise: a base B, a decorative layer DL coupled to the base B, the decorative layer comprising at least one hole H, and a light guide LG/F coupled to the decorative layer DL. The light guide LG/F may comprise a first portion Fa configured to fill at least one hole H in the decorative layer DL. The decorative layer DL may include a thickness of approximately between 0.005 inches and 0.05 inches (and may be provided with a backing layer BL having a thickness of 0.01 inches or between 0.005 inches and 0.05 inches, e.g., one or more layers). The decorative layer DL may comprise a rear surface; the light guide LG/F may comprise a second portion Fb configured to align with the back surface of the decorative layer DL and guide light from the light source to the first portion Fa of the light guide LG/F. The decorative layer DL may comprise a natural material. The decorative layer DL may comprise a wood veneer. The at least one hole H may be configured for at least one of: (a) providing a light outlet configured to provide illuminated; and (b) guiding light to provide illumination. The at least one hole H may comprise a hole pattern configured to provide marks, the hole pattern identifying or being associated with at least one vehicle system (e.g., an instrument and a control). The base B may comprise at least one of: (a) a switch; (b) a sensor; (c) a capacitive switch; and (d) a capacitive switch sensor aligned with the hole pattern; the hole pattern may be configured to illuminate the decorative layer DL to indicate the positions of the switch, the capacitive switch and the capacitive switch sensor. The decorative layer DL may comprise a substrate, shown as a backing (or back lining/ layer) BL, configured to prevent illumination from passing from the light source to the exterior surface of the decorative layer DL. The light guide LG/F may be formed in at least one hole H of the decorative layer DL. The decorative layer DL may be configured to provide a visual effect; the light guide LG/F may be configured to provide a visual effect; the visual effect of the decorative layer DL and the visual effect of the light guide LG/F may be configured to provide a composite visual effect. The component P/C may be configured to provide a first state providing the visual effect of the decorative layer DL and a second state providing a composite visual effect of the visual effect of the light guide LG/F and the visual effect of the decorative layer DL. The component P/C may include at least one of: a decorative panel; a handrail/armrest; a headliner; an instrument panel; a console; a center console; a door panel; a steering wheel; a seat; a column, a top column and a column decoration. According to an exemplary embodiment as shown schematically in FIGS. 9A, 9F and 9G, the assembly P/C may comprise a base layer and/or circuit board M/B comprising a light source shown as a light emitting diode LED. According to an exemplary embodiment as shown schematically in FIGS. 9A, 9F and 9G, the backing (e.g., a barrier, a backing layer and a back lining/layer) BL may include a first back lining/layer BLa and a second back lining/layer BLb.

As schematically indicated according to exemplary embodiments in FIGS. 4A, 4B, 5A-5D, 9A, 9F and 9G, the component P/C may generally be configured to provide: a cover configured with holes H (e.g., provided according to pattern, size and shape) shown as a layer DL (e.g., a decorative layer); a substrate/backing BL; and a translucent/ transparent element (formed of resin R) shown as a light guide LG/F, the protrusion of which is configured to fit the holes H to present an image IM (e.g., by guided illumination from a light source) on the surface of the component P/C.

According to an exemplary embodiment, a method for manufacturing the component P/C may comprise the following steps: providing a decorative layer; disposing the decorative layer in a tool; cutting the decorative layer into a shape; forming at least one hole in the decorative layer; disposing the decorative layer in a mold; injecting resin in the mold to form a light guide in the at least one hole of the decorative layer; providing a base; and connecting the decorative layer having the light guide to the base. The light guide may be configured to allow illumination through the at least one hole of the decorative layer. Forming at least one hole may comprise perforating the decorative layer by a laser. The method may comprise a step of applying a substrate, shown as a backing (or a back lining/layer), to an interior surface of the decorative layer. The backing/back lining/layer may include a barrier configured to prevent light transmission. Forming at least one hole in the decorative layer may comprise forming at least one hole in the backing/ back lining/layer to allow light to pass through the at least one hole in the backing/back lining/layer for transmission.

Figures 4A, 4B, 4C, 5A, 5B, 5C, 5D:
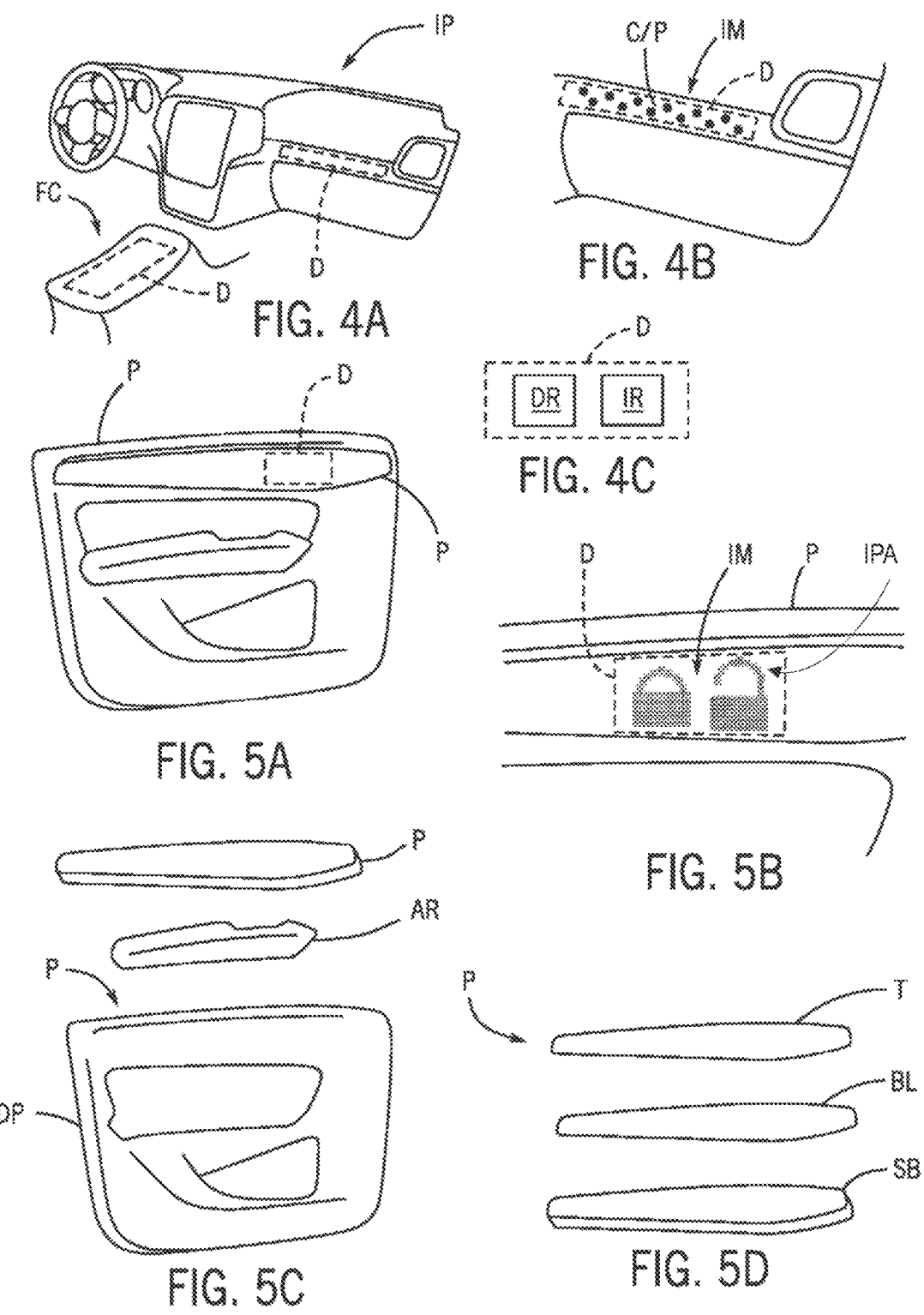
FIG. 4A is a schematic perspective view of a component for a vehicle interior shown as an instrument panel according to an exemplary embodiment.
FIG. 4B is a schematic partial perspective view of a component for a vehicle interior shown as an instrument panel according to an exemplary embodiment.
FIG. 4C is a schematic diagram of a component for a vehicle interior comprising a display according to an exemplary embodiment.
FIG. 5A is a schematic perspective view of a component for a vehicle interior shown as a door panel according to an exemplary embodiment.
FIG. 5B is a schematic perspective cut-away view of a component for a vehicle interior according to an exemplary embodiment.
FIG. 5C is a schematic exploded view of a component for a vehicle interior according to an exemplary embodiment.
FIG. 5D is a schematic exploded view of a panel of a component for a vehicle interior according to an exemplary embodiment.

According to an exemplary embodiment as shown schematically in FIG. 5B, the component P/C may be configured to be in an illuminated state to provide illumination from a light source, shown as an image IM which may be formed by a pattern of illumination/backlighting holes H configured to provide marks, the pattern identifying or being associated with at least one vehicle system (e.g., an instrument and a control). The holes H may be filled with the light guide LG/F to enhance visibility of the image IM, and particularly visibility of the image IM when viewed at a small angle relative to the visible surface of the component P/C. The light guide LG/F may protrude into the hole H to provide visibility of the image IM from a wider viewing angle than without the light guide LG/F. The light guide LG/F may be configured to increase the brightness of the image IM compared to the brightness of the image IM without the light guide LG/F. The light guide LG/F may be formed of transparent polycarbonate to optimize the color of image IM and the impact strength of component P/C. The light guide LG/F may be formed of a transparent acrylic resin. The light guide LG/F may also be made of a translucent material formed by mixing PMMA (polymethyl methacrylate), PET (polyester resin), PS (polystyrene), PE (polyethylene), PP (polypropylene) and the like with a light uniformizing agent, so as to achieve the effect of improving the brightness. The light guide LG/F may comprise at least one integrally-molded fastener for coupling the light guide LG/F to the base B.

According to an exemplary embodiment as shown schematically in FIG. 5A, the component P/C may be configured to be in a non-illuminated state when the light source is off. According to an exemplary embodiment as shown schematically in FIG. 5A, when the light source is off, the image IM may not be visible. The pattern of holes H may be configured to provide a "dead-fronted" or minimally-visible image IM when not backlit; the holes H may be provided in an arrangement (e.g., pattern, form, shape, size, diameter, effective diameter, size and contour) configured to provide a desired visual effect (e.g., optical effect, form/shape, intensity and contrast). The diameter of holes H may be minimized to reduce the visibility of the pattern of the holes H and the image IM when not backlight. The diameter of holes H may be specified based on a material of the decorative layer DL (e.g., a particular type of wood), a thickness of the decorative layer DL (e.g., a thinner decorative layer may more easily form holes H of a smaller diameter), a device used to form the holes H in the decorative layer (e.g., a laser has the ability to form holes H of a smaller diameter in the decorative layer DL), and a control system/software used to control the formation of the holes H. The decorative layer DL may have a thickness generally between 0.005 inches and 0.05 inches to form the decorative layer DL into a contoured shape and/or to form holes H in the decorative layer DL with a diameter less than 0.5 millimeters. The holes H of the hole pattern may be provided (e.g., closely spaced together, separated, staggered and oriented) to provide improved quality (e.g., resolution, contrast and strength) of the image IM. The backing (e.g., barrier and back lining/layer) BL may include an opaque light barrier to mask/prevent visibility of portions of the component P/C when backlit. The first backing/back lining/layer BLa may be configured to reinforce the decorative layer during handling and/or forming. The second backing/back lining/layer BLb may be configured to include an opaque light barrier to mask/prevent visibility of portions of the component P/C when backlit.

According to exemplary embodiments as shown schematically in FIGS. 5C and 5D, the component P/C may comprise a door panel comprising a base B and a decorative insert. The decorative insert may include a decorative layer DL, a backing (e.g., barrier and back lining/layer) BL, and a light guide LG/F. See also FIGS. 9A-9G, 48A-48B and 51.

According to an exemplary embodiment as shown schematically in FIG. 8A, a vehicle interior component P may comprise a decorative layer BL (comprising at least one hole H) and a base layer or circuit board/module L/B (comprising a light source (e.g., an arrangement including light emitting diodes, LEDs)). The vehicle interior component P may comprise an air gap AG between the decorative layer T/BL and the base layer B and in at least one hole of the decorative layer BL.

Figure 61A:
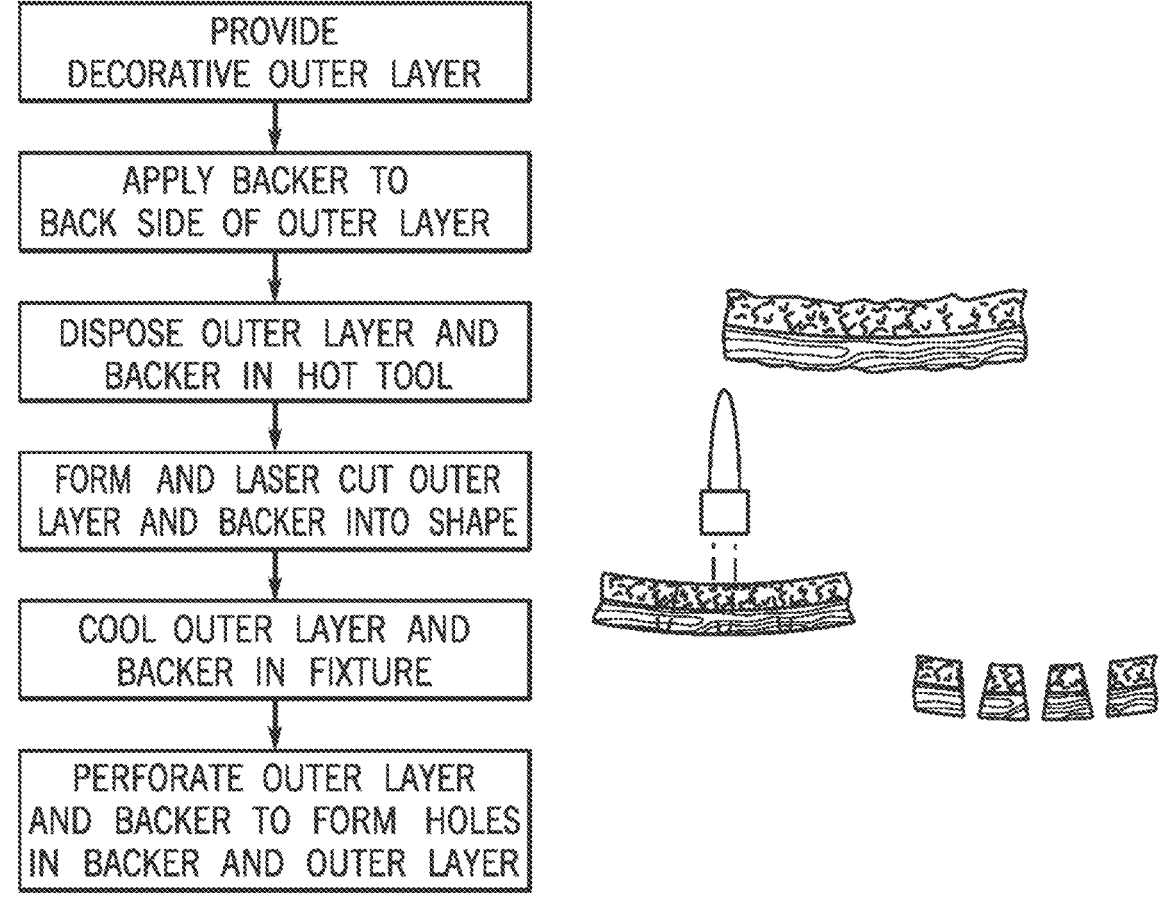
FIG. 61A is a schematic flow diagram of a method to produce a component for a vehicle interior according to an exemplary embodiment.

Referring to FIG. 61A, a method/process for producing a display-equipped component is shown schematically according to an exemplary embodiment, comprising the following steps: providing an exterior decorative layer; applying a back lining/layer to the back side of the exterior layer; disposing an exterior layer and a back lining/layer in a hot tool; forming and laser-cutting the exterior layer and the back lining/layer into a certain shape; cooling the exterior layer and the back lining/layer in a jig; and perforating the exterior layer and the back lining/layer to form holes in the back lining/layer and the exterior layer. See also FIGS. 6, 6A-6D, 7, 8A, 10A-10C, 15, 16, 17A-17C, 62A-62C and 63A-63C.

Referring to FIG. 61B, a method/process for producing a display-equipped component is shown schematically according to an exemplary embodiment, comprising the following steps: providing an exterior decorative layer; applying a back lining/layer to the back side of the exterior layer; disposing an exterior layer and a back lining/layer in a hot tool; forming and laser-cutting the exterior layer and the back lining/layer into a certain shape; cooling the exterior layer and the back lining/layer in a jig; perforating the exterior layer and the back lining/layer to form holes in the back lining/layer and the exterior layer; disposing the perforated exterior layer and the back lining/layer in an injection mold; injecting a light-transmissive polymer into the injection mold to form a light guide layer on the back lining/layer and within the holes; providing a substrate having a light source; and bonding the light guide layer, the back lining/layer and the exterior layer to a substrate having a light source. See also FIGS. 6, 6A-6D, 7, 8A, 10A-10C, 15, 16, 17A-17C, 62A-62C and 63A-63C.

Figures 62A, 62B, 62C:
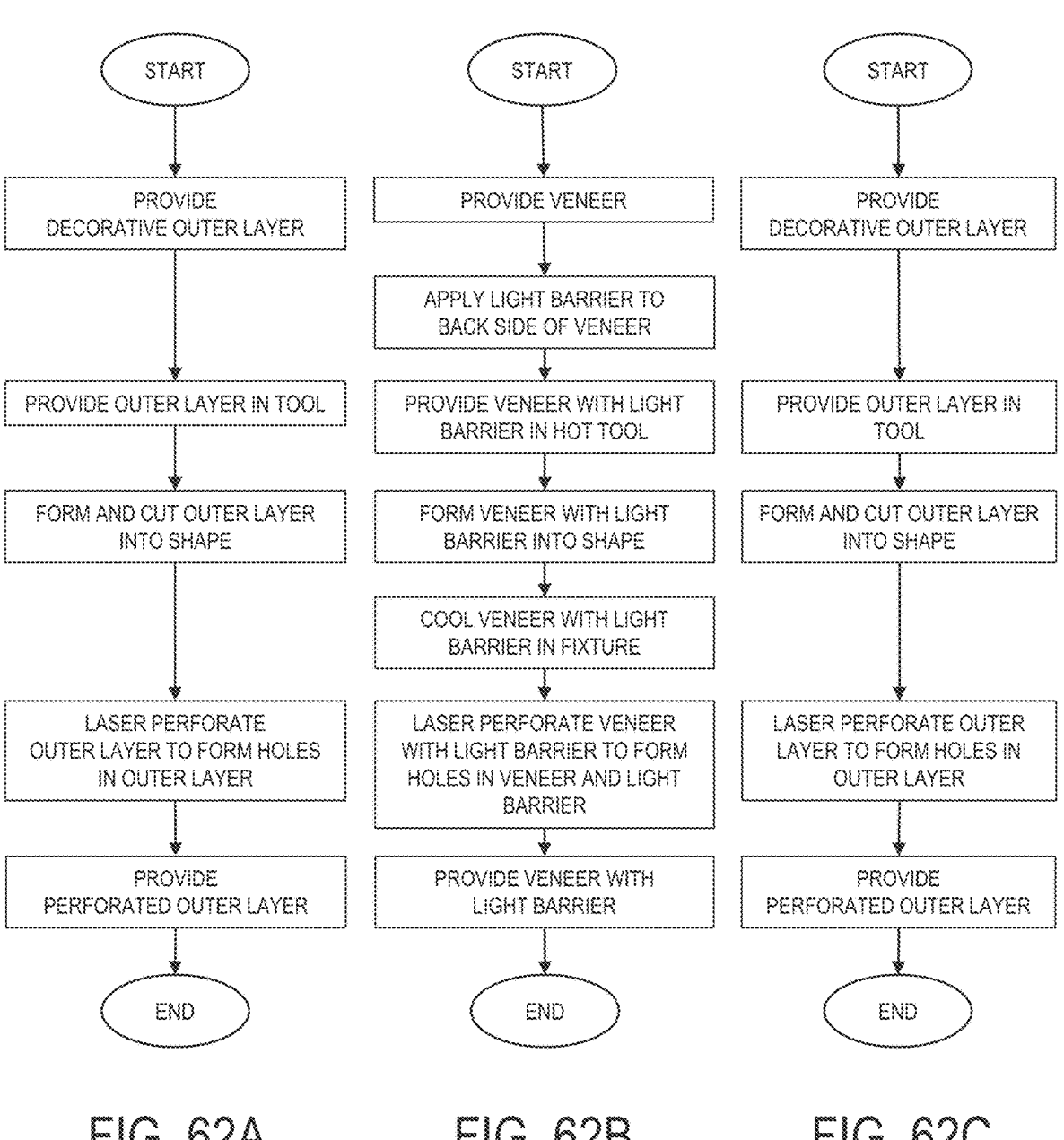
FIGS. 62A to 62C are schematic flow diagrams of methods to produce a component for a vehicle interior according to an exemplary embodiment.

According to an exemplary embodiment as shown schematically in FIG. 62A, a method for manufacturing the component P/C may comprise the following steps: providing an exterior decorative layer; providing an exterior layer in a tool; forming and cutting the exterior layer into a certain shape; laser-perforating the exterior layer to form holes in the exterior layer; and providing the perforated exterior layer.

According to an exemplary embodiment as shown schematically in FIG. 62B, a method for manufacturing the component P/C may comprise the following steps: providing a veneer; applying a light barrier on the back side of the veneer; providing the veneer having the light barrier in a hot tool; forming the veneer having the light barrier into a certain shape; cooling the veneer having the light barrier in a jig; laser-perforating the veneer having the light barrier to form holes in the veneer and the light barrier; and providing the veneer having the light barrier.

According to an exemplary embodiment as shown schematically in FIG. 62C, a method for manufacturing the component P/C may comprise the following steps: providing an exterior decorative layer; providing an exterior layer in a tool; forming and cutting the exterior layer into a certain shape; laser-perforating the exterior layer to form holes in the exterior layer; and providing the perforated exterior layer.

Figures 63A, 63B, 63C:
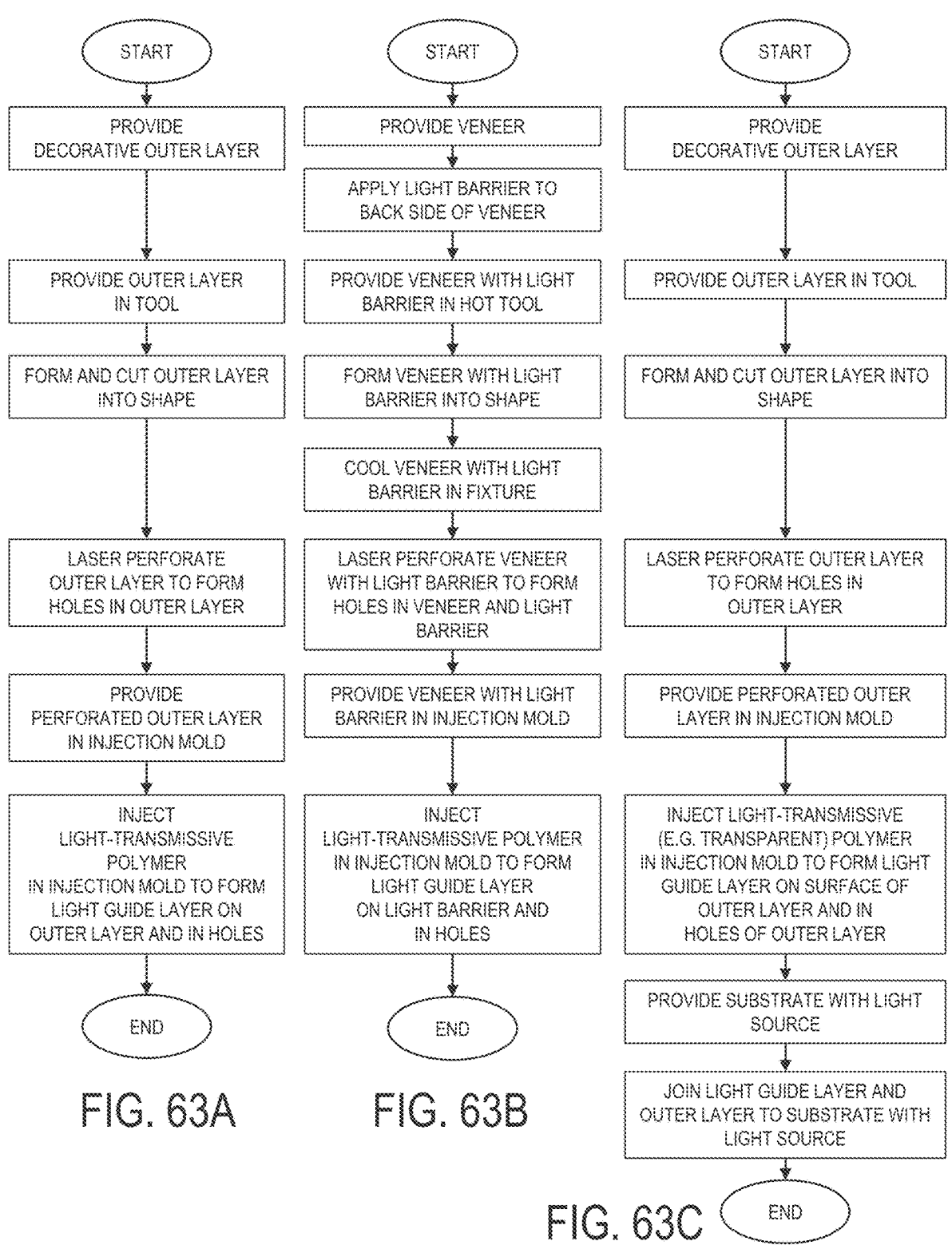
FIGS. 63A to 63C are schematic flow diagrams of methods to produce a component for a vehicle interior according to an exemplary embodiment.

According to an exemplary embodiment as shown schematically in FIG. 63A, a method for manufacturing a component P/C may comprise the following steps: providing an exterior decorative layer; providing an exterior layer in a tool; forming and cutting the exterior layer into a certain shape; laser-perforating the exterior layer to form holes in the exterior layer; providing the perforated exterior layer in an injection mold; and injecting a light-transmissive polymer into the injection mold to form a light guide layer on the exterior layer and within the holes.

According to an exemplary embodiment as shown schematically in FIG. 63B, a method for manufacturing the component P/C may comprise the following steps: providing a veneer; applying a light barrier on the back side of the veneer; providing the veneer having the light barrier in a hot tool; forming the veneer having the light barrier into a certain shape; cooling the veneer having the light barrier in a jig; laser-perforating the veneer having the light barrier to form holes in the veneer and the light barrier; providing the veneer having the light barrier in an injection mold; injecting a light-transmissive polymer into the injection mold to form a light guide layer on the light barrier and within the holes.

According to an exemplary embodiment as shown schematically in FIG. 63C, a method for manufacturing the component P/C may comprise the following steps: providing an exterior decorative layer; providing an exterior layer in a tool; forming and cutting the exterior layer into a certain shape; laser-perforating the exterior layer to form holes in the exterior layer; providing the perforated exterior layer in an injection mold; injecting a light-transmissive (e.g., transparent) polymer into the injection mold to form a light guide layer on a surface of the exterior layer and within the holes of the exterior layer; providing a substrate having a light source; and bonding the light guide layer and the exterior layer to the substrate having the light source.

Figures 64A, 64B, 64C:
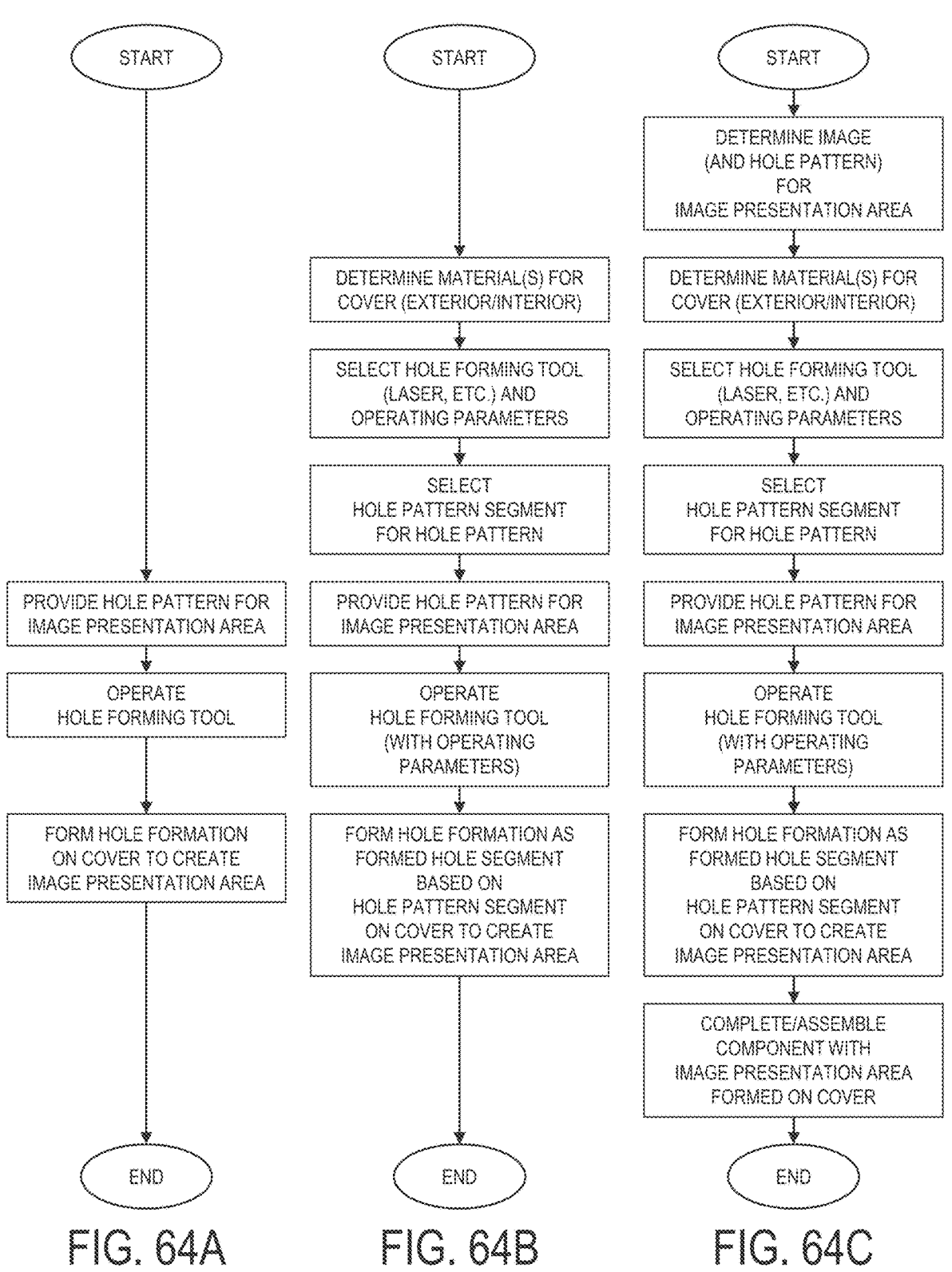
FIGS. 64A to 64C are schematic flow diagrams of methods to produce a component for a vehicle interior according to an exemplary embodiment.

According to an exemplary embodiment as shown schematically in FIGS. 64A-64C, a method of producing a component/part P/C comprising a cover with an interior surface and an exterior surface with an image presentation area may comprise the steps of providing a pattern image area for the image presentation area comprising a hole pattern comprising a set of hole pattern segments at the interior surface of the cover and forming a formed image presentation area as a set of formed hole formation segments for the exterior surface of the cover based on the hole pattern segments of the pattern image area for the interior surface of the cover. The set of formed hole formation segments may comprise a set of formed hole formations formed by perforation through the cover. The method may comprise the step of operating a hole-forming tool to form the set of formed hole formations. The method may comprise the steps of determining a material for the cover and setting operating parameters forming the formed image presentation area with a hole-forming tool; the operating parameters may comprise laser tool settings. The step of forming a formed image presentation area may comprise forming the set of formed hole formations by at least one of (a) melting material of the cover and/or (b) fusing material of the cover. The step of forming the set of formed hole formations at the set of formed hole formation segments may comprise fusing of a set of holes for each hole pattern segment to form the set of formed hole formations. The step of forming the set of elongate formed hole formations may comprise fusing of the set of elongate holes of the hole pattern segment. The method may comprise the steps of determining an image for the image presentation area and determining the hole pattern for the image presentation area; the step of determining the hole pattern for the image presentation area may comprise setting the pattern image area. The method may comprise the step of determining a material for the cover and selecting the operating parameters for forming the formed image presentation area based on the material of the cover. The step of forming the formed image presentation area may comprise forming the set of formed hole formation through the first material and second material of the cover.

According to an exemplary embodiment, a coating (e.g. lacquer, protective coating, etc.) may be applied at the cover of the part/component for surface protection (e.g. aging/exposure protection, sunlight protection, scratch-proofing, anti-mar protection, etc.).

Exemplary Embodiments—G

Referring to FIG. 20, according to an exemplary embodiment, a vehicle may provide a vehicle interior I with a door providing a door panel DP shown schematically according to an exemplary embodiment.

According to an exemplary embodiment as shown schematically in FIGS. 20 and 21, the door/door panel DP may comprise an interior decoration comprising a decorative component product P. According to an exemplary embodiment as shown schematically in FIG. 23, the decorative component product P may provide a surface that may present an ornamental design/visual effect; the product P may include a surface effect configured to present a decorative image.

Referring to FIG. 24, the product P may include: a decorative region DR in which an ornamental design/visual effect, such as a decorative image (e.g., a decorative image visible on the surface), may be presented, and an instrument region IR in which a visual effect, such as content in the form of information/signals (e.g., content visible on the surface) may be presented. According to an exemplary embodiment as shown schematically in FIG. 24, the product P may include a light source L (e.g., an LED array/substrate) and an instrument module M (e.g., a module comprising a light source).

According to an exemplary embodiment as shown schematically in FIG. 22, according to an exemplary embodiment, the decorative component product P may comprise a cover/backing layer arrangement, shown as comprising a wood veneer/surface W (wood decoration/texture) above a substrate; the surface W of the product P may be configured to be illuminated (e.g., from a light source L below the substrate) through an arrangement of a series of apertures/holes H with a filler/fill material F (e.g., a transparent/translucent resin molded with the substrate below the cover/backing) through the wood-decorated surface W to present an ornamental/visual effect (e.g., a parallelogram-shaped light-emitting arrangement) shown as a decorative image of the specified industrial design IM/SH on the wood-decorated/textured surface W of the product P. See also FIGS. 23 and 24.

According to an exemplary embodiment as shown schematically in FIG. 22, prior to providing illumination (e.g., from a light source L through the fill/material F for the hole H), the backlit decorative component product P may be configured to present the general appearance of a wood veneer/surface W in the decorative region DR. See also FIG. 23. According to an exemplary embodiment as shown schematically in FIG. 22, when the illumination is provided (e.g., from a light source L through the fill/material F for the hole H), the backlit decorative component product P may be configured to present a desired ornamental design/visual effect (e.g., parallelogram lighting form/pattern segment) in the decorative region DR through the wood veneer/surface W. See also FIG. 23.

Exemplary Embodiments—H

According to an exemplary embodiment as indicated schematically in the FIGURES, the cover/decorative layer of the component may be provided with a hole pattern shown as a perforation pattern (e.g. laser-perforated hole pattern); the hold pattern may vary, including the design intent/design, shape of openings/holes, (e.g. oblong holes, rounded holes, round holes, orthogonal-shape holes, etc.), the grouping of holes, the orientation of holes, etc. According to an exemplary embodiment as indicated schematically in the FIGURES, the hole pattern may comprise a perforation pattern that facilitates an expanded viewing angle for the image when illuminated (e.g. allows the occupant when in multiple positions in the vehicle to view the image at the corresponding viewing angle relative to the component/surface). As indicated schematically, a pattern may be provided to allow wide angle viewing with an image comprising the hole pattern (e.g. perforations) that is perceptible with clarity (e.g. clear and readily perceived/viewed) from any location within the vehicle (more or less regardless of where the occupant reasonably may be situated within the vehicle interior). According to an exemplary embodiment as shown schematically in FIG. 55A, a pattern may comprise holes arranged in a design pattern shown as three oblong holes close-spaced together; when the design pattern is formed by laser perforation the hole pattern forms formed apertures which becomes a U-shaped aperture arrangement (e.g. due to the effect of the laser function, such as burn off of material); the U-shaped arrangement is configured to provide a visible image when illuminated (e.g. with wide viewing angle) but to be reasonably concealed when not illuminated; the arrangement comprises a reasonable spacing/distance apertures that facilitates light transmission for presentation of the illuminated image but that does not substantially compromise the structural integrity of the material/cover (e.g. as would allow tearing when handled, injection molded/filled, etc.). As shown schematically, the hole/opening pattern (e.g. design pattern) forming the U-shaped formed apertures provides an as-formed pattern that has an acceptable arrangement of openings and material (e.g. perforations, melted material, burned material, gaps, clumps, spacing, etc.); holes/perforations of the formed apertures (e.g. were, utilizing the laser such as on very thin veneer with injection-molding resin through the backside creating light-guide/light-pipe through the opening for light transmission from a light source from the apertures in the interior surface to the holes on the exterior surface).

According to an exemplary embodiment as indicated schematically in the FIGURES, the component with cover may be configured for use as a functional/decorative element within a vehicle interior, including with use of various types of user interface configurations (e.g., audio, visual, interactive, lighting, haptics) and with various types of decorative layer configurations (e.g. veneer, stone veneer, wood veneer, coatings, etc.).

According to an exemplary embodiment as shown schematically in FIG. 55A, the hole pattern may comprise a design form of three oblong shapes that when implemented/produced (e.g. by laser-perforation on the interior surface of the cover) results in a formed aperture having the form of a single/merged U-shaped aperture. As indicated schematically, at laser-forming of the formed aperture based on the design form of the oblong shapes the oblong shapes may interconnect (e.g. may not create a "clean" hole due to the excess burn-off from the laser, etc.); the pattern of the design form can be selected with spacing between the oblong shapes such that the formed aperture from the laser operation will create a U-shaped aperture that is more suitably fitted for presentation of the image when illuminated (e.g presented at the exterior surface of the cover); accommodation can be made in the design form for the laser operation (e.g. burn-off, melting, etc.) including variations for the type of laser used and/or the speed/intensity and other parameters of the laser operation.

According to an exemplary embodiment as indicated schematically in the FIGURES, it has been observed that the design form providing the formed apertures as a generally U-shaped aperture provides acceptable performance in facilitation of off-angle viewing of the image when illuminated; a combination of lighting effect from horizontal oblong holes (e.g. at top and bottom) and from angled oblong holes (e.g at side) enhances the appearance at a wide range of viewing angles; connection of the elements of the design form in the formed aperture may provide a seamless appearance and may facilitate fit of holes in a selected pattern (e.g. allowing greater resolution, quantity, etc. of holes for a desired shape, con, decorative pattern, etc.). According to an exemplary embodiment as indicated schematically in the FIGURES, the set of generally U-shaped apertures in the pattern can be optimized to present a desired shape with spacing and structure to provide suitable viewing and suitable mechanical properties (e.g. resistance from tearing, distortion, etc. including during production, injection molding, handling, etc.); such a perforation pattern may provide enhanced image quality for viewing from multiple/all direction. According to an exemplary embodiment as indicated schematically in the FIGURES, a pattern form may be provided in a "honeycomb" structure; the laser operation (e.g. burn-off/melt of material from the laser) may make a design form of the three ellipses into a formed aperture of a single/connected aperture.

According to an exemplary embodiment as indicated schematically in the FIGURES, the component will be configured for use with natural materials that can be formed/facilitated into products with covers with intended decorative effects; as indicated schematically, a perforation pattern allows real wood, stone and other natural materials to be visible and work seamlessly with lighting and electronics while being visible throughout the vehicle by users (e.g. integrated into an intended visual effect).

According to an exemplary embodiment as indicated schematically in the FIGURES, vehicle interior components may be produced that integrate natural materials, including stone veneer and/or wood veneer (e.g. facilitating production of components with covers of veneer with laser perforations that provide a viable solution for lighting integrated with natural material surfaces). According to an exemplary embodiment, layout/dimensions of elements of the design form such as the "ellipses" and "dots" and angle of slanted "ellipses" and spacing between perforation holes as well as the overall layout of the pattern may be varied to produce an intended effect in the formed apertures and the implementation of the pattern and image on the cover. As indicated schematically, the overall improvement of off-angle viewing can be achieved by use of ellipses in the pattern (e.g. to display and effectively/evenly fill the shape for the image at the surface when illuminated by light while effectively concealing holes/pattern at the surface when unilluminated by light); close arrangement of ellipses may allow the light to be visible more clearly at wider viewing angles; sections of light in the pattern may be arranged to be visible in multiple directions and may provide a sharper image (rather than a blotchier optical appearance); spacing and shaping and sizing of the design elements of the pattern/hole pattern may enhance appearance as intended (e.g. with a small dot between the clumps of ellipses to "break up" the visual effect at the surface when not backlighted/unilluminated to hide the pattern and when backlighted/illuminated to display a generally more "seamless" appearance including between element such as the ellipses). According to an exemplary embodiment as indicated schematically in the FIGURES, the configuration of the cover with laser perforations through veneer will improve off-angle viewing, including for decorative elements that may be positioned off to a side and/or not directly in a line of sight for the occupant; the configuration is intended to improve visual appearance within a wide range of viewing angle for the occupant to present the image when illuminated (e.g. icons, elements, patterns, etc.); the pattern may be designed/improved to enhance greater off-angle viewing (e.g. oblong shape consist of a square with two three degree arcs interconnecting on both ends, dots consist of four three degree arcs interconnected, etc.)

According to an exemplary embodiment as indicated schematically in the FIGURES, the pattern will not be noticeably visible (at casual observance) on the surface of the cover when unilluminated (e.g. when "dead-fronted"); the pattern will provide improved image quality including at off-angle viewing when illuminated; and the pattern will provide suitable mechanical properties such as not to tear during handling, assembly, injection molding, etc. As indicated schematically, the pattern will be effective for straight edges and curved ends to be formed in the formed aperture (generally); the pattern should also be able to provide clear off-angle viewing at narrower portions of shapes; when viewing an image at a sharp angle it is preferred to present a clear view of the outline of the shape as well even/consistent lighting throughout the body of the shape. According to an exemplary embodiment, the configuration of the cover will not produce any substantial loss of clarity as viewing angle becomes sharper (within a reasonable threshold for an occupant of the vehicle interior).

According to an exemplary embodiment, the three geometric shape referred to as "stadium" (e.g. with oblong perforations/holes that converge into one hole during the laser operation) will be provided with spacing between rows of perforations that will enhance illumination effect but will not destroy the structural integrity of the material (e.g. will not remove material as to weaken to risk of mechanical failure) and that will not be readily visible when unilluminated (e.g. "dead-fronted"); the design intent is an even view at all angles and even light on thinnest portions of a shape (e.g. thin end of image shape) as for wider portions. According to an exemplary embodiment, to achieve effectiveness of perforations such shapes will be a minimum of 0.7 mm in front/open/face width (e.g. to accommodate geometric stadium groupings); acceptable parts must have geometric stadiums connected on backside and on front side they must be connected (e.g. to a degree as indicated); an acceptable visual effect may be provided out of a large quantity of connected formed apertures; small connecting between rounded square and geometric stadium groupings may be acceptable when connection hole width is not excessive (e.g. not visible generally when unilluminated). (As indicated, cover with holes and/or formed apertures are shown at approximately 40× magnification.) Selection of the hole pattern may be configured to conceal/hide the holes on the surface (e.g. on the veneer). According to an exemplary embodiment, a pattern of holes not in compliance may present noticeable geometric stadium groupings not connected and/or blocking of holes by material. According to an exemplary embodiment, rounded squares and geometric stadium groupings will tend to form a suitable a connection hole/path; the connection path of excessive width or perforations with visibly excessive burning marks may be unacceptable as visible in default/unilluminated (e.g. when off/"dead-fronted"). According to an exemplary embodiment, unacceptable perforations and/or geometric stadium groupings will appear as not connected and/or with blocked material and/or with excessive width of connections between rounded squares and geometric stadium.

According to an exemplary embodiment, the laser apparatus for the laser operation may be a laser-device (e.g. carbon dioxide/CO2 laser, other laser apparatus moving the laser across the surface). In the laser operation, the perforation holes will tend to be wider and more pronounced on back side (e.g. the interior surface) of the cover; on the front side (e.g. the perforation holes will tend to be thinner and smaller; when forming of perforation holes is obstructed by material (e.g. "tougher" material such as elevated stone or tougher wood grain), an additional pass over with the laser at a lower power is made to remove the obstruction. According to an exemplary embodiment, the laser operation may be performed with a laser apparatus (e.g. with CO2, UV or fiber/fiber-optic, galvanometer-included/mirror-directed laser, UV plotting laser, etc.). According to an exemplary embodiment, the operation/process of laser perforation may consist of consistent speed and power throughout or variability in different sections (e.g. slowing speed at the joining of geometric stadiums for a more even connection); increasing power and frequency at raised surfaces across a texture (elevation in stone surface or tougher wood grain); slowing down speed between moving from geometric stadium grouping to rounded square may also be used to decrease the occurrence of connection between groupings and rounded square.

According to an exemplary embodiment, materials such as veneer, stone veneer, wood veneer, leather, TPO, fabric, wood, stone, etc. may be used for the cover/decorative layer.

According to an exemplary embodiment, the laser operation of perforation (e.g. forming formed apertures) on stone/veneer may be relatively difficult due to the changing texture and elevation on the surface; laser operation/production may be less difficult if scanning the surface is completed before the laser operation (e.g. to communicate to laser that/where elevated surface/texture requires more power/time/intensity).

According to an exemplary embodiment, certain stone veneer materials exhibit varying properties in the laser operation.

According to an exemplary embodiment as shown schematically, a component for a vehicle interior may provide illumination from a light source and may comprise a cover coupled to a base comprising a hole pattern comprising at least one opening. Each opening may comprise a hole on the exterior cover surface and a formed aperture on the interior cover surface. The formed aperture may comprise a laser-formed perforation. The formed aperture may be formed by melting, bridging, expansion, etc. The hole pattern may be configured so that illumination of an image is visible at a viewing angle. The decorative layer may comprise a veneer, a stone veneer or a wood veneer. The component may comprise a trim panel, armrest, headliner, dashboard, console, center console, door panel, armrest, steering wheel, seat, pillar, roof pillar or pillar trim.

According to an exemplary embodiment as shown schematically, a component for a vehicle interior may comprise a visible surface intended to be visible to an occupant when the component is mounted in the vehicle interior and configured to provide illumination from a light source to provide the occupant with an illuminated desired contour. The component may comprise (a) a base and (b) a cover coupled to the base; the cover may comprise a hole pattern; the cover may comprise an exterior surface and an interior surface; the exterior surface may provide the visible surface; the hole pattern may comprise at least one opening passing through the cover; each of the openings may comprise a hole on the exterior surface and a formed aperture on the interior surface.

Composite Visual Effect/Formation of Formed Image Presentation Area

According to an exemplary embodiment as shown schematically in the FIGURES, component C may comprise a composite structure comprising a base B and a cover T comprising an exterior surface providing the visible surface SF and an interior surface (as may comprise a backing layer BL); the visible surface at the cover T may comprise a display D operated by light source/panel LS/LED configured to present an image IM at an image presentation area IPA. The image presentation area IPA may comprise a formed image presentation area FPA; the formed image presentation area FPA may comprise at least one formed hole formation segment FS comprising at least one formed hole formation FH based on a hole pattern segment HS for a hole pattern HP of a pattern image area PA. The image presentation area IPA of the cover T may comprise each formed hole formation FH comprising formed hole formation segments FS; each formed hole formation FH may comprise an opening through the cover T generally corresponding to a hole T of the hole pattern segment HS. A composite visual effect may be presented at the cover of the component; the external surface SF of the cover may comprise a surface effect SE such as by a veneer configured to provide a visual effect; the formed image presentation area FPA is configured to provide a visual effect such as by the image IM illuminated at the display D from the light source/panel. The formed hole formations for the image presentation area of the cover may comprise laser-formed openings formed through the internal surface and external surface of the cover.

According to an exemplary embodiment, the composite structure of the component may comprise a cover comprising a selected material for the external surface configured to provide a surface effect; certain materials such as veneer materials as may be selected may comprise variations in the visual effect of the external surface and on formed image presentation area produced by the laser-forming operation for creating the formed hole formations (e.g. laser-formed perforations). Certain materials such as stone veneers may require variations in the operating parameters of the laser apparatus (e.g. laser with CO2, UV or fiber/fiber-optic, galvanometer-included/mirror-directed laser, etc.); certain stone veneer may conceal formed laser-formed perforations and/or may not provide full openings/perforations for light transmission; variations in texture and surface elevation may affect consistency of formed hole formation patterns; wood veneer may be susceptible to burning/discoloration; uneven formed hole formation may affect viewing angle or off-angle viewing; stone veneer may conceal perforations better for an indicated hole patter in comparison to wood veneer; variations in the hole pattern may adjust for variations in the surface material to produce an intended visual effect; generally concealment of perforations may be more readily possible for stone veneer than for wood veneer due to the texture of the surface; high-reflectance materials may better conceal perforations; size/shape of perforations/formed hole formations may reduce the structural integrity of the cover/material; inadequate removal of material at perforations/formed hole formations may reduce visibility of an image at the formed image presentation area.

As indicated schematically in the FIGURES, laser-formed perforations for the materials of the cover may generally not provide "clean" shapes and may present wide variations in the size/shape of formed hole formations for the formed image presentation area; the effect may be variability in direct and off-angle viewing across the image (e.g. different sections of the pattern have different light transmission than other sections, creating variations in patches such as may be more/less visible); spacing of holes in the hole pattern may affect structural integrity (if close/tight) or visibility/light-transmissibility (if wide/spaced); a hole pattern/hole pattern segments configured with holes with selected forms (e.g. with/without rounded squares, with/without consistent shapes, with/without elongate forms, etc.) can balance considerations and increase viewing efficacy across a viewing angle (e.g. front and angled viewing that is consistent across gap/holes transmitting light and material spaces blocking light); selectively adjusting the effects of even and uneven formed hole formations can be accomplished in selection of a hole pattern, hole pattern segment and hole form/shape/size (e.g. creating an even/uneven appearance for variations in light transmission); optical clarity/light transmission can be balanced against structural integrity of the material; processes such as injection molding for material may provide selective variations in optical clarity and/or off-angle viewing; configuration of hole patterns, hole pattern segment arrangement and hole shape/size/form can improve visual appearance; laser-formed aperture on certain materials such as a transparent substrate may produce effects/irregularities that reduce viewing angle; selection of back-molded plastic/resin may enhance the effect of the fill material as a light guide and enhance optical performance such as for a wood veneer surface. See FIGS. 48A-48B.

TABLE A

REFERENCE SYMBOL LIST

| ELEMENT, PART OR COMPONENT | REFERENCE SYMBOL |
|---|---|
| Vehicle | V |
| Interior | I |
| Component/part | C |
| Product/part | P |
| Base | B |
| Instrument panel | IP |
| Floor Console | FC |
| Door panel | DP |
| Armrest | AR |
| Cover/layer | T |
| Surface | SF |
| Surface effect | SE |
| Decorative layer | DL |
| Wood | W |
| Backing layer/backer | BL |
| | BLa, BLb |
| Substrate | S/SB |
| Fill/projections/material | F |
| | Fa, Fb |
| Resin | R |
| Air gap | AG |
| Display | D |
| Decorative region | DR |
| Instrumentation region | IR |
| Module | M |
| Light source/Light (illumination) | L |
| Light source (LED lamp, LED array, LED panel, etc.) | LED |
| Light guide/fill material (light-transmissive) | LG |
| Image | IM |
| Image shape | SH |
| Image presentation area | IPA |
| Formed image presentation area | FPA |
| Pattern image area | PA |
| Hole pattern | HP |
| arrangement/hole pattern | AR |
| | AR1, AR2, AR3, AR4 |
| Hole/set of holes | H |
| | Ha, Hb, Hc, Hd |
| | H1, H2, H3 |
| Hole pattern segment (e.g. parallelogram, rhombus, other shape, etc.) | HS |
| Hole pattern segment (combined unit/shape segment of holes/pattern) | E |
| | E1, E2, E3, E4, E5, E6, E7 |
| Side of segment | SD |
| Vertex of segment | VT |
| Formed hole formation pattern | FP |
| Hole formation | FH |
| | FHe, FHr |
| Formed hole formation segment | FS |
| diameter DI | DI |
| viewing distance | Z |
| (oblong hole at different viewing angle) | |
| viewing angle (at an inclined angle α) | VA |

TABLE A-continued

REFERENCE SYMBOL LIST

| ELEMENT, PART OR COMPONENT | REFERENCE SYMBOL |
|---|---|
| viewing angle (from above the cover θ) | VO |
| thickness TH (of cover) | TH |
| Contour/form/border (desired, exterior, interior) | EPL |
| (edge, boundary, form, shape, etc.) | EPL1, EPL2 |
| visible contour/border (edge, boundary, form, shape, etc.) | VPL |
| Mold section | MT |
| Mold section | MB |
| Laser tool/system | LT |
| Beam/laser beam | LB |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior with a visible surface intended to be visible to an occupant when the component is installed in the vehicle interior configured to be illuminated from a light source comprising:
   (a) a base;
   (b) a cover for the base comprising an exterior surface providing the visible surface and an interior surface;
   wherein the cover is configured to provide an image presentation area at the visible surface;
   wherein the image presentation area of the cover comprises a formed image presentation area for the exterior surface of the cover;
   wherein the formed image presentation area comprises a formed hole formation segment;
   wherein the formed hole formation segment comprises at least one formed hole formation;
   wherein the formed hole formation segment is based on a hole pattern segment;
   wherein the formed hole formation segment comprises a formed hole formation with a shape formed at least partially by melting of at least two pattern holes of the hole pattern segment into one formed hole formation of the formed hole formation segment;
   wherein the formed hole formation segment comprises the formed hole formation with an irregular shape;
   wherein the irregular shape of the formed hole formation of the formed hole formation segment is based on a shape of a pattern hole of the hole pattern segment;
   wherein the shape of the pattern hole of the hole pattern segment comprises a regular shape;
   wherein the irregular shape of the formed hole formation of the formed hole formation segment is based on the regular shape of the pattern hole of the hole pattern segment;
   wherein the irregular shape of the formed hole formation is at least partially formed by melting and/or merging of at least two pattern holes of the hole pattern segment into one formed hole formation of the formed hole formation segment.

2. The component of claim 1 wherein the at least one formed hole formation of the formed hole formation segment is based on a pattern hole of the hole pattern segment.

3. The component of claim 1 wherein the formed hole formation segment comprises a rhomboid form generally corresponding to a rhomboid form of the hole pattern segment.

4. The component of claim 1 wherein the formed hole formation segment comprises at least one formed hole formation with an irregular shape based on a pattern hole of the hole pattern segment.

5. The component of claim 1 wherein the image presentation area of the cover comprises a hole pattern at the interior surface of the cover.

6. The component of claim 1 wherein the image presentation area of the cover comprises a pattern image area; wherein the pattern image area of the cover comprises a hole pattern at the interior surface of the cover; wherein the hole pattern of the pattern image area comprises the hole pattern segment.

7. The component of claim 1 wherein the image presentation area of the cover comprises the at least one formed hole formation at each formed hole formation segment in the formed image presentation area.

8. The component of claim 1 wherein each formed hole formation segment is based on a hole pattern segment for the image presentation area.

9. The component of claim 8 wherein the hole pattern segment comprises a pattern hole with a regular shape; wherein the formed hole formation segment comprises a formed hole formation with an irregular shape; wherein the irregular shape of the formed hole formation of the formed hole formation segment is based on the regular shape of the pattern hole of the hole pattern segment.

10. The component of claim 8 wherein the formed hole formation segment comprises at least one formed hole formation; wherein each formed hole formation is based on a hole segment of the hole pattern segment for the image presentation area.

11. The component of claim 1 wherein each formed hole formation comprises at least one opening through the cover comprising an opening at the exterior surface and at the interior surface of the cover.

12. The component of claim 1 wherein the image presentation area of the cover comprises a pattern image area comprising a hole pattern comprising the hole pattern segment.

13. The component of claim 1 wherein the hole pattern segment comprises a rhomboid form comprising a set of sides and a set of vertices and a set of pattern holes.

14. The component of claim 13 wherein the set of pattern holes comprises at least one pattern hole and at least one pattern elongate hole.

15. The component of claim 13 wherein the set of pattern holes comprises a pattern elongate hole and a pattern hole.

16. The component of claim 15 wherein the pattern elongate hole comprises a symmetrical shape or a slot-like shape or a rectangle-like shape or an oblong shape.

17. The component of claim 1 wherein the formed hole formation segment comprises at least one formed hole formation with an irregular shape based on a pattern hole of the hole pattern segment; wherein the formed hole formation segment comprises at least one formed hole formation segment; wherein the at least one formed hole formation segment of the formed image presentation area generally corresponds to at least one hole pattern segment of the hole pattern; wherein the at least one formed hole formation is formed according to the pattern hole of the hole pattern segment.

18. The component of claim 17 wherein the at least one formed hole formation is formed by melting.

19. A method of producing a component comprising a cover with an interior surface and an exterior surface with an image presentation area comprising the steps of:

(a) providing a pattern image area for the image presentation area comprising a hole pattern comprising a set of hole pattern segments at the interior surface of the cover;

(b) forming a formed image presentation area as a set of formed hole formation segments for the exterior surface of the cover based on the hole pattern segments of the pattern image area for the interior surface of the cover;

wherein the set of formed hole formation segments comprises a set of formed hole formations formed by perforation through the cover;

wherein the step of forming a formed image presentation area comprises forming the set of formed hole formations by at least one of (a) melting material of the cover and/or (b) fusing material of the cover;

wherein the image presentation area of the cover comprises the formed image presentation area for the exterior surface of the cover; wherein each formed hole formation segment is based on a hole pattern segment for the image presentation area;

wherein each formed hole formation is based on a hole segment of the hole pattern segment for the image presentation area;

wherein the formed hole formation segment comprises a formed hole formation with an irregular shape;

wherein the irregular shape of the formed hole formation of the formed hole formation segment is based on a shape of a pattern hole of the hole pattern segment;

wherein the shape of the pattern hole of the hole pattern segment comprises a regular shape;

wherein the irregular shape of the formed hole formation of the formed hole formation segment is based on the regular shape of the pattern hole of the hole pattern segment;

wherein the irregular shape of the formed hole formation is at least partially formed by melting and/or merging of at least two pattern holes of the hole pattern segment into one formed hole formation of the formed hole formation segment.

20. A component for a vehicle interior with a visible surface intended to be visible to an occupant when the component is installed in the vehicle interior configured to be illuminated from a light source produced by the method of claim 19 comprising:

(a) a base;

(b) a cover for the base comprising an exterior surface providing the visible surface and an interior surface;

wherein the cover is configured to provide an image presentation area at the visible surface;

wherein the image presentation area of the cover comprises a formed image presentation area for the exterior surface of the cover;

wherein the formed image presentation area comprises a formed hole formation segment;

wherein the formed hole formation segment comprises at least one formed hole formation;

wherein the formed hole formation segment is based on a hole pattern segment;

wherein a formed hole formation of the formed hole formation segment comprises an irregular shape based on a regular shape of a pattern hole of the hole pattern segment;

wherein the irregular shape of the formed hole formation is at least partially formed by melting of at least two pattern holes of the hole pattern segment into one formed hole formation of the formed hole formation segment.

* * * * *